US005953035A

United States Patent [19]

Watanabe et al.

[11] Patent Number: 5,953,035

[45] **Date of Patent: *Sep. 14, 1999**

[54] PRINTING APPARATUS AND PRINTING METHOD FOR USE WITH ROLLED SHEET AND CUT SHEET FEEDING UNITS

[75] Inventors: Yuichi Watanabe, Machida; Yoshihiko Kitahara, Yokohama; Hideaki Kishida; Masataka Naito, both of Kawasaki; Masatoshi Ikkatai, Yokohama; Hitoshi Fujimoto, Kawasaki, all of Japan

[73] Assignee: Canon Aptex Inc., Mitsukaido, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/445,749

[22] Filed: May 22, 1995

[30] Foreign Application Priority Data

May 24, 1994 [JP] Japan .................................... 6-110097

[51] Int. Cl.[6] .............................. B41J 2/01; G01D 15/24

[52] U.S. Cl. ............................................ 347/104; 346/134

[58] Field of Search .................................... 347/104, 215, 347/16, 218; 346/134; 271/157, 9.1; 400/605, 708, 709; 283/74; 242/595.1, 563

[56] References Cited

U.S. PATENT DOCUMENTS

| | | | |
|---|---|---|---|
| 3,655,183 | 4/1972 | Wagner . | |
| 4,273,323 | 6/1981 | Kaneko et al. | 271/157 |
| 4,313,124 | 1/1982 | Hara . | |
| 4,345,262 | 8/1982 | Shirato et al. . | |
| 4,459,600 | 7/1984 | Sato et al. . | |
| 4,463,359 | 7/1984 | Ayata et al. . | |
| 4,558,333 | 12/1985 | Sugitani et al. . | |
| 4,608,577 | 8/1986 | Hori . | |
| 4,655,626 | 4/1987 | Okazaki | 400/605 |
| 4,723,129 | 2/1988 | Endo et al. . | |
| 4,740,796 | 4/1988 | Endo et al. . | |
| 5,023,728 | 6/1991 | Nimura et al. | 347/104 |
| 5,078,523 | 1/1992 | McGourty et al. | 400/613 |
| 5,390,016 | 2/1995 | Hoshi et al. | 347/104 |

FOREIGN PATENT DOCUMENTS

| | | | |
|---|---|---|---|
| 0153761 | 9/1985 | European Pat. Off. . | |
| 0 300 095 | 7/1987 | European Pat. Off. | G03G 15/00 |
| 0300095 | 1/1989 | European Pat. Off. . | |
| 0356864 | 3/1990 | European Pat. Off. . | |
| 2850820 | 5/1979 | Germany . | |
| 54-056847 | 5/1978 | Japan . | |
| 59-123670 | 7/1984 | Japan . | |
| 59-138461 | 8/1984 | Japan . | |
| 60-071260 | 4/1985 | Japan . | |
| 60-073871 | 4/1985 | Japan . | |
| 60-244726 | 12/1985 | Japan | B65H 3/06 |
| 62-235133 | 10/1987 | Japan . | |
| 63-012538 | 1/1988 | Japan . | |
| 4133942 | 5/1992 | Japan . | |
| 5116401 | 5/1993 | Japan . | |
| 6115189 | 4/1994 | Japan . | |

*Primary Examiner*—N. Le
*Assistant Examiner*—Thien Tran
*Attorney, Agent, or Firm*—Fitzpatrick, Cella, Harper & Scinto

[57] ABSTRACT

A printing apparatus is capable of freely selecting a plurality of sheet feeding units each having a different controlling method. It is discriminated as to which one among plural kinds of sheet feeding units is fitted, and printing and a motor for a sheet feeding-unit are controlled based on the result of the discrimination from an output from a sensor disposed on the sheet feeding unit. Especially, in the case that a roll shaped paper feeding unit is fitted, it is judged that a printing medium reaches the position where printing can be started when a TOF sensor detects black color, and in the case that a cut sheet feeding unit is fitted, it is judged that the recording medium reaches the position where printing can be started when the TOF sensor detects white color.

26 Claims, 40 Drawing Sheets

PRINTING APPARATUS AND PRINTING METHOD FOR USE WITH ROLLED SHEET AND CUT SHEET FEEDING UNITS

BACKGROUND OF THE INVENTION

1. Field of the Invention

The present invention relates generally to a printing apparatus and a printing method for performing recording for labels and cards widely used in the field of POS (point of sale), FA (factory automation), physical distribution or the like. More particularly, the present invention relates to a printing apparatus and a printing method for performing printing for labels and cards by employing an ink jet printing system.

2. Description of Related Art

At present, a label printer having an ink jet recording system utilized therefor has been put in practical use. General advantages obtainable from ink jet recording are noted below. Specifically, one of them is that ink jet printing is effected with excellent quietness attributable to no contact with a printing medium, another one is that ink jet printing is performed at a high speed, another one is that ink jet printing can be achieved at a high density and further one is that ink jet color printing can easily be realized, and an ink jet printing apparatus can be designed with small dimensions. On the other hand, many label printers are constructed in such a manner that a number of labels are successively adhesively placed on a long peeling sheet that is called a separator and so-called label paper having the thus prepared peeling sheet wound in the form of a roll is conveyed. In the case that the ink jet system is applied to the label printer of the foregoing type, it is required to take a measure for suppressively preventing the label paper from being floated up at a printing head, and moreover, being slantwise conveyed.

Lately, in POS or the like, many requests are raised not only for roll-shaped label paper but also for a cut sheet. Therefore, a printing apparatus employable for both of roll-shaped label paper and a cut sheet is increasingly required.

Conventionally, it is difficult for the following reasons that a label printer is applied to a cut sheet. Specifically, with the conventional roll-shaped label paper, in order to determined printing timing, a marking is placed on the rear side of the roll-shaped paper, light beam is irradiated to the marked point, and subsequently, the reflected light beam is detected by a sensor. Since a base sheet to which labels are adhesively placed is not used any more, markings can be put on the rear side of the roll-shaped paper. However, since each cut sheet itself is used, it is not desirable that markings are put on the rear side of the cut sheet. For this reason, with the conventional printing method, it is difficult to determined printing timing.

In addition, to assure that the printing apparatus can be utilized for both of roll-shaped paper and a cut sheet, there arises a necessity for preparing conveying means for the roll-shaped paper and conveying means for the cut sheet. However, since the conveying means for the roll-shaped paper and the conveying means for the cut sheet are largely different from each other in respect of a type and a controlling method applicable thereto, it is practically difficult to adequately control each of conveying systems.

Further to the foregoing problems, it is also very difficult to compactly design a printing head, a recovering system unit, an ink feeding system and a printing medium conveying system.

SUMMARY OF THE INVENTION

The present invention has been made in consideration of the aforementioned background.

An object of the present invention is to provide a printing apparatus and a printing method which assure that one of a plurality of sheet feeding units each having a different controlling method can be used by freely selecting one of them.

In a first aspect of the present invention, there is provided a printing apparatus for performing recording for a recording medium using a printing head, comprising:

- a sheet feeding unit fitting section capable of fitting any one of plural kinds of sheet feeding units,
- a plurality of printing controlling means for controlling printing corresponding to the plural kinds of sheet feeding units, respectively,
- discriminating means for discriminating which unit among the plural kinds of sheet feeding units is fitted, and
- executing means for executing printing by selecting printing controlling means corresponding to the fitted sheet feeding unit from the plurality of printing controlling means based on the result of discrimination made by the discriminating means.

Each of the plural kinds of sheet feeding units may include a sensor,

- the sheet feeding unit fitting section includes an interface for allowing an output from the sensor to be inputted thereinto, and
- each of the plurality of printing controlling means controls printing based on an output from the sensor of the sheet feeding unit corresponding to the printing controlling means.

Each of the plural kinds of sheet feeding units may include a motor,

- the sheet feeding unit fitting section includes an interface for allowing an input into the motor to be outputted therefrom, and
- each of the plurality of printing controlling means controls the motor of the sheet feeding unit corresponding to the printing controlling means.

The plural kinds of sheet feeding units may include a roll-shaped paper feeding unit and a cut sheet feeding unit,

- the sensor comprises a TOF sensor for detecting the position where printing can be started,
- in the case that the roll-shaped paper feeding unit is fitted, the printing controlling means judges that the recording medium reaches the position where printing can be started when the TOF sensor detects black color, and
- in the case that the cut sheet feeding unit is fitted, the printing controlling means judges that the recording medium reaches the position where printing can be started when the TOF sensor detects white color.

The plural kinds of sheet feeding units may include a roll-shaped paper feeding unit and a cut sheet feeding unit,

- the sensor disposed in the roll-shaped paper feeding unit comprises a reflective type TOF sensor for detecting the position where printing can be started,
- the sensor disposed in the cut paper feeding unit comprises a permeable type TOF sensor for detecting the position where printing can be started,
- in the case that the roll-shaped sheet feeding unit is fitted, the printing controlling means judges that the recording medium reaches the position where printing can be started when the TOF sensor detects black color, and in the case that the cut sheet feeding unit is fitted, the printing controlling means judges that the recording medium reaches the position where printing can be started when no light beam is irradiated to the TOF sensor from a light source.

In a second aspect of the present invention, there is provided a printing method of performing recording for a recording medium with the aid of a printer including a sheet feeding unit fitting section capable of fitting any one of plural kinds of sheet feeding units, comprising the steps of:

discriminating which one among plural kinds of sheet feeding units is fitted, and executing printing by selecting printing controlling means corresponding to the fitted sheet feeding unit based on the result derived from discrimination made in the discriminating step.

Each of the plural kinds of sheet feeding units may include a sensor, the sheet feeding unit fitting portion includes an interface for allowing an output from the sensor to be inputted thereinto, and the printing method further comprises step of controlling printing based on the kind of the sheet feeding unit fitted to the sheet feeding unit fitting section and an output from the sensor.

Each of the plural kinds of sheet feeding unit may include a motor, the paper feeding unit fitting section includes an interface for allowing an input into the motor to be outputted therefrom, and the printing method further comprises step of controlling the motor based on the kind of the sheet feeding unit fitted to the sheet feeding unit fitting section.

The plural kinds of sheet feeding units may include a roll-shaped paper feeding unit and a cut sheet feeding unit, the sensor comprises a TOF sensor for detecting the position where printing can be started, and the printing method further comprises step of judging that the recording medium reaches the position where printing can be started when the TOF sersor detects black color in the case that the roll-shaped paper feeding unit is fitted, and judging that the recording medium reaches the position where printing can be started when the TOF sensor detects white color in the case that the cut sheet feeding unit is fitted.

The plural kinds of sheet feeding unit may include a roll-shaped paper feeding unit and a cut sheet feeding unit, the sensor disposed in the roll-shaped paper feeding unit comprises a reflective type TOF sensor for detecting the position where printing can be started, the sensor disposed in the cut sheet feeding unit comprises a permeable type TOF sensor for detecting the position where printing can be started, and the printing method further comprises step of judging that the recording medium reaches the position where printing can be started when the TOF sensor detects black color in the case that the roll-shaped paper feeding unit is fitted, and judging that the recording medium reaches the position where printing can be started when no light beam is irradiated to the TOF sensor from a light source in the case that the cut sheet feeding unit is fitted.

In a third aspect of the present invention, there is provided a sheet feeding unit comprising:

supporting means vertically displaceable for supporting a plurality of cut sheets, driving means capable of driving the supporting means in the vertical direction, detecting means for detecting that the uppermost surface of the plurality of cut sheets supported by the supporting means is located at a predetermined position, separating and conveying means for separating only the uppermost sheet among the plurality of cut sheets located at a predetermined position and conveying it in the horizontal direction, correcting means for correcting slantwise conveyance of the cut sheet conveyed by the separating and conveying means, and delivering means for delivering the cut sheet in a predetermined timing relationship after slantwise conveyance of the cut sheet is corrected by the correcting means.

The driving means may displace the supporting means in the upward direction when the detecting means detects that the uppermost surface of the plurality of cut sheets is not located at a predetermined position, and stops the supporting means when located at. the predetermined position.

The separating and conveying means may comprise:

a pickup roller disposed above the supporting means in such a manner as to come in contact with the uppermost surface of the plurality of cut sheets, a first separating roller disposed ahead of the pickup roller as viewed in the conveyance direction, a second separating roller adapted to be rotated in the same direction as that of the first separating roller and located below the first separating roller while facing to the latter, and driving means for driving the pickup roller and the first separating roller.

The correcting means may comprise a shutter member having a face extending perpendicular to a conveyance direction of each cut sheet and adapted to be projected into a conveyance passage of the cut sheet and retracted from the conveyance passage.

The delivering means may include a solenoid for driving the shutter member.

The sheet feeding unit may comprise:

supporting means vertically displaceable for supporting a plurality of cut sheets, driving means capable of driving the supporting means in the vertical direction, detecting means for detecting that the uppermost surface of the plurality of cut sheets supported by the supporting means is located at a predetermined position, separating and conveying means for separating only the uppermost sheet among the plurality of cut sheets located at a predetermined position and conveying it in the horizontal direction, correcting means for correcting slantwise conveyance of the cut sheet conveyed by the separating and conveying means, and delivering means for delivering the cut sheet in a predetermined timing relationship after slantwise conveyance of the cut sheet is corrected by the correcting means.

The driving means may displace the supporting means in the upward direction when the detecting means detects that the uppermost surface of the plurality of cut sheets is not located at a predetermined position, and stops the supporting means when located at the predetermined position.

The separating and conveying means may comprise:

a pickup roller disposed above the supporting means in such a manner as to come in contact with the uppermost surface of the plurality of cut sheets, a first separating roller disposed ahead of the pickup roller as viewed in the conveyance direction, a second separating roller adapted to be rotated in the same direction as that of the first separating roller and located below the first separating roller while facing to the latter, and driving means for driving the pickup roller and the first separating roller.

The correcting means may comprise a shutter member having a face extending perpendicular to a conveyance direction of each cut sheet and adapted to be projected into a conveyance passage of the cut sheet and retracted from the conveyance passage.

The delivering means may include a solenoid for driving the shutter member.

According to the present invention, since the printing apparatus executes printing by discriminating which unit among plural kinds of sheet feeding units is fitted thereto and then selecting printing controlling means corresponding to the fitted sheet feeding unit based on the result derived from the foregoing discrimination, a user of the printing apparatus can use the plural kinds of sheet feeding units of which the controlling methods are different from each other by freely selecting one of them.

In addition, since printing is controlled based on the kind of sheet feeding units fitted to a sheet feeding unit fitting section and an output from a sensor disposed on each of sheet feeding units, printing can be controlled corresponding to the output from each sensor even in the case that a method of detection of the sensor disposed in each paper feeding unit is different from each other.

Additionally, according to the present invention, since a motor for the sheet feeding unit is controlled based on the kind of the paper feeding unit fitted to the sheet feeding unit fitting section, each motor can be controlled for every sheet feeding unit.

Further, according to the present invention, in the case that a roller-shaped paper feeding unit is fitted, it is judged that a printing medium reaches the position where printing can be started when a TOF sensor detects black color, and in the case that a cut sheet feeding unit is fitted, it is judged that the recording paper reaches the position where printing can be started when the TOF sensor detects white color. Thus, even when either of the recording mediums is used, the position where printing can adequately be started can be judged.

Moreover, according to the present invention, in the case that a roller-shaped paper feeding unit is fitted, when the reflective TOF sensor detects black color, it is judged that the recording medium reaches the position where printing can be started, and in the case that a cut sheet feeding unit is fitted, when no light beam is irradiated to the permeable TOF sensor from a light source, it is judged that the recording medium reaches the position where printing can be started. Thus, even when either of the recording mediums is used, the position where printing can adequately be started can be judged.

Other objects, features and advantages of the present invention will become apparent from reading of the following description which has been made in conjunction with the accompanying drawings.

BRIEF DESCRIPTION OF THE DRAWINGS

FIG. 21 is a flowchart which shows treatments to be conducted by the label printer after a power source is turned on.

FIG. 22 is a flowchart which shows the content of recovering treatments to be conducted while the power source is turned on.

DESCRIPTION OF THE PREFERRED EMBODIMENT

The present invention will now be described in detail hereinafter with respect to the following items with reference to the accompanying drawings which illustrate preferred embodiments thereof.

Figure 1:
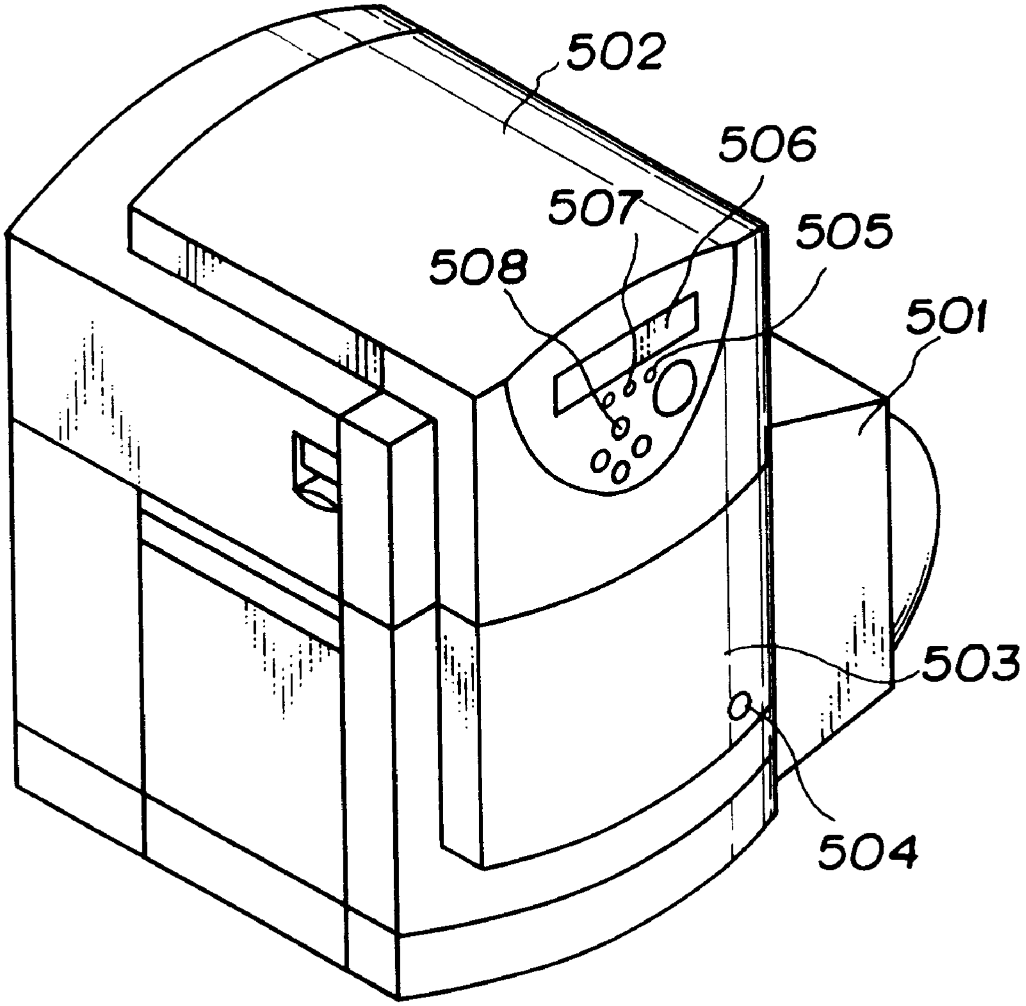
FIG. 1 is a perspective view of a label printer, showing the structure of the label printer.
Figure 2:
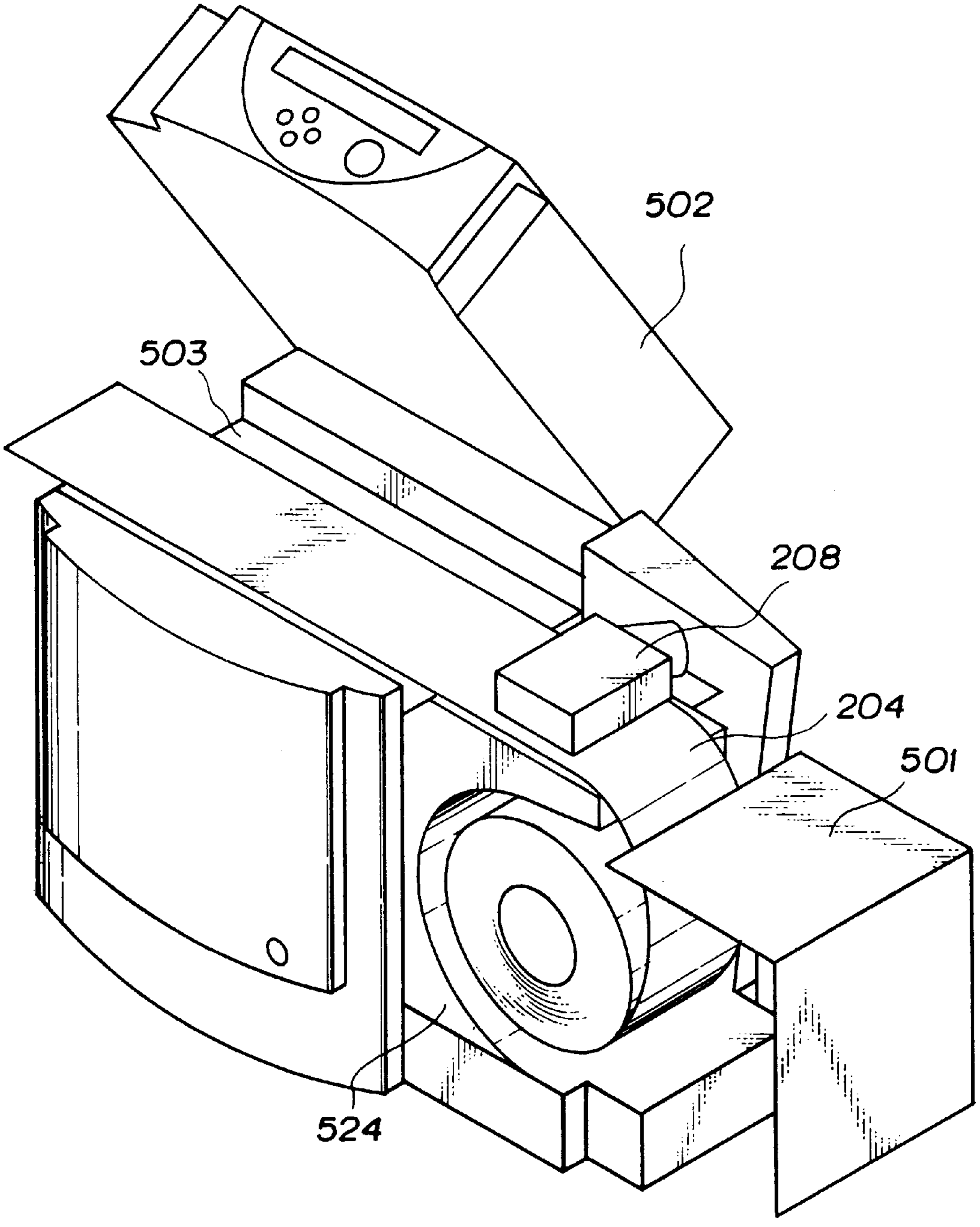
FIG. 2 is a perspective view of the label printer, illustratively showing in the disassembled state how roll-shaped paper is fitted to the label printer.
Figure 3:
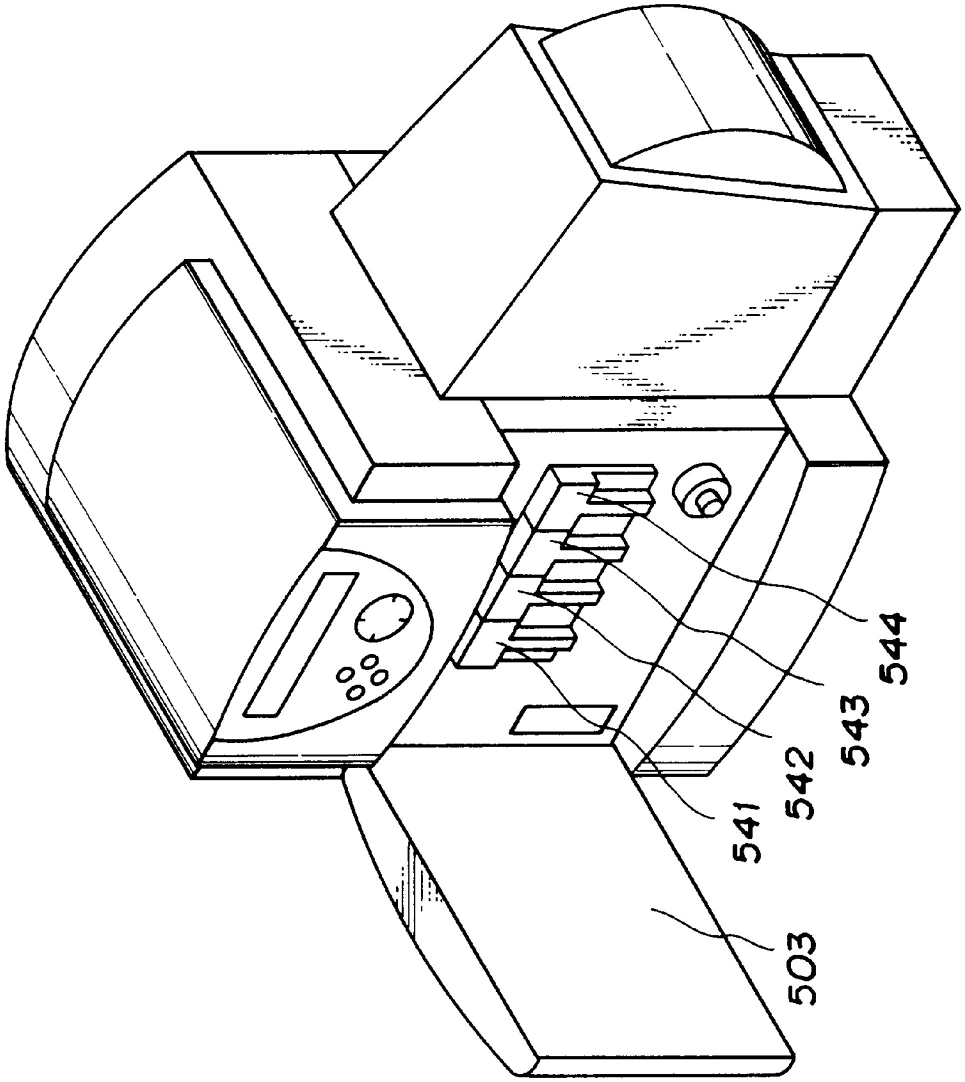
FIG. 3 is a perspective view of the label printer, showing how ink cartridges are exchanged with another ones.

(1) Outline of the structure of a label printer to which the present invention is applied (see FIG. 1 to FIG. 3).

(2) Printing head station (see FIG. 4 to FIG. 11)

Figure 10:
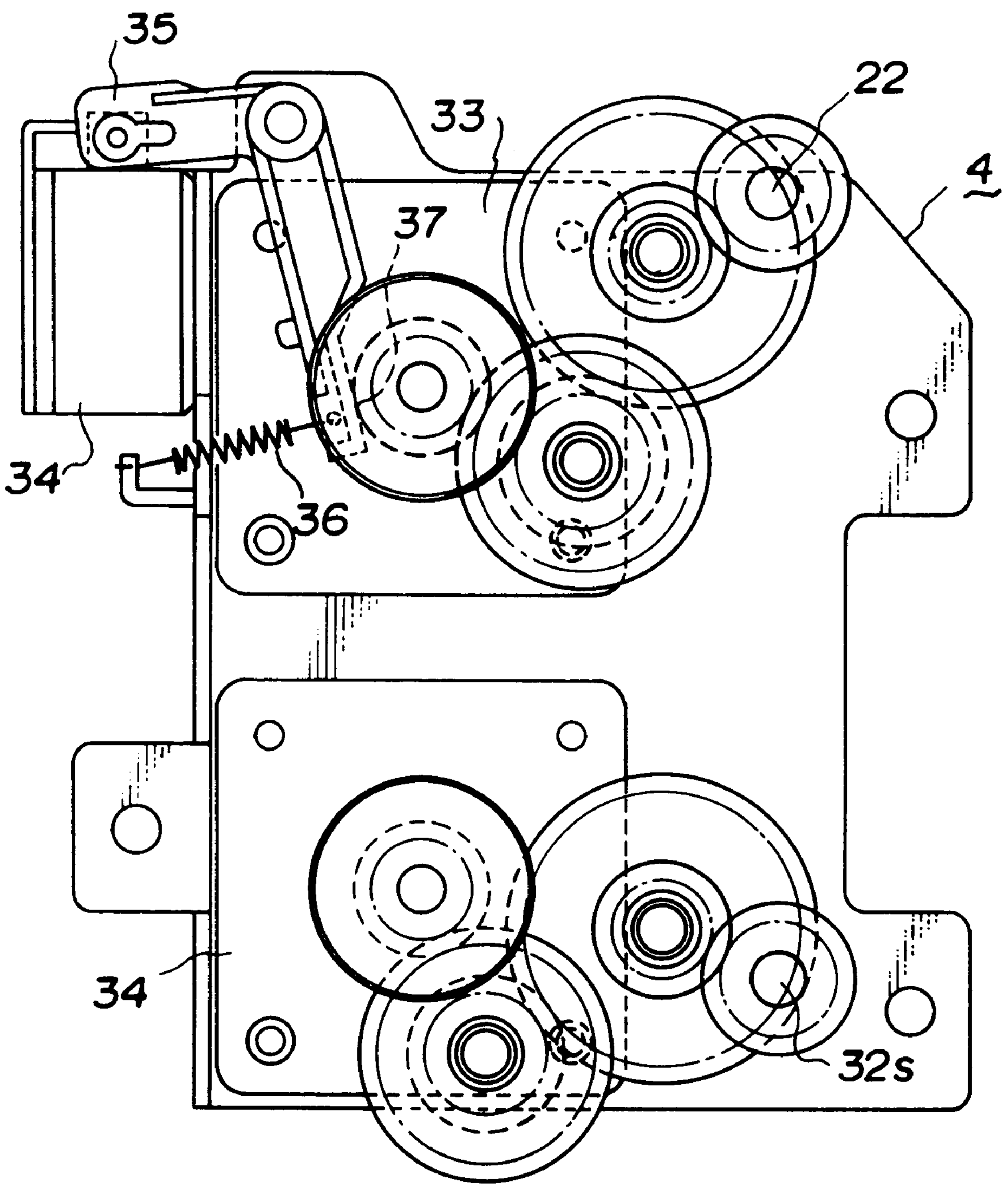
FIG. 10 is an illustrative view of a driving system unit.
Figure 11:
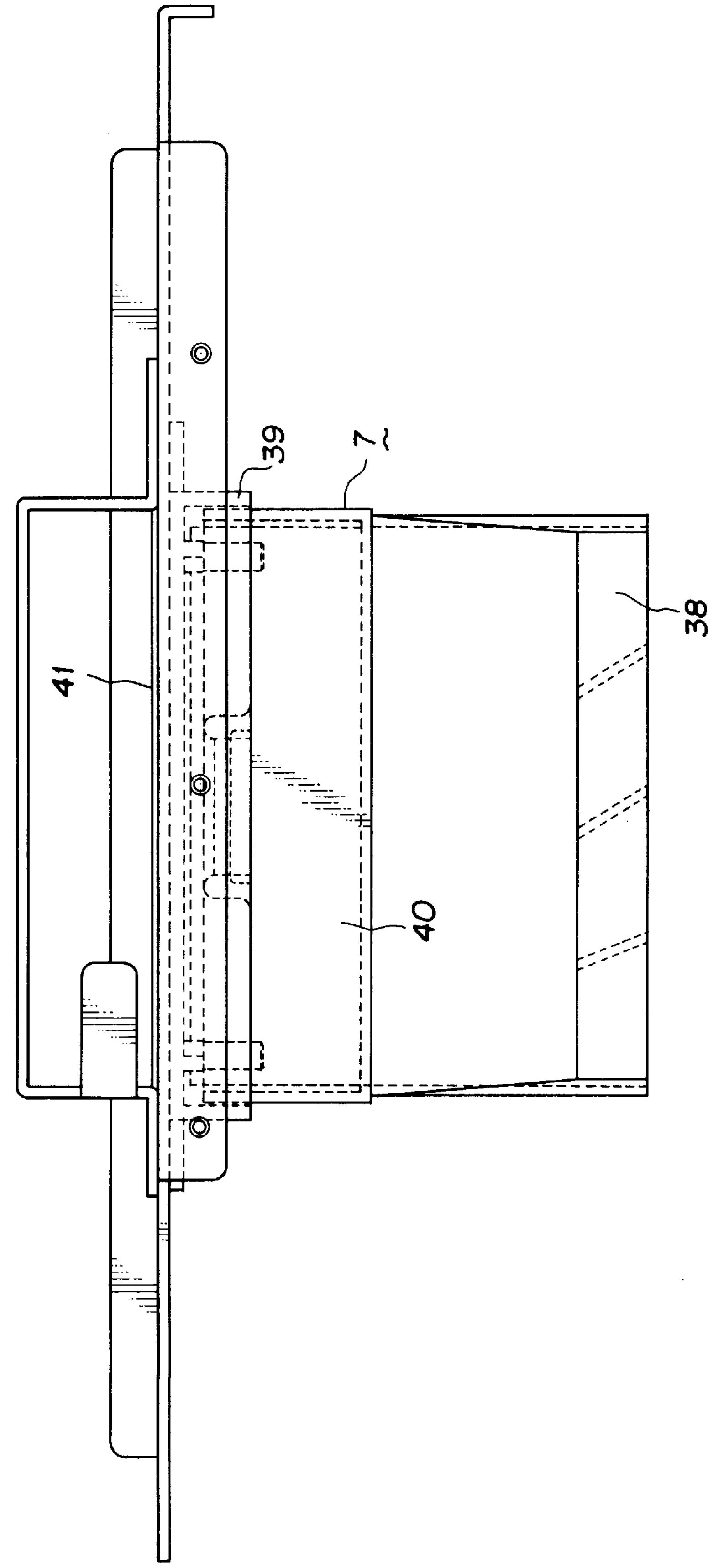
FIG. 11 is a plan view of a cooling unit.

- (2.1) Whole structure of the printing head station (see FIG. 4 and FIG. 6)
- (2.2) Head block (see FIG. 6)
- (2.3) Recovering system unit (see FIG. 7 to FIG. 10)
- (2.4) Cooling unit (see FIG. 11)

Figure 12:
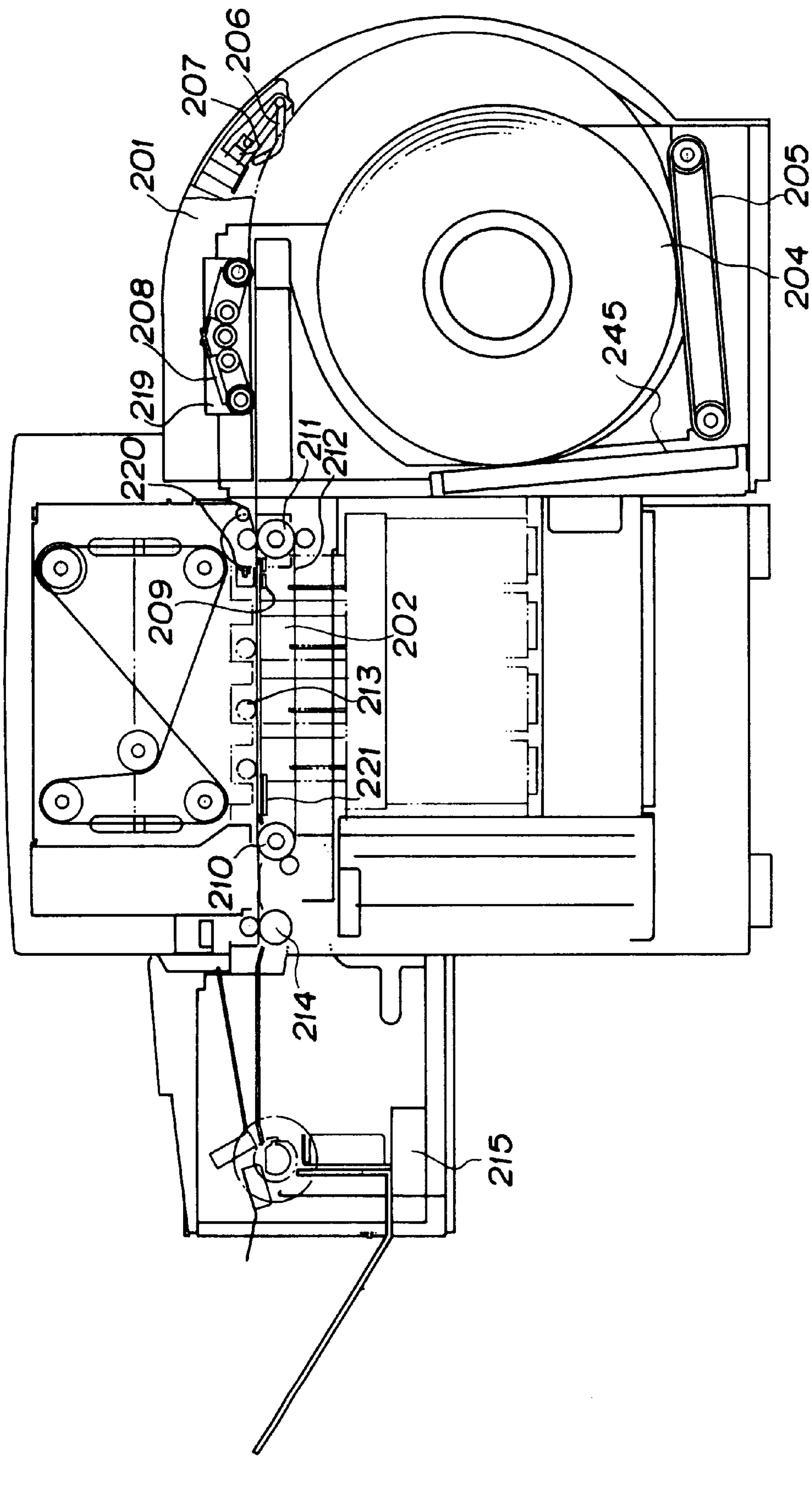
FIG. 12 is an explanatory view of the whole conveying system.
Figure 13:
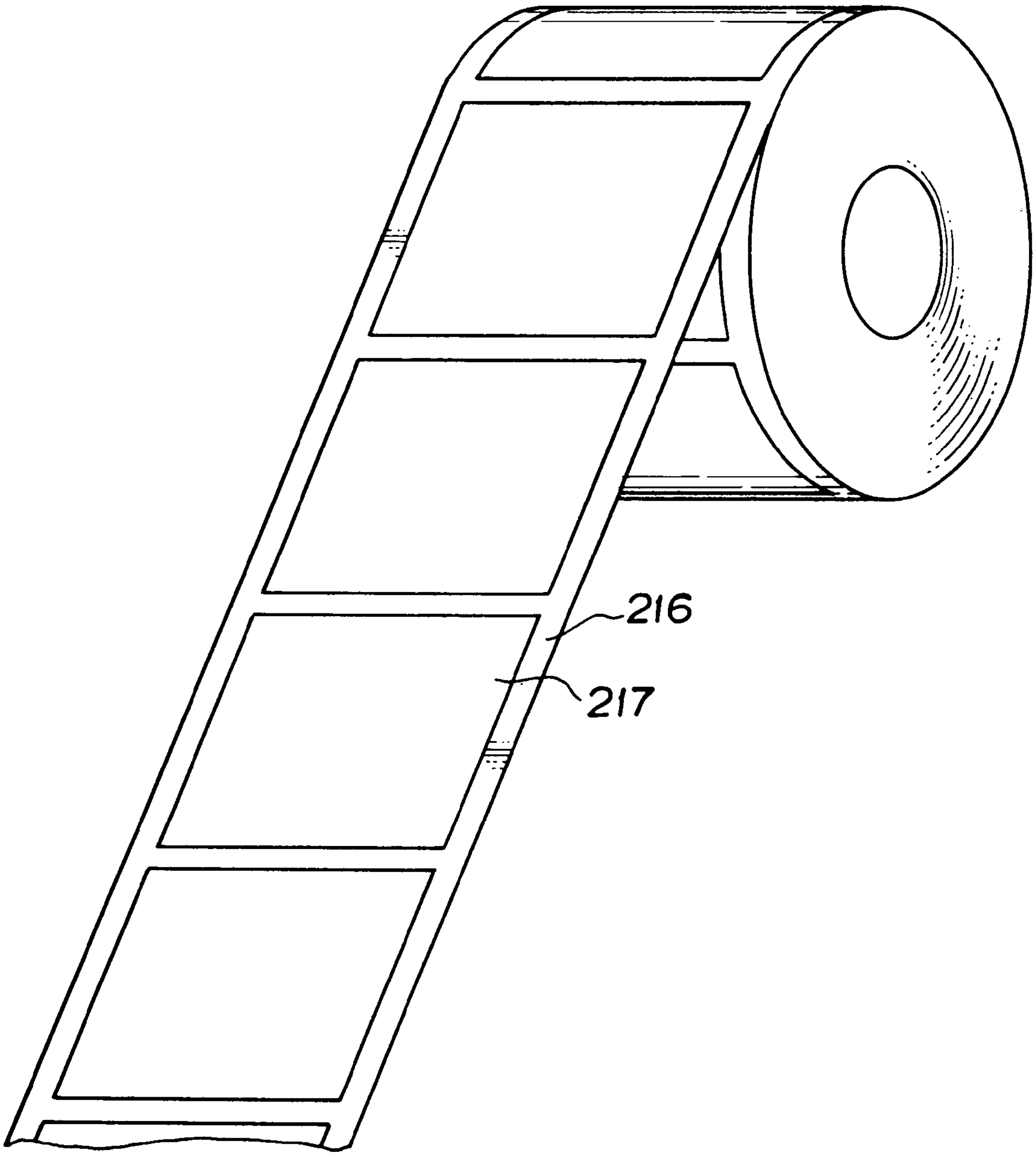
FIG. 13 is a perspective view of roll-shaped paper, showing by way of example a printing medium available for the label printer.
Figure 14:
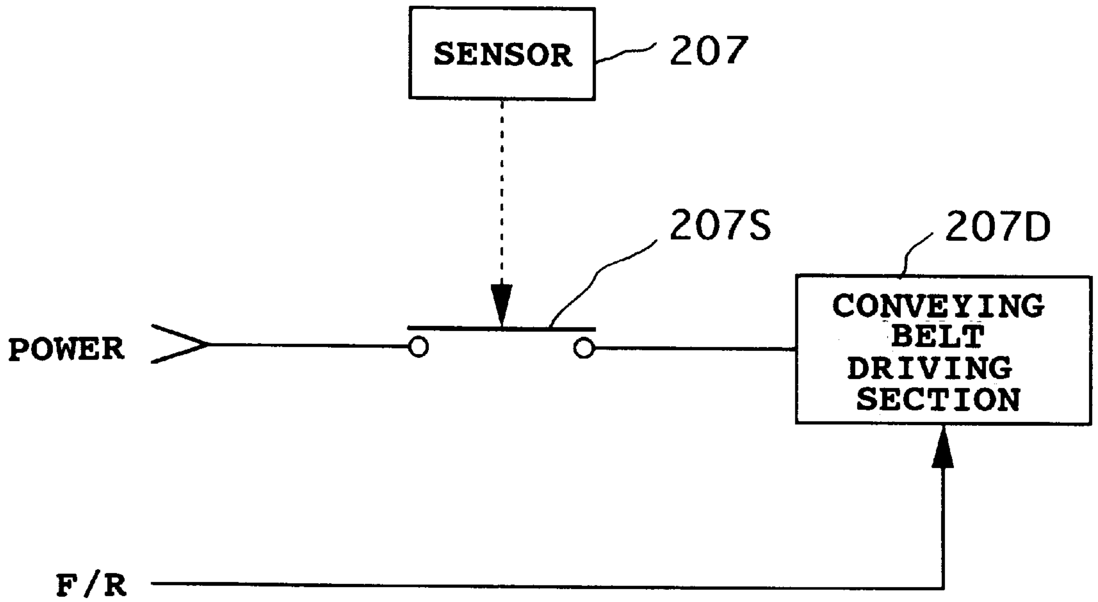
FIG. 14 is a circuit diagram which shows by way of example the structure of a driving and controlling system for a conveying belt.

(3) Printing medium conveying mechanism (see FIG. 12 to FIG. 14)

- (3.1) Roll feeding unit
- (3.2) Conveying unit
- (3.3) Cutter unit
- (3.4) Other embodiment of the roll feeding unit (4) Ink system (see FIG. 15 to FIG. 19)

Figure 20:
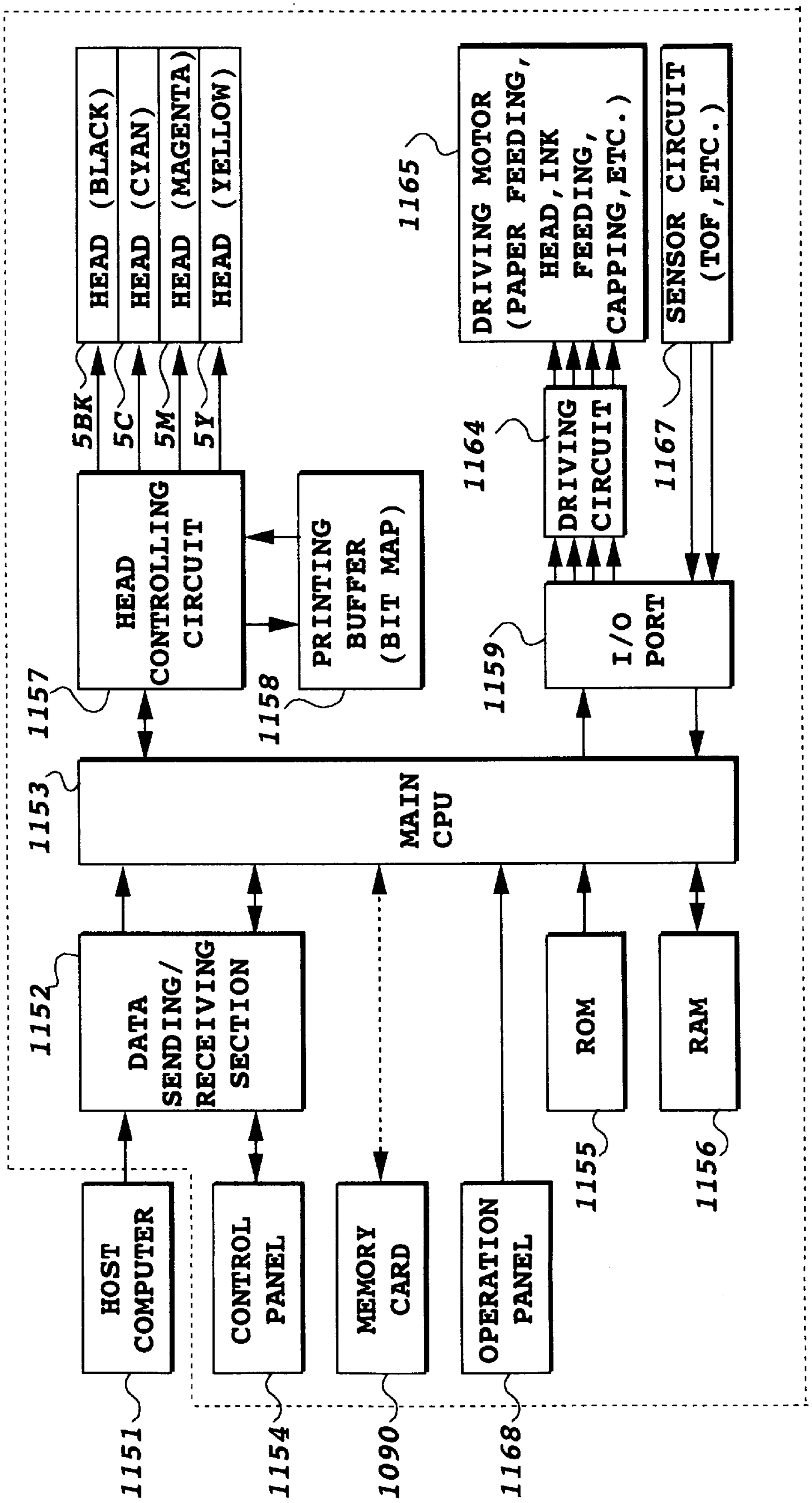
FIG. 20 is a block diagram which shows by way of example the whole structure of a controlling system.

(5) Hardware for a controlling system (see FIG. 20)

(6) Precedent treatment for blank paper and subsequent treatment for blank paper (7) Recovering treatment for a printing head (see FIG. 21 to FIG. 35)

- (7.1) Recovering treatment to be conducted when a power source is turned on
- (7.2) Recovering treatment to be conducted before a printing operation is performed
- (7.3) Recovering treatment to be conducted in the course of a printing operation
- (7.4) Controlling to be effected for an air cooling fan
- (7.5) Small-scaled recovering treatment, middle-scaled recovering treatment and large-scaled recovering treatment (8) Others Incidentally, terms "printing" and "recording" are used throughout the specification of the present invention, and it should widely be construed that these terms mean that a printing agent is applied to a printing medium.

In each embodiment to be described later, roll-shaped paper having a series of labels continuously arranged on peelable paper is used as a printing medium. However, any type, kind and material may be employed for the printing medium corresponding to a printer. For example, a cut paper sheet may be used as a printing medium. Otherwise, a film, a cloth or a similar one may be used as a material for the printing medium.

(1) Outline of the Structure of a Label Printer.

FIG. 1 is a perspective view which shows appearance of a label printer constructed in accordance with an embodiment of the present invention. In FIG. 1, reference numeral 501 denotes a roll paper feeding cover for receiving a paper roll therein, reference numeral 502 denotes a cover for opening and closing a conveying section for the paper roll and having a printing head station accommodated therein, and reference numeral 503 denotes a front cover for exposing respective ink tank portions to the outside. Reference numeral 504 denotes a power source switch for the printer, reference numeral 505 denoted a READY lamp adapted to be turned on when the printer is ready to be used, reference numeral 506 denotes a liquid crystal panel for displaying messages each informing an operator of the present state of the label printer, e.g., an error message or a similar one, reference numeral 507 designates an ERROR lamp adapted to be turned on when a certain abnormality occurs with the label printer, and reference numeral 508 denotes an ON-LINE lamp adapted to be turned on when the label printer is held in the on-line state relative to a host system (none shown).

Next, fundamental operations to be performed by the label printer constructed in the aforementioned manner will be described below At the time when the power source is ON or OFF:

While the roll paper feeding cover 501! the opening/closing cover 502 and the front cover 503 are kept closed, the power switch 504 is shifted to ON. At this time, the READY lamp 505 is flickeringly lighted, causing to check respective sections on the label printer. When it is found on completion of the checking operation that no abnormality occurs with the label printer, the READY lamp is shifted to the normally lighting state after several seconds elapse, whereby the label printer is brought in the mode preset by a user. In case that it is found that abnormality occurs with the label printer, an error message is displayed on the liquid crystal panel 506. This causes the ERROR lamp 507 to light. On the other hand, when the power source is to be turned off, it is sufficient that the power source switch 504 is depressed with a user's finger.

When the label printer is held in the on-line or off-line mode:

The on-line mode can visually be recognized based on the state that the ON-LINE lamp 508 is lighted, and the off-line mode can visually be recognized based on the state that the ON-LIME lamp 508 is turned off. When the label printer is held in the on-line mode, it can be controlled by the host system, and when the label printer is held in the off-line mode, various kinds of operations can be performed by selecting from the operation panel for the label printer.

Method of fitting a paper roll to the label printer:

Next, a method of fitting a paper roll to the label printer will be described below with reference to FIG. 2. The paper roll is exchanged with another one by way of the following procedure.

The roll paper feeding cover 501 is opened.

A slantwise conveying unit 208 is raised up with operator's fingers.

A paper roll 204 is taken out of the housing of the label printer (in the case that no paper roll is present, this step of operation is not required).

A new paper roll 204 is inserted into a roll feeding holder 524, an adequate quantity of paper is extensively drawn from the paper roll 204 at the fore end part of the latter, it is placed below the slantwise conveying unit 208, and thereafter, the slantwise conveying unit 208 is lowered The cover 501 is restored to the original position so that it is held in the closed state Exchanging of an ink cartridge with a new one:

A method of exchanging an ink cartridge serving as an ink supply source with a new one will be described below with reference to FIG. 3. In practice, the ink cartridge is exchanged with a new one by way of the following procedure.

The front cover 503 is opened.

An ink cartridge 541-544 to be exchanged with a new one is drawn out of the housing of the label printer (In the case that no ink cartridge is fitted into the label printer, this operation is not required).

A new cartridge 541-544 is inserted into a predetermined color cartridge inserting portion. In the shown case, ink cartridges are arranged in accordance with the order of a yellow ink cartridge (Y) 541, a magenta ink cartridge (M) 542, a cyan ink cartridge (C) 543 and a black ink cartridge (Bk) 544 as viewed on the left-hand side of the label printer.

Figure 4:
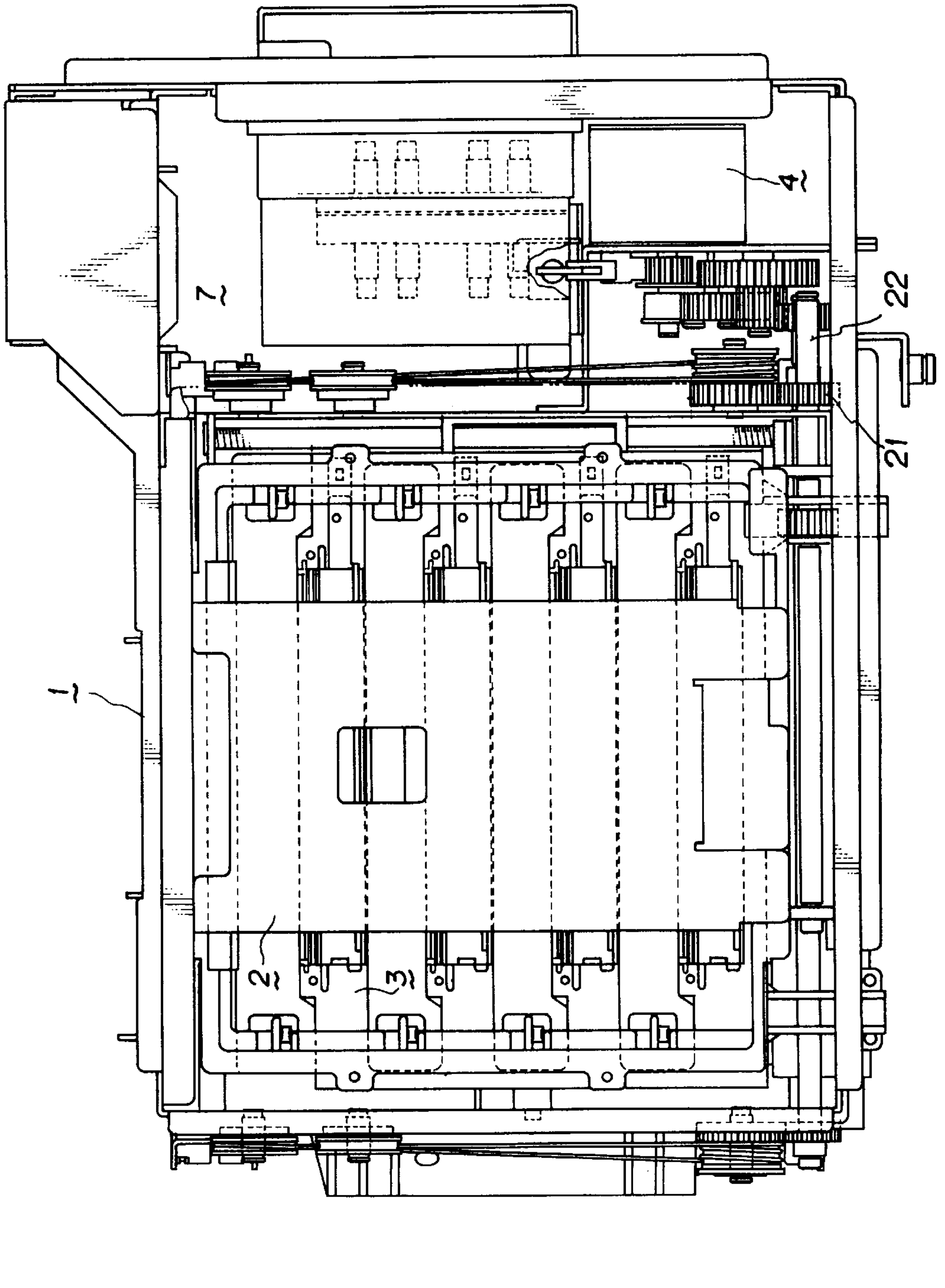
FIG. 4 is a plan view of the label printer, showing by way of example the structure of a printing head station.
Figure 5:
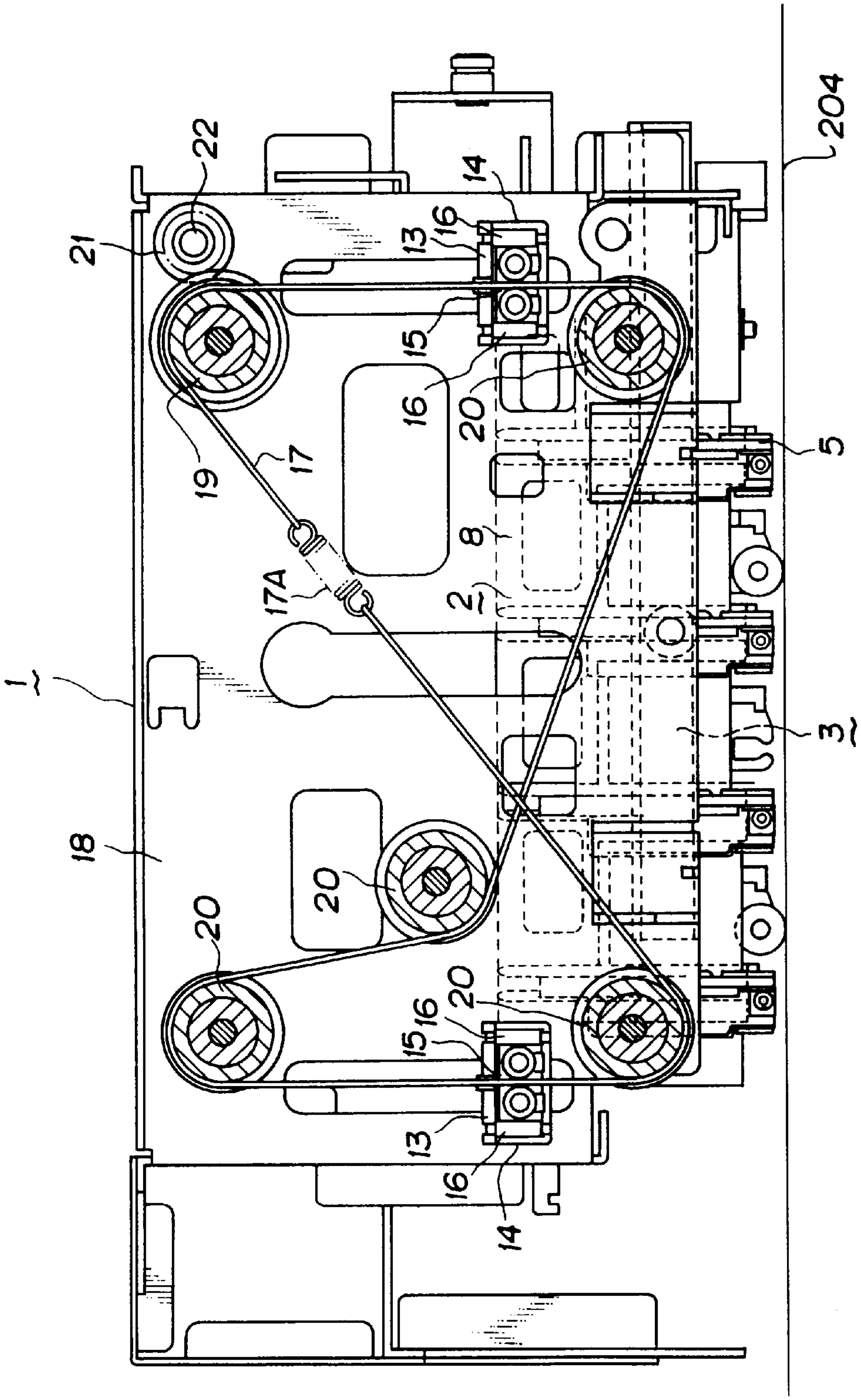
FIG. 5 is a front view of the label printer, showing by way of example the structure of the printing head station.

On completion of the exchanging operation, the front cover 503 is closed (2) Printing Head Station (2.1) Whole Structure of the Printing Head Station:

FIG. 4 is a plan view which shows by way of example the structure of a printing head station (hereinafter referred to simply as PHS) arranged in the cover 502 while exposing to a conveying path for unrolled paper, and FIG. 5 is a front view of the PHS.

To perform a printing operation for a label placed on part of the unrolled paper 204, PHS 1 includes a head unit 2 having a plurality of ink jet heads (hereinafter referred to simply as a head) 5 arranged therefor (corresponding to e.g. four kinds of colors), and each of the heads 5 includes a number of ink ejecting ports arranged within the range in excess of the whole width of the label as measured in the transverse direction of the unrolled paper 204. For example, a bubble jet type head as proposed by Canon Inc. including a number of elements each adapted to generate thermal energy as energy to be utilized for ink ejection by allowing a phenomenon of film boiling to appear in ink can be used as each head 5.

In addition, PHS 1 includes collecting means for recovering and collecting ink discharged from the respective ink ejecting port side arranged on the head 5, cleaning means for removing ink remaining on an ejecting port forming plane in the vicinity of the ink ejecting ports by wiping it, and a recovering system unit 3 including capping means for preventing the respective ink ejecting ports from being dried. Further, PHS 1 includes a driving unit 4 for vertically displacing the head holder unit 2 from the printing position for the unrolled paper 204, and moreover, horizontally displacing the recovering system unit 3 by a predetermined quantity in the conveying direction of the unrolled paper 204 and a cooling unit 7 for cooling the head 5.

(2.2) Head Block

Figure 6:
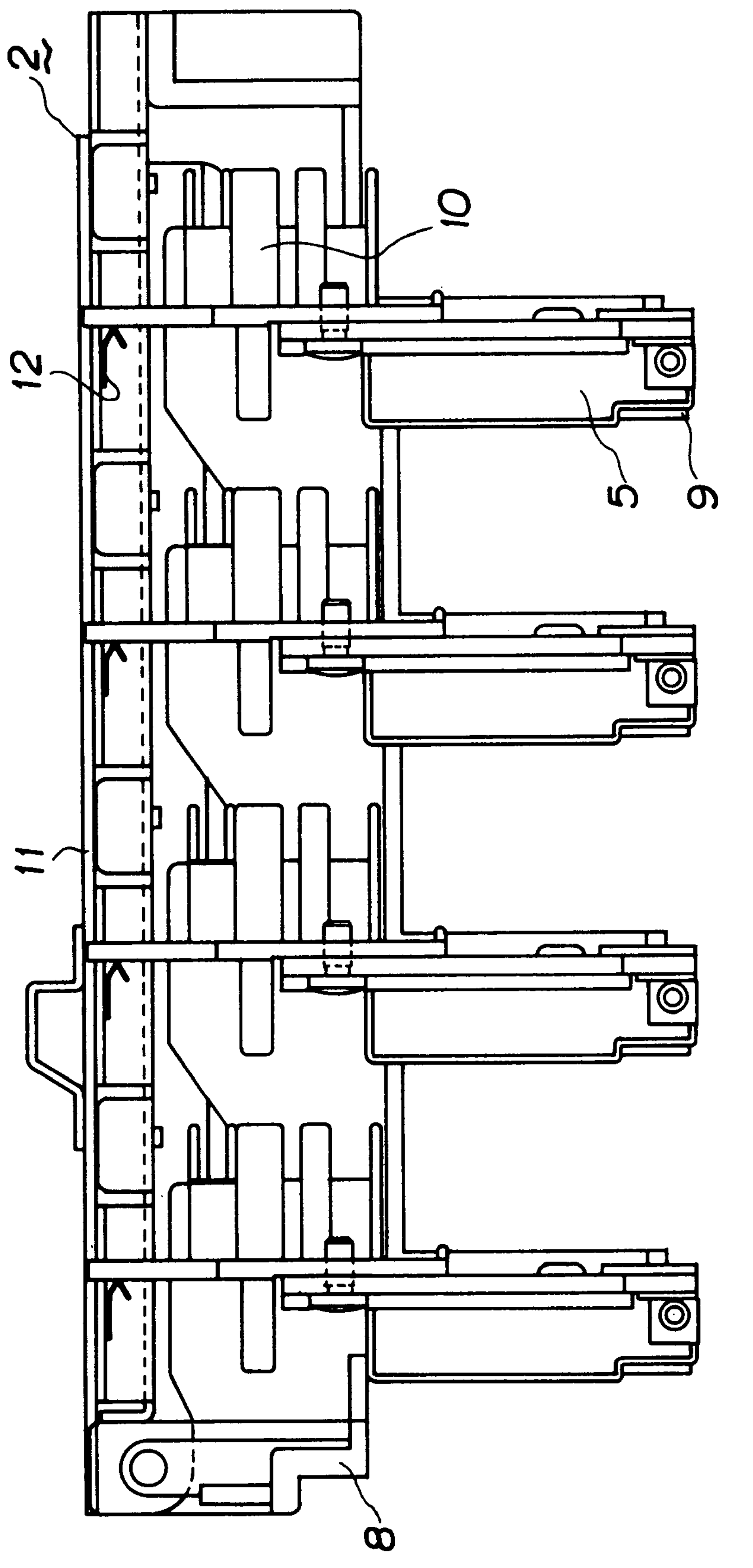
FIG. 6 is a fragmentary front view of the label printer, showing the structure of a head block.

FIG. 6 is a front view of a head block which includes a plurality of heads 5 and a holder 8 for each head 5. In the shown case, four heads 5 are arranged on the head holder 8 in the equally spaced relationship in the conveying direction of the unrolled paper. Each head 5 includes a plurality of ink ejecting ports facing to the unrolled paper, an ink absorbing member 9 disposed on the side surface of the head at the lower end part of the latter, and heat radiating fins 10 disposed at the upper part of the head 5. A head thrusting spring 12 is attached to a retaining plate 11 for the head holder 8 so that each head 5 is biased in a predetermined direction so as to allow the position to be occupied by the head 5 to be determined.

Four raising/lowering arms 13 are attached to the head holder 8 at corners. As shown in FIG. 5 the raising/lowering arms 13 are projected outside of a PHS holder 18 forming an outer shell of the PHS 1. The projected portion of the raising/lowering arms 13 is connected to a wire 17 via a raising/lowering plate 14, a stationary plate 15 and springs 16 so as to allow the head holder 8 to be vertically displaced relative to the unrolled paper 204 serving as a printing medium. The wire 17 extends around a geared pulley 19 and three pulleys 20 disposed on the left-hand and right-hand outer sides of the PHS holder 18, and the opposite ends of the wire 17 are connected to each other with an adjusting spring 17A interposed therebetween. The geared pulley 19 transmits power from a driving unit 4 to the wire 17 via a driving gear 21 and a driving shaft 22, whereby the wire 17 is displaced by these pulleys 19 and 20, causing the head holder 8 to be raised or lowered.

(2.3) Recovering System Unit

Figure 7A:
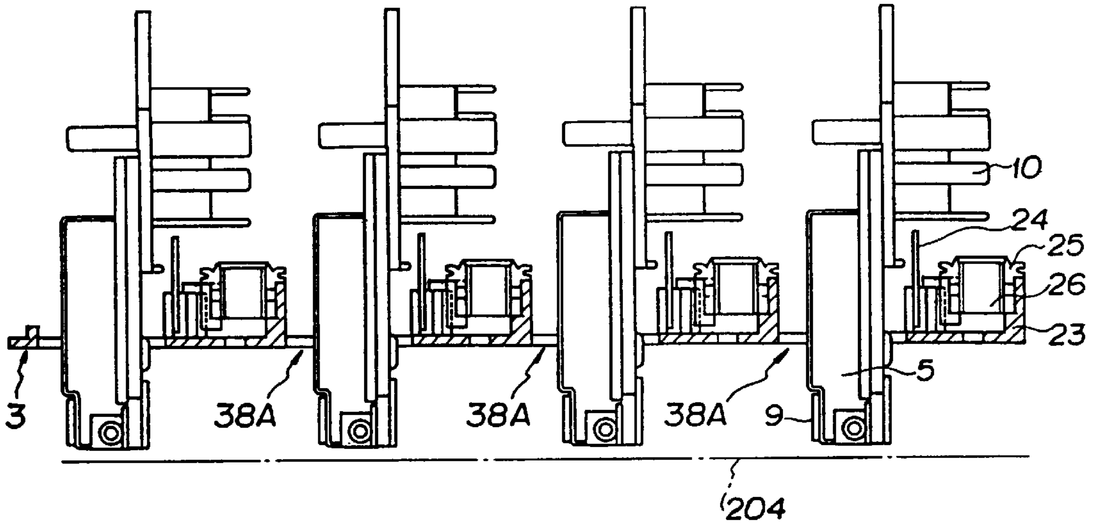
FIG. 7A and FIG. 7B are sectional views which show ink jet heads and recovering units, respectively.
Figure 7B:
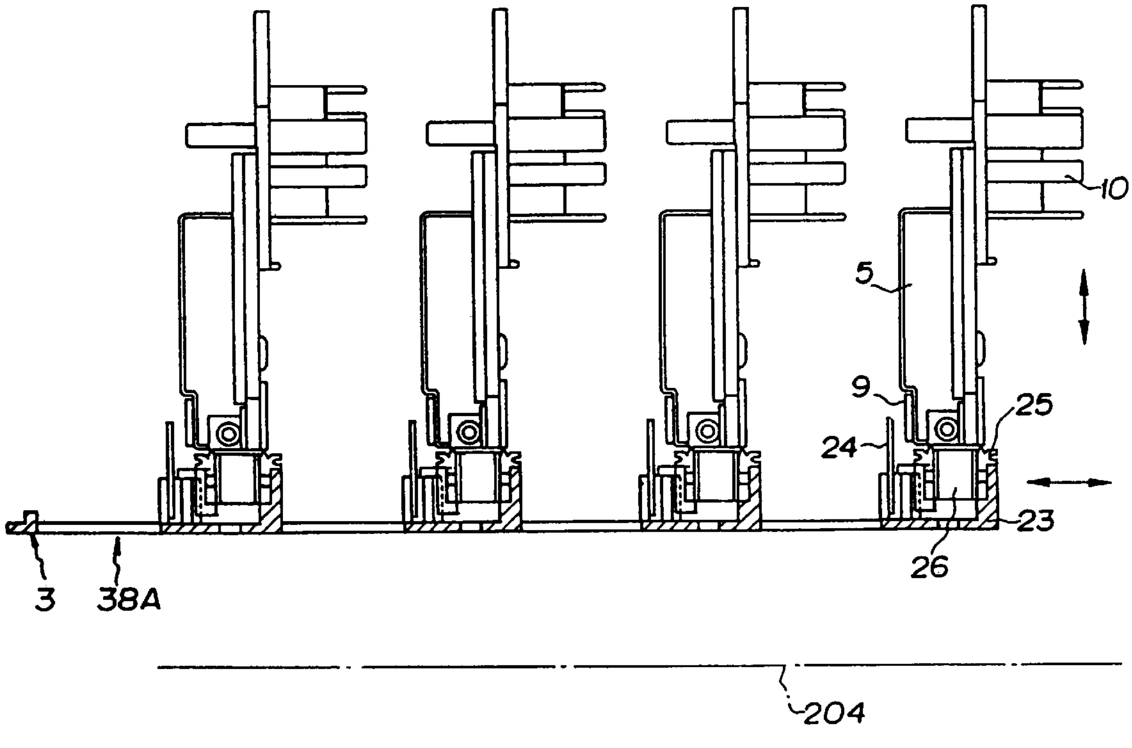
Figure 8:
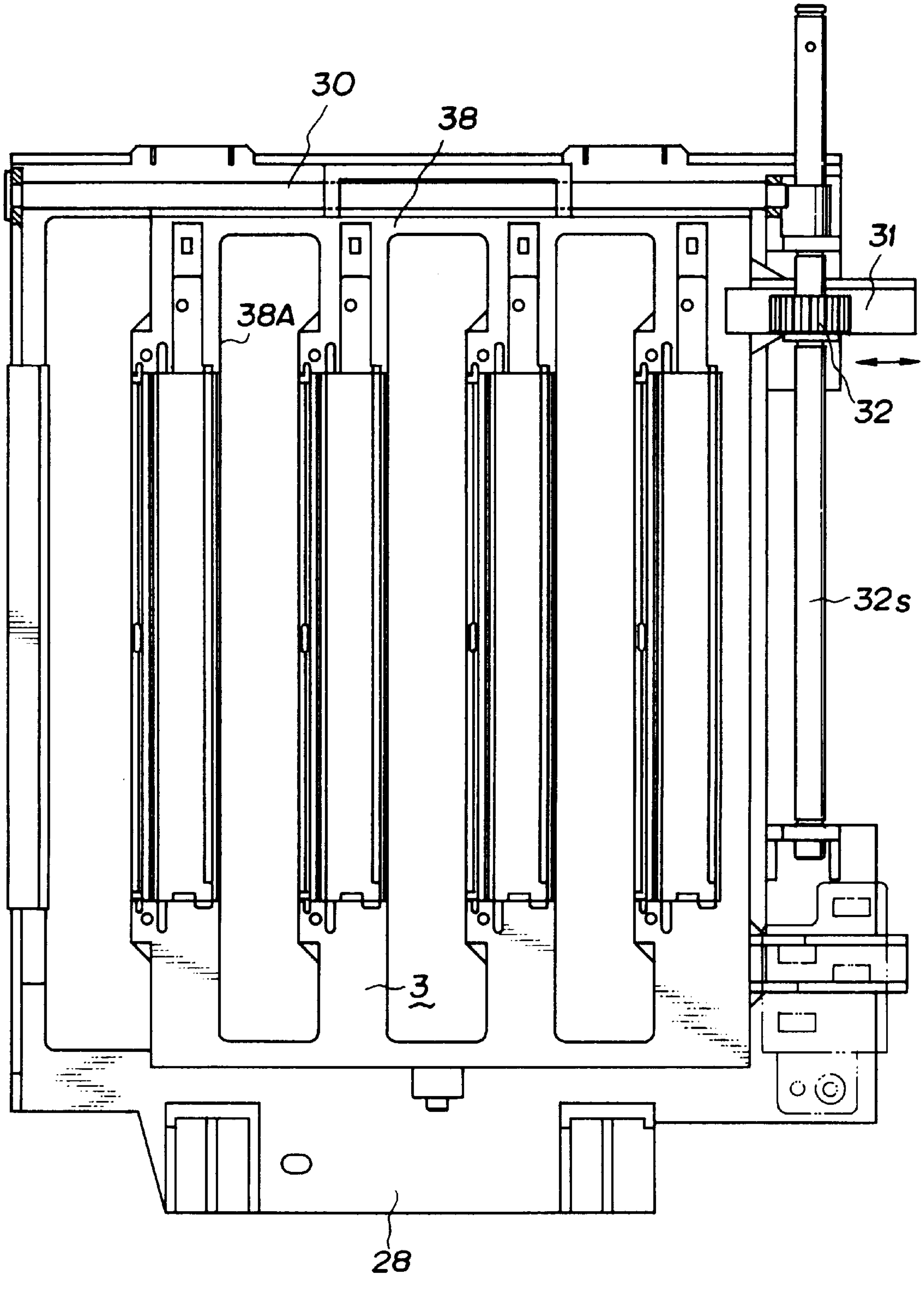
FIG. 8 is a plan view of the recovering units.

FIG. 7A and FIG. 7B are schematic sectional views which show a plurality of heads 5 and a recovering system unit 3, respectively, and FIG. 8 is a plan view of the recovering system unit 3.

The recovering system unit 3 includes a slotted member 38 having a plurality of openings 38A formed therethrough and a plurality of trough portions 23 each disposed adjacent to the each opening 38A to serve as recovering means. The number of opening 38A is equal to that of the heads 5, and each opening 38A is designed in such a manner as to enable part of each head 5 on the ink ejection port side to be inserted therethrough. The recovering system unit 3 can reciprocally be displaced in parallel with the conveying direction (in the leftward/rightward direction in FIG. 7B) of the unrolled paper 209. Each trough portion 23 includes a cap 25 molded of an elastic material such as rubber or the like of which edge portion can surround the peripheral of ink ejection port of each head 5 therewith by coming in contact with an ink ejection port forming surface of the head 5. While the edge portion of the cap 25 comes in contact with the ink ejection port forming surface, the interior of the trough 23 can be held in the sealed state by deflection of the edge portion of the cap 25.

An ink absorbing member 26 is received in each cap 25, and at the time of capping, the ink absorbing member 26 faces to the ink ejection port forming surface with a predetermined distance therebetween. Since the ink absorbing member 26 is disposed in that way, it can absorb ink discharged from the head 5 not only at the time of preliminary ejection to be described later but also at the time of ink recirculation conducted under pressure controlling of the ink system for each head 5. In addition, while the absorbing member 26 is held in the capping state, it can absorb large-sized ink droplets or water droplets adhering to the ink ejection port forming surface in the presence of ink mist or due to dewing. Since each cap 25 is constructed and controlled in such a manner as not to allow the ink absorbing member 26 to come in contact with the ink ejection port forming surface while the cap 25 is held in the capping state, there does not arise a problem that each ink ejection port is clogged with small pieces peeled from the ink absorbing member 26. Absorbed ink is discharged from a discharge port formed on the lower end of the absorbing member 26 by driving a pump or a similar unit. In an embodiment to be described later, both pressurizing and sucking are employed for controlling the pressure for the recirculation of the ink system. However, one of them may be employed.

In FIGS. 7A and 7B, reference numeral 24 denote a blade disposed sideward of the absorbing member 26 to serve as wiping means. To wipe the ink ejection port forming surface of each head 5 to remove fine ink droplets and water droplets (ink droplets and water droplets which can not be absorbed in the absorbing member 26) adhering to the ink ejection port forming surface, the blade 24 is molded of an elastic material. In this embodiment, since the blade 24 wipes only comparatively small-sized ink droplets and water droplets, it can suppressively prevent them from being scattered away therefrom.

If ink droplets to be wiped by the blade 24 are large in size to some extent, they fall down in the trough 23 directly from the blade 24. On the other hand, small-sized droplets are removed by cleaning the opposite side surfaces of the blade 24 with the aid of blade cleaning means such as an absorbing member or the like disposed between adjacent heads.

In addition, an ink absorbing member 9 is disposed on the opposite side to the blade 24 so as to prevent the ink ejection port forming surface from being contaminated by the blade 24 by cleaning the latter again with the ink absorbing member 9 directly before each head 5 is wiped.

The recovering system unit 3 (see FIG. 8) is supported on a recovering plate 28 to slidably move along a guide shaft 30 extending in the conveying direction of the unrolled paper, with the aid, of rolling rollers or the like. The displacement of the recovering system is carried out by combination of a rack 31 with a pinion 32. The rack 31 is made integral with the recovering plate 28, and the pinion 32 is mounted on a recovering system driving shaft 32*s*. Required power is transmitted from a driving system unit 4 to the recovering system unit 3 via the recovering system driving shaft 32*s*.

FIG. 7A shows the state that each head 5 is displaced in the downward direction to be projected outside of the opening 38A of the slotted member 38, and FIG. 7B shows the state that the ink ejection forming surface of each head 5 is capped with the cap 25. In the shown case, a plurality of troughs 23 each serving as recovering means are arranged in the equally spaced relationship with a wide distance enough to allow at least the whole ink ejection portion of each head 5 to pass between adjacent troughs 23, and the holder 8 is constructed such that the heads 5 are arranged in consideration of the aforementioned arrangement of the troughs 23. Thus, the quantity of relative displacement of the heads 5 and the recovering system unit 3 between the printing position and the capping position as viewed in the horizontal direction (a quantity of displacement of the recovering system unit 3 in this embodiment) as well as a time required for conducting the foregoing displacement can be reduced, whereby the whole label printer can compactly be constructed and productivity of each printing operation can be improved. This is because, it is sufficient that the recovering system unit 3 can be displaced between the position where the slotted gap between adjacent troughs 23 faces to the head 5 and the position where the cap 25 received in the trough 23 faces to the head 5.

On the contrary, in the case that a plurality of recovering means are not arranged with a predetermined distance between adjacent recovering means, each head 5 can not be inserted through the slotted gap between adjacent recovering means. Thus, it is unavoidable that a quantity of relative displacement of each head and each recovering system unit is increased. In other words, a space required for escapably displacing the whole recovering system units from the range where a plurality of heads are arranged becomes undesirably necessary. Because of this necessity the whole label printer must be designed and constructed with large dimensions, and moreover, the time required for conducting the foregoing escapable displacement is largely elongated.

In this embodiment, to cool each head 5, a fin 10 extending in the direction of air blowing effected by a cooling unit 7 (i.e., in the direction perpendicular to the paper surface as viewed in FIG. 7) is disposed at the upper part of the head 5 (on the opposite side to the range where ink ejection ports are disposed). Since air blowing is effected along the cooling fin 10 in parallel to the same, very little air reaches the ink ejection port side with only a small possibility that ink ejection is adversely affected. Additionally, in this embodiment, since each trough 23 serving as recovering means is located between adjacent heads 5 at the printing position (see FIG. 7A), the ejecting port forming plane on the head is effectively shielded from the blowing of the cooling air without any possibility that the ink ejection state is undesirably disturbed.

FIGS. 9A to 9D are schematic views which explain the positional relationship between the head 5 and the trough 23, respectively.

Figure 9A:
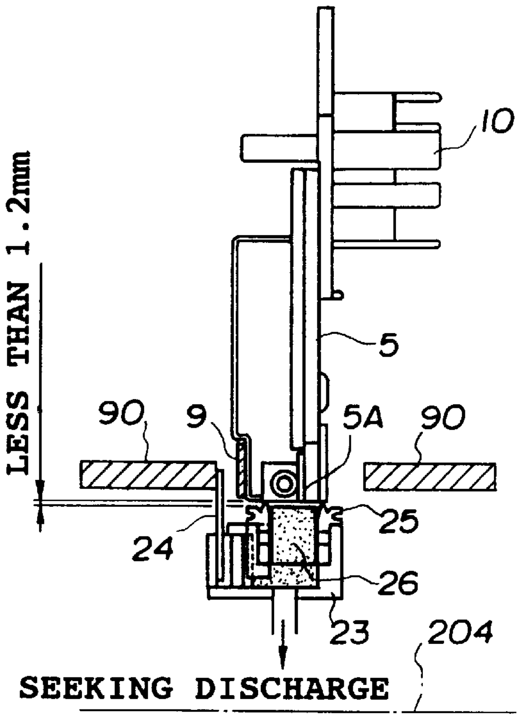
FIG. 9A to FIG. 9D are illustrative views which explain the positional relationship between the ink jet head and a trough portion, respectively.

FIG. 9A shows the capping position which is used at the time of capping with the head not put in practical use, at the time of pressurized recirculation to be described later, and at the time of preliminary ejection. At the capping position, an ink ejection port forming surface 5A of the head 5 and an absorbing member 26 closely face to each other with a predetermined gap therebetween. Incidentally, it has been confirmed that the head 5 exhibits excellent wiping properties when the foregoing gap is set to about 1.2 mm.

Figure 9B:
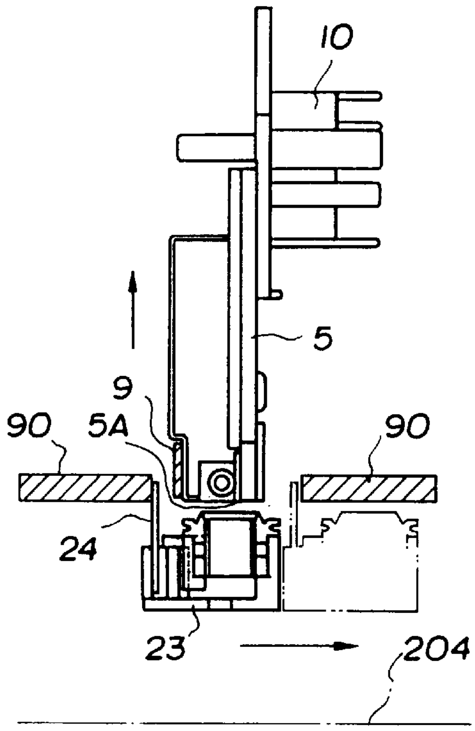

Next, FIG. 9B shows the state that the head 5 is located such that the upper part of the blade 24 is raised up by a predetermined distance above the ink ejection port forming surface 5A so that the ink ejection port forming surface 5A is wiped with the blade 24 by displacing the trough 23 from the position represented by solid lines to the position represented by phantom lines.

Figure 9C:
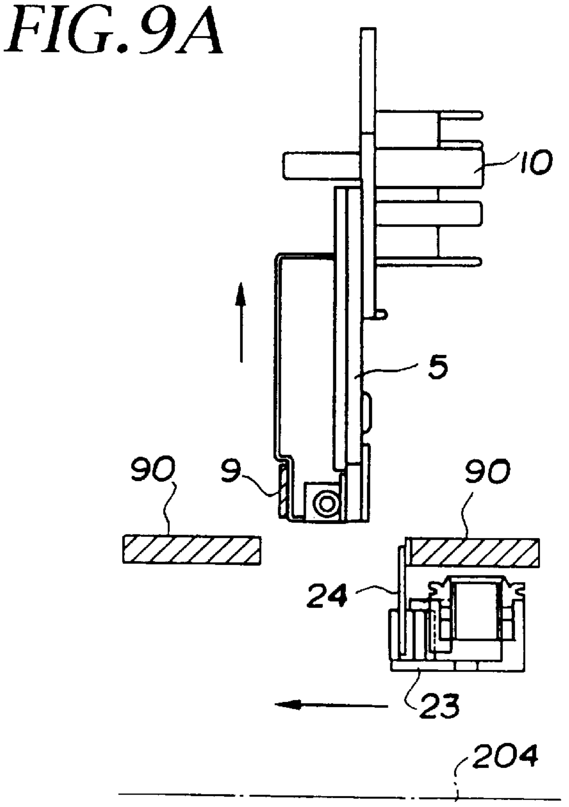
Figure 9D:
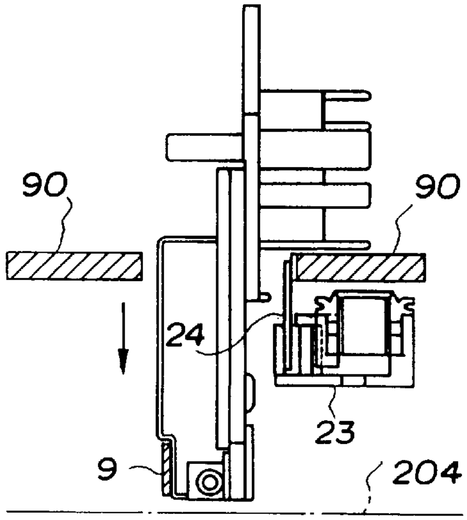

FIG. 9C shows the state that after completion of the wiping operation, the head 5 is retracted without any contact of the blade 24 with the head 5 when the trough 23 is displaced to the position where it faces to the head 5 in order to conduct preliminary ejection, and FIG. 9D shows the state that the head 5 is displaced in the downward direction in excess of the position shown in FIG. 9A and FIG. 9B to reach the position where it faces to the unrolled paper 204 to perform a printing operation.

In the drawings, reference numeral 90 denotes an absorbing member which is disposed between adjacent heads 5. The absorbing member 90 can collide against the opposite surfaces of the blade 24 so as to clean the blade 24. The absorbing member 90 is shown such that is immovably held. Alternatively, it may be raised and lowered together with the head 5.

FIG. 10 is an illustrative view which shows by way of example the structure of a driving system unit 4 for displacing each head 5 in the upward/downward direction, and moreover, displacing recovering means in the horizontal direction.

This driving system unit 4 is arranged on the rear surface of the PHS holder 18 and includes two stepping motors 33 and 34 which displace the head holder unit 2 and the recovering system unit 3 by driving shafts 22 and 32*s* via a train of speed reduction gears. Incidentally, it is sufficient that head holder unit 2 and the recovering system unit 3 conduct relative displacement in the upward/downward direction as well as in the leftward/rightward direction. Alternatively, modification may be made such that, e.g., the recovering system unit 3 is immovably held and only the head holder side can be displaced.

The stepping motor 33 for raising and lowering the heads includes a mechanism for preventing the heads from falling down due to the dead weight of each head when the power source is turned on. This mechanism is composed of a one-way solenoid 34, a ratchet arm 35, a spring 36 and a ratchet gear 37. When the power source is turned off, electricity is fed to the solenoid 34 so that the ratchet arm 35 is brought in locking engagement with the ratchet gear 37 so as to prevent heads from falling down. On the contrary, when the power source is turned on, the ratchet arm 35 is disengaged from the locking engagement.

FIG. 11 is a plan view which shows by way of example the structure of a cooling unit 7.

This cooling unit 7 is arranged on the rear surface of the PHS holder 18 and includes a fan 40 serving as an air blowing source, a duct 38 for blowing cooling air toward a heat radiating fin 10, a mounting platform 39, and a dust-proof filter 41 as essential components. Air is taken in the cooling unit 7 through the filter 41, and the intake air is blown toward the heat radiating fin 10 in order to cool the heads 5, as desired.

(3) Printing Medium Conveying Mechanism

FIG. 12 and FIG. 13 are explanatory views which show a conveying system for a printing medium. FIG. 12 is a schematic side view which shows the whole conveying system and FIG. 13 is a perspective view which shows by way of example a paper roll available as a printing medium usable for the label printer.

In this embodiment, the conveying system is substantially composed of three elements, i.e., a roll feeding unit 201 for feeding a printing paper portion by unrolling a paper roll 204, a conveying unit 202 for practically conveying the unrolled printing paper on the housing side, and a cutter unit 215 for cutting the printed paper to have a predetermined length. In the shown case, these units are made integral with each other. Alternatively, they may be separated from each other. For example, a cut sheet feeding unit may be substituted for the roll feeding unit 201, and a printed paper winding unit may be substituted for the cutter unit 215.

(3.1) Roll Feeding Unit

FIG. 13 is a perspective view which shows by way of example the structure of a paper roll 204. This roll-shaped paper 204 is one of printing mediums which can be used for the label printer, and it is usually called label paper. A various kind of size is used for a label 217 depending on a utilization field of the latter. In this embodiment, a label 217 having a maximum width of 4 inch or less can be used for the label printer. A series of labels 217 are adhesively placed on peeling paper or ground paper that is called a separator 216 in the equally spaced relationship.

In addition to the label paper shown in FIG. 13, a printing medium itself wound in the form of a roll can be used as roll-shaped paper.

The roll feeding unit 201 serves to feed the roll-shaped paper 204 to the conveying unit 202 to be described later. As shown in FIG. 12, the roll feeding unit comprises a housing having a space in which the roll 204 is received, the roll 204 is placed on a conveying belt 205 which is disposed below the space in the roll feeding unit 201, and in response to a command instructing a printing standby state, the outer periphery of the roll 204 is rotationally driven as the conveying belt is actuated.

When the paper roll is unrolled by driving the outer periphery thereof like in the above-described manner for the purpose of paper feeding has the following advantages in comparison with the case that a paper roll is rotatably supported on a center drive shaft for the same purpose. Specifically, one of them is that setting of the paper roll to a paper feeding portion is completed merely by placing the roll on the conveying belt 205, another one is that a power transmission mechanism such as a train of speed reduction gears or the like required in the case of driving of the center shaft can be omitted or remarkably simplified, and another one is that it becomes possible to feed paper by a constant quantity at constant speed driving irrespective of a diameter of the paper roll as it is unrolled.

In this embodiment, as shown in FIG. 12, the conveying surface of the conveying belt 205 is inclined so as to allow the roll to be liable of being displaced in a predetermined direction, and moreover, the roll is caused to rest against a side plate 245. With this construction, a loop of paper caused by the loosened state on the unrolled side can easily be formed to some large extent.

Thus, the foremost end of the unrolled paper passes by a loop sensor 207, and subsequently, the unrolled paper is delivered to the paper conveying unit 202 via a slantwise conveying unit 208.

Next, the loop sensor 207 and the slantwise conveying unit 208 will be described below.

The loop sensor 207 is used to produce a loosened state of the printing medium in the form of a loop between the roll-shaped paper and the conveying unit 202, and moreover, it is controlled such that the printing medium is conveyed by the conveying unit 202 with a constant intensity of tension but without any influence caused by the back-tension from the roll-shaped paper. In this embodiment, the loop sensor 207 is prepared in the form of a photosensor which comes in contact with the loop of the unrolled paper 204 and of which optical axis is turned on or off by a loop plate 206 serving as an actuator adapted to be displaced as the loop disappears. Any type of loop sensor may be employed, provided that it is proven that it can detect the presence or the absence of a loop. The loop sensor is typically exemplified by an electrical contact switch and an electrostatic capacity switch for detecting a distance between the loop plate 206 and the switch itself.

FIG. 14 is a circuit diagram which shows by way of example the structure of a driving and controlling system for the conveying belt 205 which is driven and controlled in response to an output from the loop sensor 207. In the figure, reference numeral 207D denotes a driving portion such as a motor or the like for driving the conveying belt 205, and reference numeral 207S denotes a switch which is disposed on a power supply line extending from the housing of the label printer. The switch 207S serves to shut the power supply line in response to an output from the sensor 207 (in the case that a predetermined quantity of loop is formed) but keep the power supply line in the closed state when no output is generated from the sensor 207 (in the case that the loop can not be detected).

Reference character F/R denotes a signal which is sent from the main housing of the label printer for determining that the conveyer belt is actuated in the normal direction (i.e., in the unwinding direction of the roll-shaped paper) or determining that the conveying belt is actuated in the reverse direction (i.e., in the winding direction of the unrolled paper). This signal F/R is generated if necessary. In this embodiment, the label printer is constructed such that the unrolled paper can be fed back by the conveying unit 202 in the main housing as will be described later. In the case that there is a possibility that an undesirable quantity of loop is formed in the roll feeding unit 201 due to reverse feeding of the unrolled paper, it is sufficient that the conveying belt is reversely driven corresponding to the reverse feeding of the unwound paper. In this case, an electricity supplying operation is shifted to ON or OFF in response to OFF or ON of the sensor 207, and subsequently, reverse driving can be stopped when no loop is detected by the sensor 207.

The slantwise feeding unit 208, disposed above the space in which the roll is received, has functions that the unrolled paper 204 is brought in the paper feeding unit 202 from a predetermined position and that paper conveying is carried out in such a manner that the unrolled paper 204 is caused to collide against a reference guide 219 located at the foremost end of the slantwise feeding unit 208 in the direction of an axis of the roll.

In this embodiment, unrolled paper conveyance is shifted to ON or OFF in response to OFF or ON of the sensor 207. Provided that the sensor 207 is constructed in such a manner as to enable the variation of a quantity of loop to be detected, the conveyance belt 205 may be driven at all times. Otherwise, a quantity of driving (i.e., a quantity of feeding of the unrolled paper) may be controlled corresponding to the variation of a quantity of loop. At any rate, feeding of the unrolled paper to the roll feeding unit 201 can be carried out highly independently of the conveyance of the unrolled paper in the conveying unit 202 in the main housing of the label printer. Thus, connection of signals between both the units 201 and 202 can be simplified, and moreover, a magnitude of load to be borne by a controlling section in the main housing of the label printer can be reduced. These facts are advantageous for making it possible to separate the roll feeding unit 201 from another one.

A plurality of sensors may be disposed for assuring that respective components constituting the roll feeding unit 201 are stopped after the roll-shaped paper is completely unrolled and that this fact is instructed to the main housing of the label printer. In view of the fact that the end of the unrolled paper is suspended from the slantwise conveying unit 208 on completion of the unwinding operation, a sensor system available for the foregoing fact may be composed of an actuator adapted to be displaced on contact with the suspended part of the unrolled paper and a sensor adapted to be turned on or off depending on a magnitude of displacement of the actuator.

In the embodiment discussed above, the roll feeding unit 201 feeds the unrolled paper 204 by rolling the paper roll with the conveying belt which is in contact with the periphery of the paper roll. However, it should be noted that embodiments applied for the present invention are not limited to the above. It may be possible to use a roller or a plurality of rollers placed in contact with the periphery of the roll 204 so that the roll 204 is driven by the roller or rollers at the periphery of the roll. In the case that a plurality of rollers are used, it may be sufficient to drive at least one roller.

(3.2) Conveying Unit

The conveying unit 202 is located below the printing head station and includes a conveying roller 210 to be driven by a driving system (not shown), a follower roller 211, a conveying belt 212, and a paper discharging roller 219 as essential components.

As the unrolled paper 204 is fed from the roller feeding unit 201, it is fed further by the conveying unit 202 at a predetermined speed. With the label printer constructed in the above-described manner, the foremost end of each label is detected as a trigger for starting a printing operation, and for this purpose, a TOF (Top of Form) mark is preliminarily printed on the rear side of the unwound paper 204. To detect each TOF mark, a TOF sensor 209 is disposed at the rear end part of the conveying unit 202. Thus, a size of each label can be detected based on the gap between adjacent TOF marks on the assumption that the foregoing gap is kept constant, and moreover, the range available for each printing operation can be detected.

In this embodiment, each TOF mark can be detected using a reflective type sensor 209, and moreover, it is possible to detect the position where each printing operation is started and the size of each label using a separator having high light permeability and a light permeable type sensor. In addition, a label presence/absence sensor 220 is disposed rightward of the TOF sensor 209 to detect whether a label paper is present or absent, whereby no printing operation is performed when any label paper is not present. A jam detecting sensor 221 is disposed on the downstream side so that a malfunction of paper jamming can be detected by the jam detecting sensor 221 in cooperation with the TOF sensor 209.

(3.3) Cutter Unit

A cutter unit 215 is one of units arranged on the discharge side of the paper conveying unit 202 and has a role for cutting the unwound paper 204 to have a predetermined length.

The cutter unit 215 is composed of one set of stationary blade and rotary blade, and a timing for cutting the unwound paper 204 is determined in operative association with a conveying speed of the paper conveying unit 202 and detection of each TOF mark.

After a final printed label paper is cut, the paper conveying unit 202 and the conveying belt 205 are reversely operated so that the unrolled paper 204 is returned to a printing standby position.

In the case that a unit for continuously winding a band of paper is substituted for the cutter unit 215, the same loop as mentioned above can be formed so as not to allow the conveyance in the conveying unit 202 to be adversely affected by the winding operation.

For example, such a winding unit (printing medium winding unit) as mentioned above can be constructed such that another feeding unit 201 as shown in FIG. 12 is arranged in the symmetrical relationship relative to the conveying unit 202, a controlling system as shown in FIG. 14 is arranged, the same conveying belt as the conveying belt 20S is driven when an occurrence of predetermined loosening (loop) is detected, and driving of the foregoing conveying belt is stopped when appearance of the loop is not detected. With respect to a conveying belt for placing a wound roll-shaped printing medium thereon, a measure may be taken such that the roll portion of the printing medium conveyed from the conveying unit 202 side rests against a side wall by utilizing a tendency of causing the printing medium to move in the opposite direction to the advancing side to the roll portion, whereby a loop can easily be enlarged. Incidentally, the fore end part of the printing medium may be wound about a spool or the like which in turn is placed on the conveying belt so as to enable an initial winding operation to be smoothly performed.

(3.4) Other Embodiment of the Roll Feeding Unit

Figure 35:
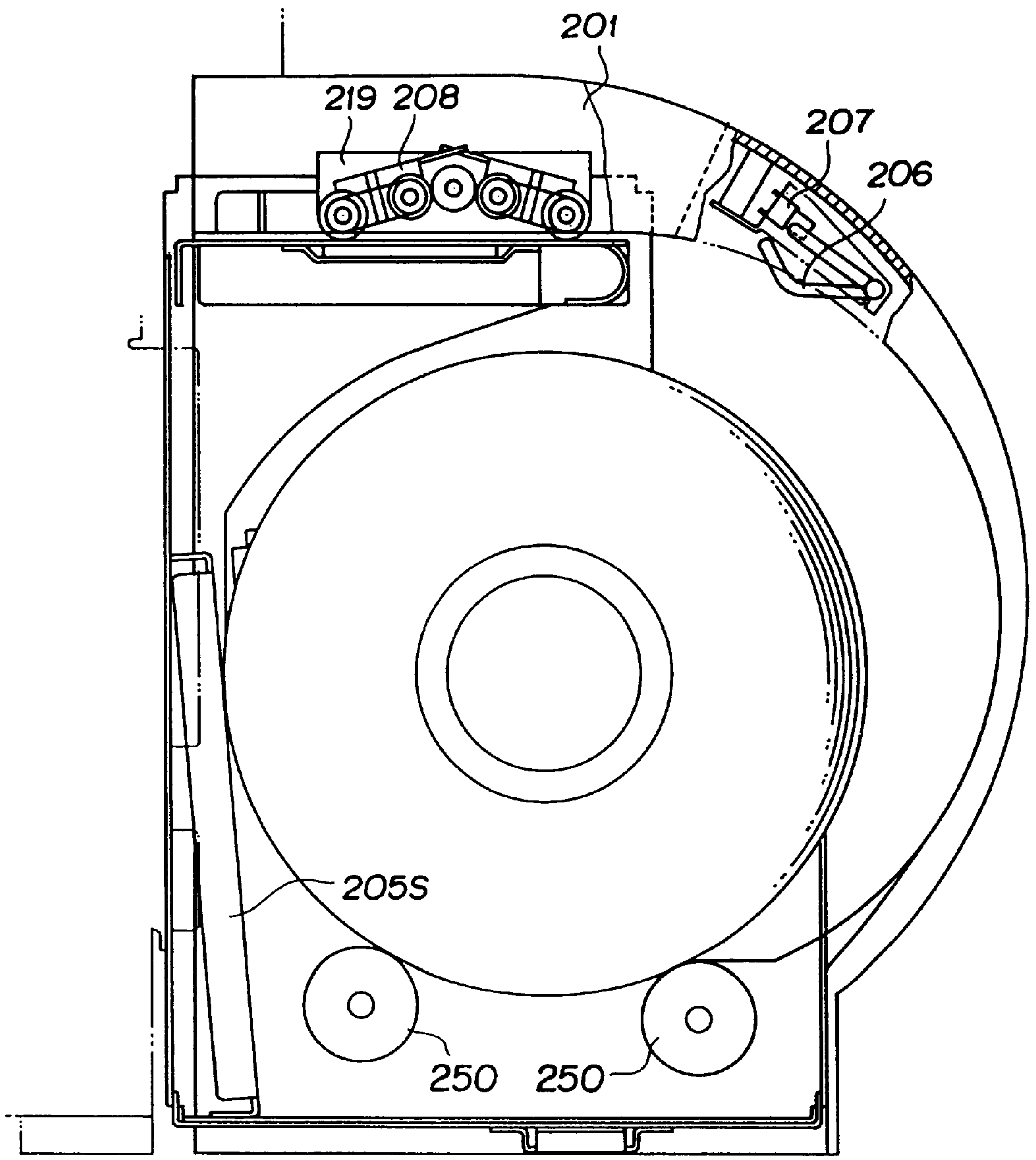
FIG. 35 is a side view of a roll feeding unit, showing that two rollers each molded of a resin are used for unwinding a roll-shaped paper.

In the first embodiment as mentioned above, the roll feeding unit is exemplified by the conveying belt for unrolling the roll-shaped paper by driving the outer periphery of the latter. It is applicable as a second embodiment that the roll feeding unit is provided two conveying rollers 250 as shown in FIG. 35. In this case, it is desirable that each roller is molded of a synthetic resin having a small frictional coefficient relative to the roll-shaped paper. With this construction, an adequate intensity of tension can easily be maintained because when an intensity of tension in excess of a necessary level is applied to the roll-shaped paper, slippage takes place between the roll-shaped paper and the two rollers (refer to a paragraph "Precedent treatment for a blank paper and subsequent treatment for the blank paper" to be described later).

The same structure as mentioned above can be employed for a winding unit.

(3.5) Embodiment in the Case that a Cut Sheet Feeding Unit is Used:

Description will be made below with respect to operations of a printer (referred to as a card printer) in the case that business cards, postcards or similar cards, i.e., cut sheets are used as printing mediums.

Figure 36:
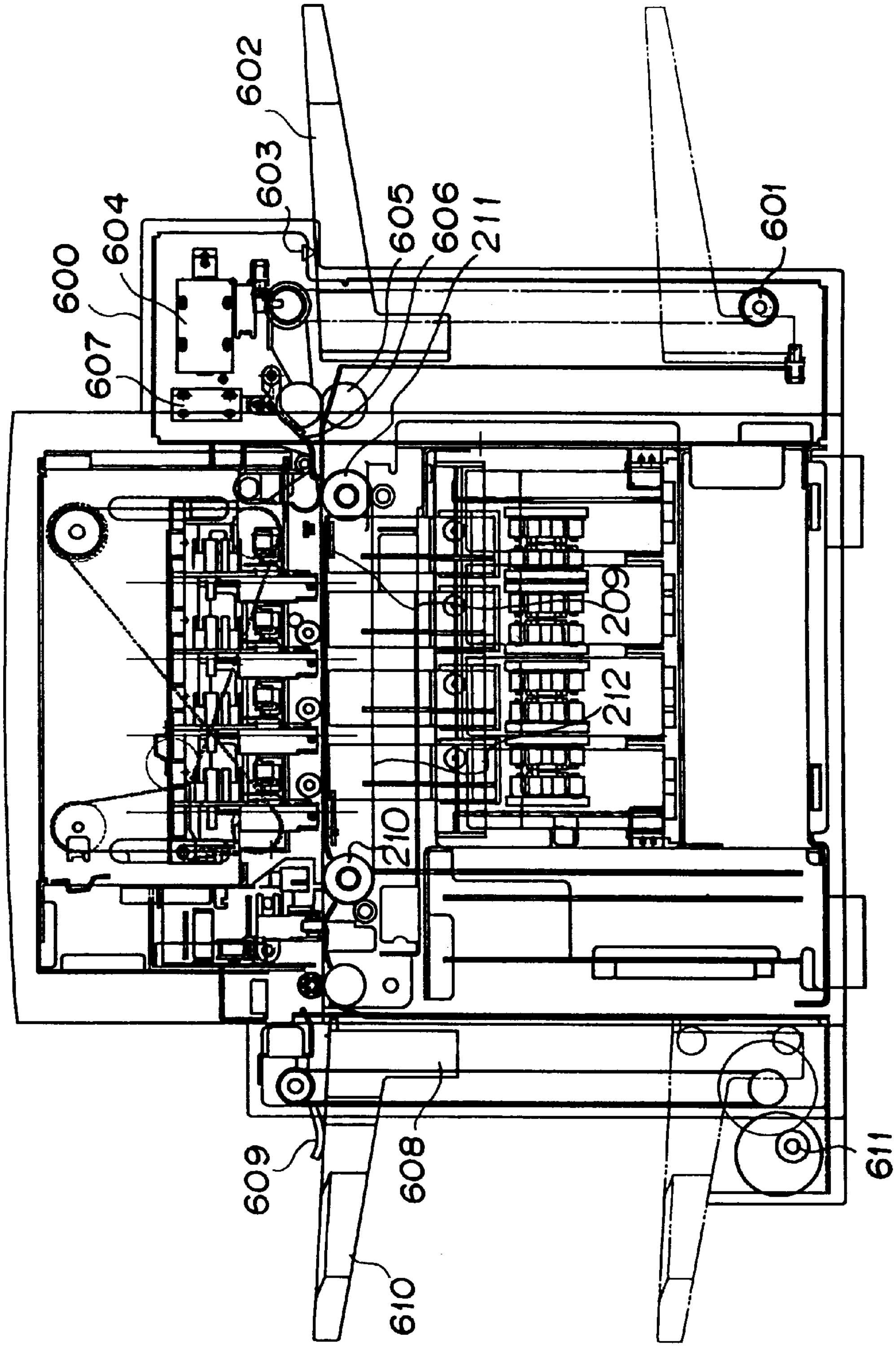
FIG. 36 is a sectional view of a printer in the case that a card printer is used.

FIG. 36 is a sectional view of a printer in which cut sheets are used, and corresponds to FIG. 12 which shows a printer in which roll-shaped paper is used. As is apparent from two sectional views of FIG. 12 and FIG. 36, a common apparatus can be utilized as a printer main body located at the central position (hereinafter referred to as a core) on the assumption that a maximum width of a printing medium is set to a same value (e.g., 4.3 inch). In other words, printing can be executed for plural kinds of printing mediums by changing the kind of printing medium feeding apparatus fitted at the printing position with the aid of PHS set forth above.

A cut sheet feeder 600 shown in FIG. 36 includes a lift 602 adapted to be vertically driven by a lift motor 601, a paper surface detecting sensor 603 comprising a photointerrupter for detecting a printing surface of an uppermost card, a pickup solenoid 604 for picking up the uppermost card, a separating motor 605 for driving an opposing pair of separating rollers 710 and 730 (see FIG. 39) for separating the uppermost card from a next card, a shutter 606 disposed at the foremost end of each card for correcting slantwise movement of the card, and a shutter solenoid 607 for vertically displacing the shutter 606. In addition, a stacker 608 for stacking printed cards thereon is arranged with the core. The stacker 608 includes a sensor 609 for detecting the upper surface of a card and a stacker lift motor 611 for lowering a stacker lift 610 in the downward direction by a predetermined quantity when the sensor 609 detects the paper surface.

Figure 37:
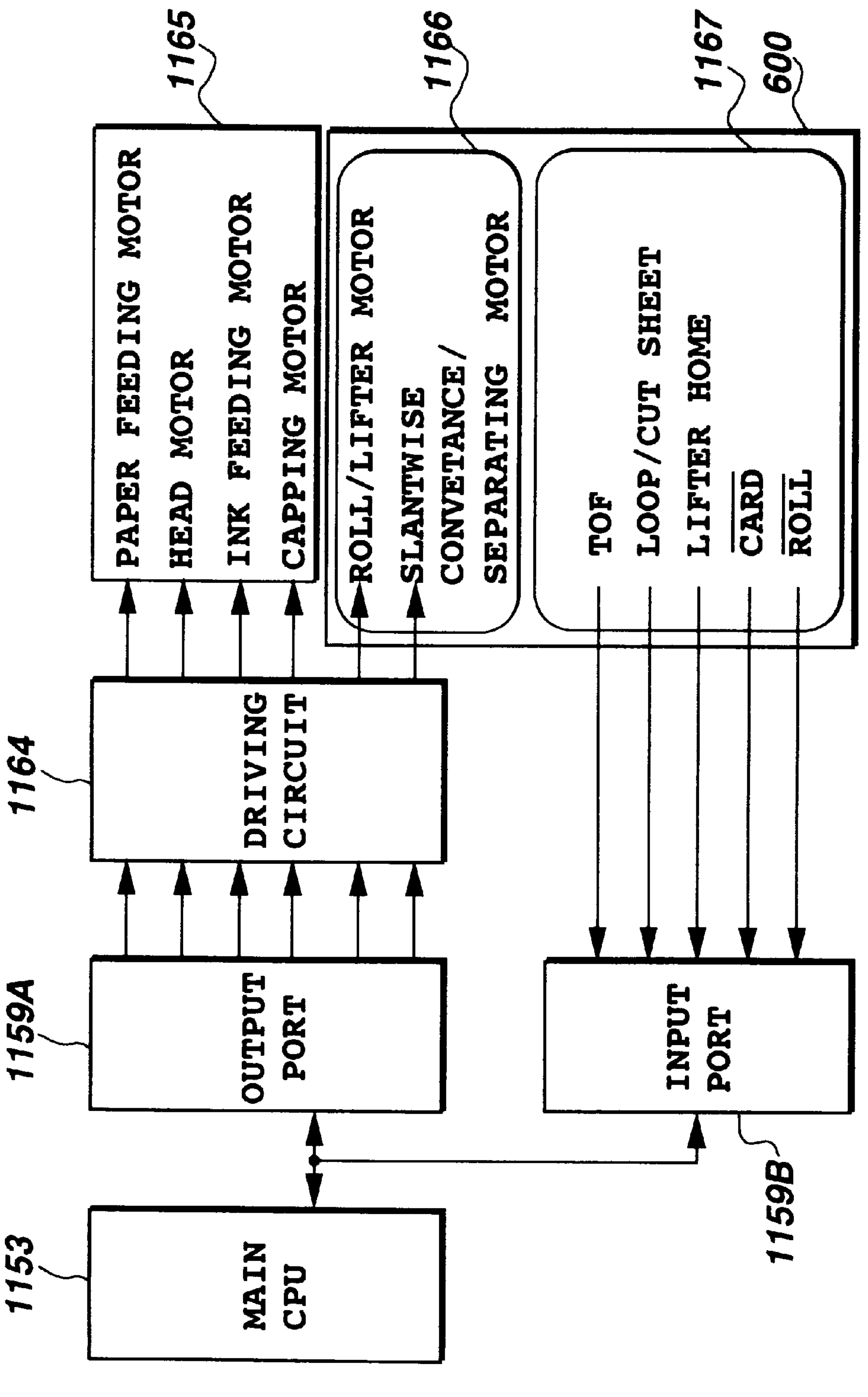
FIG. 37 is a hardware block diagram which shows connection between actuators and sensors associated with feeding control of a printing medium.

FIG. 37 is a part of the electrical block diagram shown in FIG. 20, i.e., a hardware block diagram which shows the connecting relationship among actuators drivably controlled by CPU 1153 via an input/output port, sensors associated with feeding control of the printing medium and the CPU 1153. Motors controlled in common by CPU 1153 regardless of the kind of printing medium are exemplified by a paper feeding motor for driving a paper conveyance belt in the core, a head motor for simultaneously displacing four color heads in the vertical direction, an ink feeding motor for feeding ink and recirculating it in the pressurized state, and a capping motor for displacing a recovering system unit in parallel to the printing surface.

The following actuators are noted as control objects which vary depending on the kind of printing medium. Specifically, a roll motor for driving a roll conveyance belt 205 when a roll-shaped paper 204 is used as a recording medium, and a slantwise conveyance motor for driving a slantwise conveyance unit 208 for preventing the unwound paper from being slantwise displaced. These motors are arranged in the roll feeding unit 201. The fact that a roll feeding unit 201 is being used is denoted by a discrimination signal −Roll=0 (wherein a symbol '−' represents active low) appearing in a sensor circuit 1167. This discrimination signal is issued from a sensor which recognizes that the core and the roll feeding unit are held in a predetermined connecting relationship. With this discrimination, it can be judged that there arises a necessity for drivably controlling a motor for the downstream side cutter unit 215. In the case that plural kinds of units on the downstream side are present corresponding to one kind of feeding unit, it is also acceptable that a sensor for generating a similar discriminating signal is disposed between the downstream side unit and the core.

In the case that the cut sheet feeder 600 is fitted to the core on the upstream side, a sensor recognizes that it is held in a predetermined connecting relationship so that a discrimination signal −Card in the sensor circuit becomes −Card=0. In this case, a driving circuit 1164 drivably controls the lift motor 601 and the separating motor 605 disposed in the cut sheet feeder 600 in place of the roll feeding motor and the slantwise conveyance motor as mentioned above. Thus, a control signal automatically varies depending on the kind of a printing medium feeding unit fitted to the core.

When the cut sheet feeder 600 is used, an input TOF in the sensor circuit 1167 is a signal detecting the foremost end of a cut sheet. The foremost end of a cut sheet is detected by a reflective type sensor disposed below the paper conveying belt. When roll-shaped paper is used, the reflective type sensor detects a black band marked on the opposite side to the printing surface. When a cut sheet is used, it detects white color of the sheet itself. To facilitate this detection, the opposite surface to a reflective type TOF sensor is previously coated with black having a low reflection coefficient so that a difference of reflection coefficient between when a cut sheet is located above the reflective type sensor and when the cut sheet is not located above the reflective type sensor is enlarged. The active level of a signal used for detecting the foremost end of the paper is reversed corresponding to a paper sheet to be used.

Incidentally, it is also acceptable that a permeable type optical sensor is disposed for a cut sheet feeding unit and a reflective type optical sensor is disposed for a roll-shaped paper feeding unit, respectively, so as to detect respective outputs from the sensors. In the case that a paper roll is used, a loop/cut sheet signal is used as a signal for detecting deflection (loop) of the paper, and in the case that a cut sheet is used, the loop/cut sheet signal is used as a signal for detecting a home position (HP) of the lifter 602. In such a manner, with a control program for the core, a different kind of sheet feeding unit can selectively be driven by executing a different control routine depending on the sheet feeding unit connected to the core with the aid of a same input port and output port.

Further, the TOF sensor may be disposed either on the sheet feeding unit or the core. In the last mentioned case, it is recommendable that a reflective type sensor to be used when the roll feeding unit is fitted and a permeable type sensor to be used when the cut sheet feeding unit is fitted are disposed on the core so that one of them is used by shifting in response to the discrimination signal −Roll or −Card.

Figure 38:
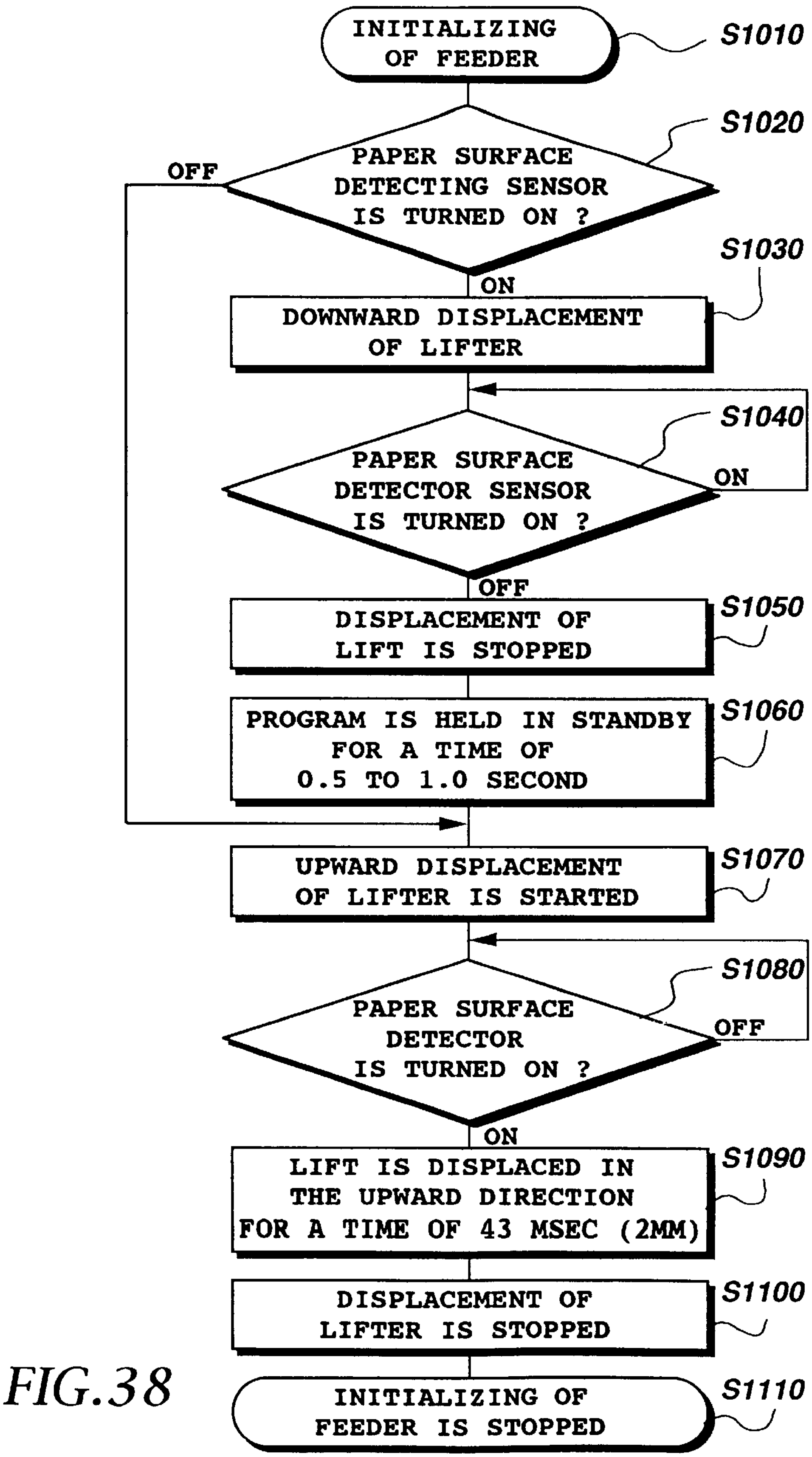
FIG. 38 is a flowchart which shows initializing operation when a cut sheet feeder 600 is connected to the printer.

FIG. 38 is a flowchart which shows an initializing operation when the fact that the cut sheet feeder 600 is connected is recognized. When the paper surface of an uppermost sheet is detected by the paper surface detecting sensor 603 at Step S1020, the main CPU 1153 first outputs a signal for displacing the lift 602 in the downward direction (S1030) until the paper surface disconnects away from the sensor 603 (S1040), and stopping the lift (S1050). The program flow is held in the standby state for a period of 0.5 to 1.0 seconds until the lift is completely stopped (S1060) and thereafter, the lift is raised up (S1070). After the lift is raised up for a period of 43 msec (about 2 mm) (S1090) from the time when the sensor 603 detects contact with the paper surface again (S108C), displacement of the lift is stopped (S1100). As described hereinbefore, an initializing operation of the cut sheet feeder 600 is completed (S1110). In the case that the paper surface is not initially detected in Step S1020, the program flow is jumped to Step S1070 without any displacement of the lift in the downward direction, and initialization is completed by practicing subsequent steps 1080 to S1100. After a printing operation is started, the lift is raised up every time the paper surface detecting sensor 603 is turned off, and displacement of the lift in the upward direction is stopped when the surface detecting sensor 603 is turned on.

Figure 39:
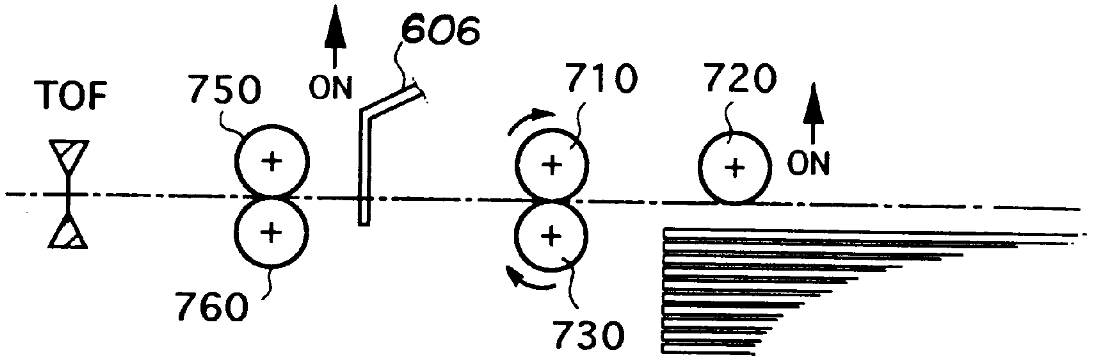
FIG. 39 is an illustrative view which shows arrangement of a conveyance system.
Figure 40:
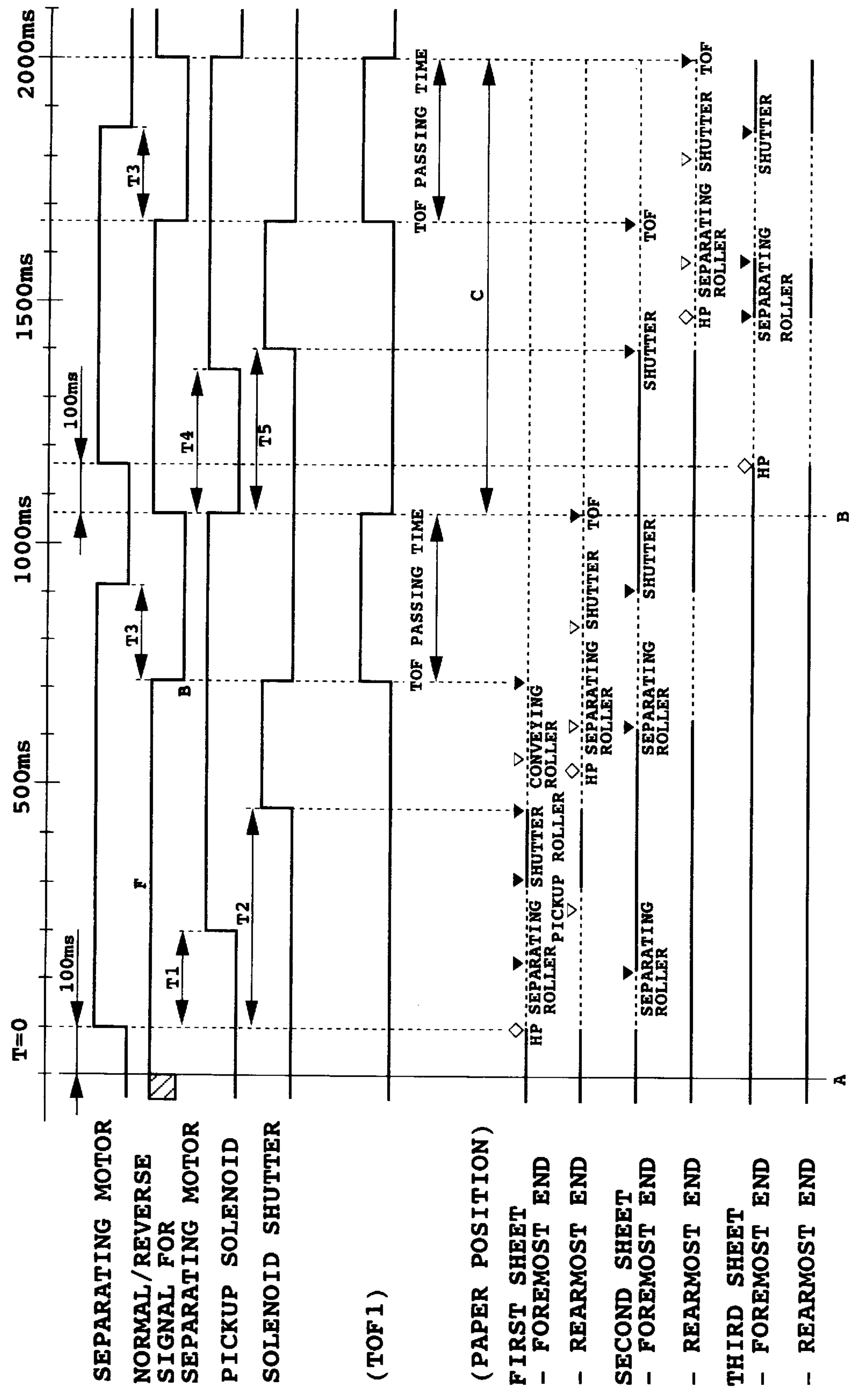
FIG. 40 is a drive timing diagram.

An example of pickup controlling for picking up a single cut sheet (card) will be described below with reference to an arrangement view of FIG. 39 and a driving/controlling timing diagram of FIG. 40. When a command for performing a printing operation is generated, the main CPU 1153 first activates the paper conveying motor to drive the paper conveying belt 212 at a constant speed, e.g , 150 mm/sec. Next, rotation of the separating motor 605 in the normal direction is started (at T=0), and the separating roller 710 operatively connected to the separating motor and the pickup roller 720 are rotated. Then, the foremost end of each card fed by the friction of the pickup roller 720 reaches the position between an opposing pair of separating rollers 710 and 730 after a predetermined period of time elapses. A certain intensity of force is applied to the separating roller 730 so as to rotate in the same direction as that of the roller 710, causing force to be exerted on the upper surface and the lower surface of each card in the opposite directions in order to prevent two cards from being fed simultaneously in the close contact state.

After the foremost end of each card reaches to the separating rollers 710 and 730, the pickup solenoid 604 is driven at a time of T=T1, causing the pickup roller 720 to be parted away from the card. The card is conveyed by the separating roller 710 until the foremost end of the card collides against shutter 606 having a face perpendicular to the card feeding direction. In the case that the card is slantwise conveyed, slippage occurs between the separating roller 710 and the card at the time of collision, resulting in the slantwise conveyance of the card being corrected. After completion of the correction, the shutter solenoid 607 is driven at a time of T=T2. This causes the shutter 606 to be displaced in the upward direction, and the card is drawn in the conveyance rollers 750 and 760 while it is delivered by the separating roller 710. When the foremost end of the first card is detected by the TOF sensor after the rear end of the card passes past the separating rollers 710 and 730, the shutter solenoid 607 is turned off so that the shutter 606 is lowered. At the same time, the main CPU 1153 issues a signal for shifting rotation of the separating roller 710 to rotate the separating roller in the reverse direction so that the foremost end of the second card is positioned at the separating rollers 710,730. Thereafter, rotation of the separating roller 710 is stopped after a time of T3 elapses. Printing is started for the first card at a predetermined time within a period of time after the first card passes past TOF sensor. Rotation of the separating roller 605 in the normal direction is started again at a time of 100 msec after the rear end of the first card passes past TOF sensor, and subsequently, conveyance and printing are performed for the second card and subsequent ones in the same manner as mentioned above. The aforementioned series of operations are executed for a designated number of cards. Each card drawn in the core is printed in the same manner as the case that printing is effected for roll-shaped paper.

(4) Ink System

Figure 15:
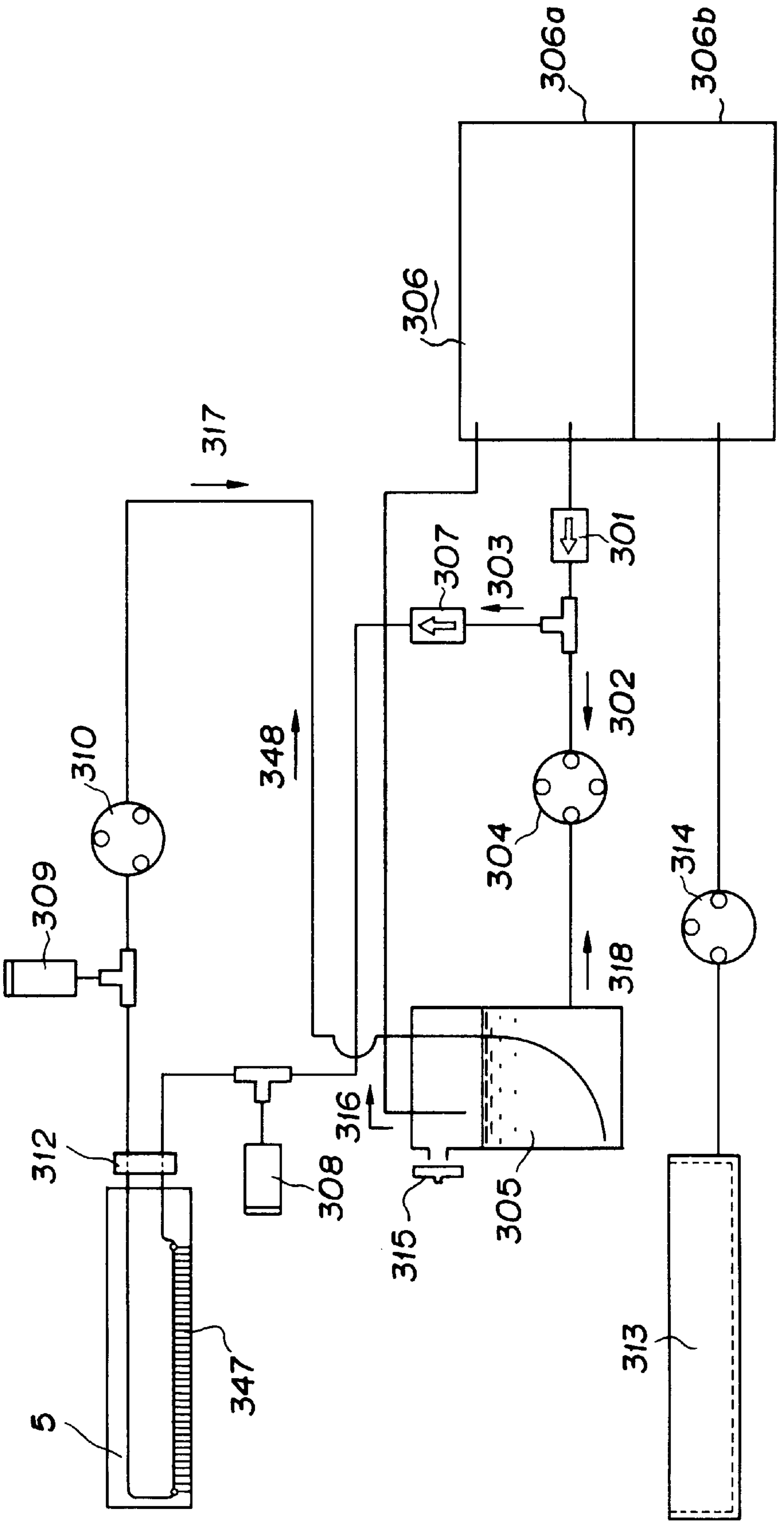
FIG. 15 is a block diagram which shows the whole structure of an ink feeding system.

FIG. 15 is a block diagram which shows the whole structure of an ink feeding system for the label printer. The whole system will be described below in conformity with the order of flowing of ink.

As a pressurizing pump 304 is rotated in the counterclockwise direction (at this time, a motor 343 (see FIG. 16) is rotated in the clockwise direction), ink in an ink receiving portion 306a of a cartridge 306 flows in the direction represented by arrow 302 via a one-way valve 301 so that it is storably received in a subtank 305. When a predetermined quantity of ink is stored in the subtank 305 as ink is increasingly received in the same, ink flows in the direction as represented by arrow 316 to return to the cartridge 306 again. At this time, an opening/closing mechanism 315 for the subtank 305 is kept closed.

Next, when the pressurizing pump 304 and a suction pump 310 are rotated in the clockwise direction (at this time, the motor 343 (FIG. 16) is rotated in the counterclockwise direction), ink stored in the subtank 305 flows in the directions as represented by an arrow mark 318 and an arrow mark 303 and then flows toward a head 5 via a one-way valve 307, and an air buffer 308 and a joint 312. After ink recirculates in the head 5, it flows in the direction represented by an arrow mark 317 via a joint 312 and an air buffer 309 to return to the subtank 305 again. At this time, the opening/closing mechanism 315 for the subtank 305 is kept opened.

Figure 16:
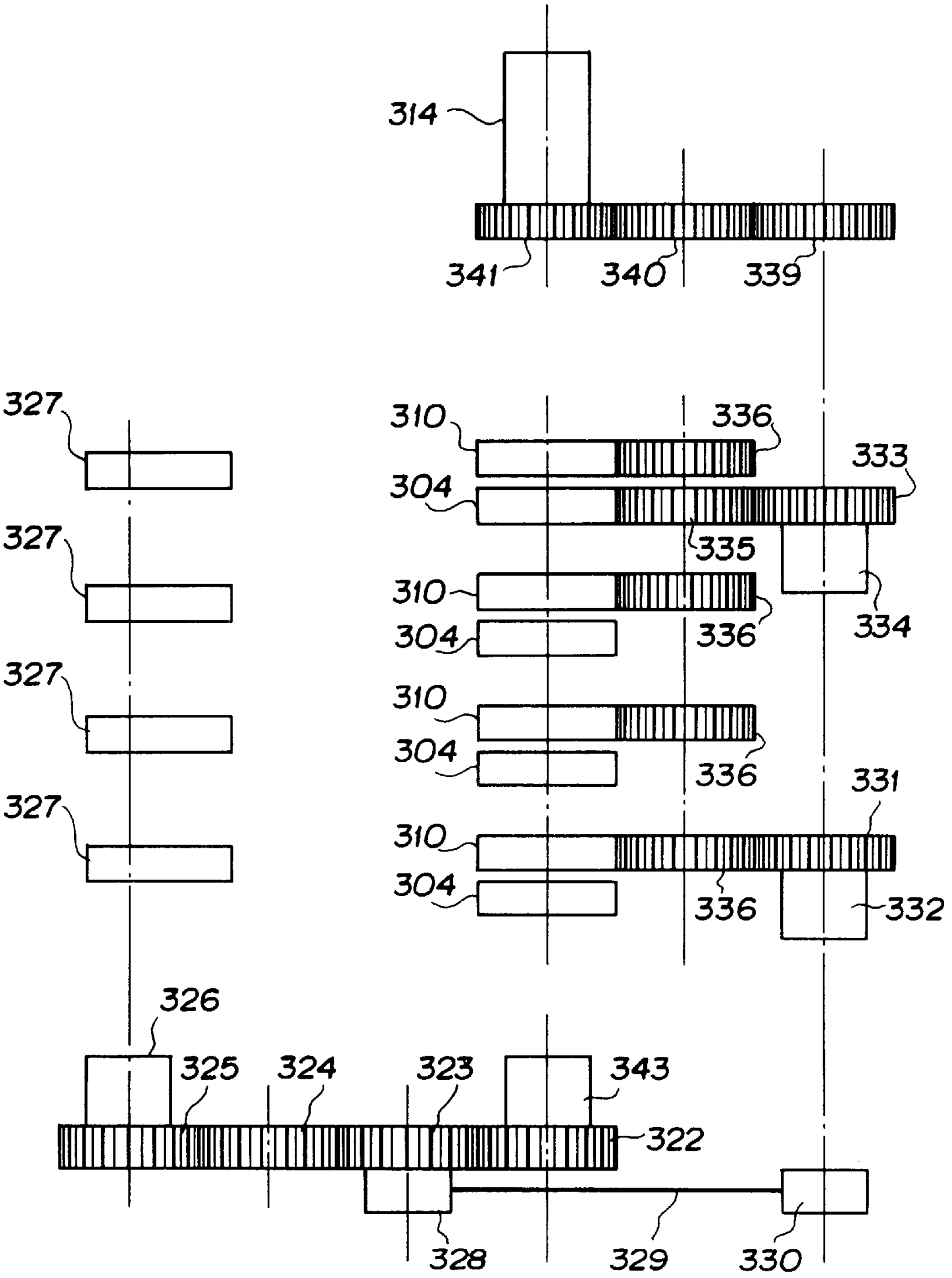
FIG. 16 is a block diagram which schematically shows a driving force transmitting system.
Figure 17:
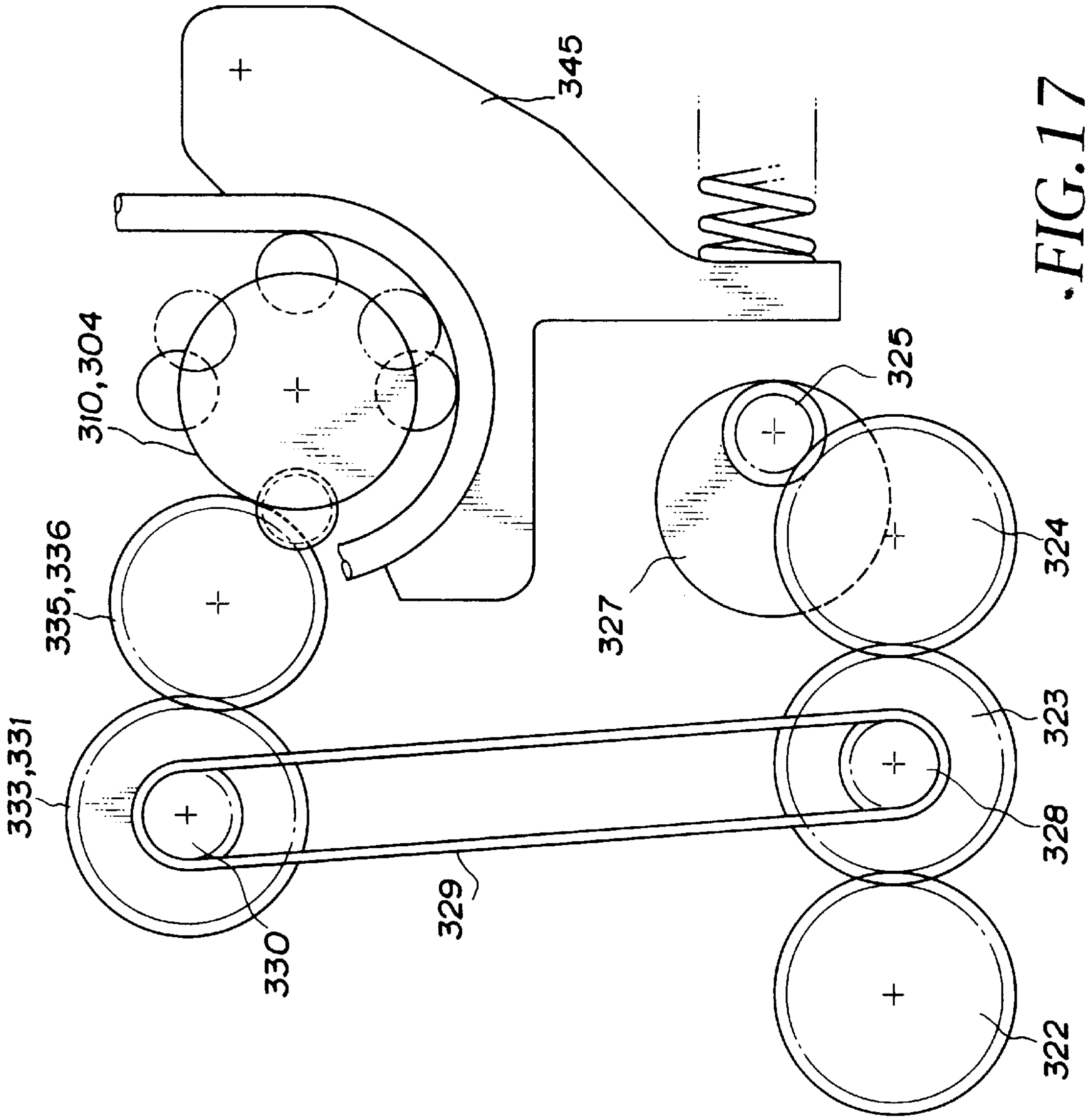
FIG. 17 is a fragmentary schematic view of the driving force transmitting system.

Next, FIG. 16 is a block diagram which shows a driving power transmission system, and FIG. 17 is a schematic view of the driving power transmission system. Description will be made below with respect to how a driving power is transmitted to respective pumps and cams from the motor 343.

The motor 343 includes a motor gear 322 which meshes with a gear 325 for a cam clutch 326 via gears 323 and 324. When the cam clutch 326 is shifted to ON, power is transmitted from the motor 343 to four cams 327 of which number is coincident with the member of heads. Next, the gear 323 is operatively associated with a pulley 328 which serves to transmit power to a pulley 330 via an endless belt 329. On the other hand, when a clutch 332 is shifted to ON, driving power is transmitted to suction pumps 310 via a gear 331 and idler gears 336. Since the idler gears 336 are fixedly mounted on a shaft, when one of four idler gears 336 is rotated, the other three idler gears 336 are simultaneously rotated.

When a pressurizing pump clutch 334 is shifted to ON, a gear 333 serves to transmit driving force to pressurizing pumps 304 via an idler gear 335. Since pressurizing pumps 304 are fixedly mounted on a shaft, when one of four pressurizing pumps 304 is rotated, the other three pressurizing pumps 304 are simultaneously rotated.

Only rotation of the motor 343 in one direction is transmitted to a recovering pump 314 via a gear 339, a gear 340 and a one-way gear 341.

Next, the stationary state and the operative state of each pump will be described below.

Figure 18B:
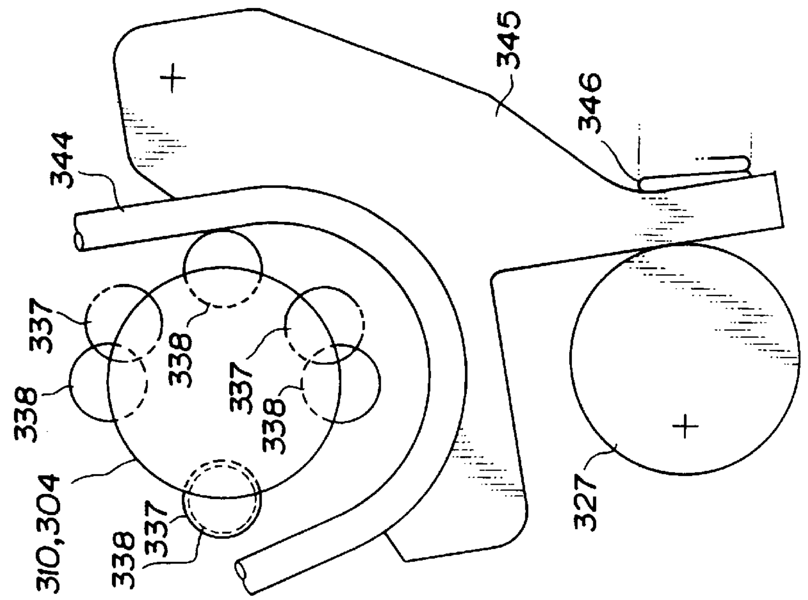
FIG. 18A and FIG. 18B are explanatory views of a pressurizing pump, showing that a tube is thrusted and that the tube is released from the thrusted state, respectively.
Figure 18A:
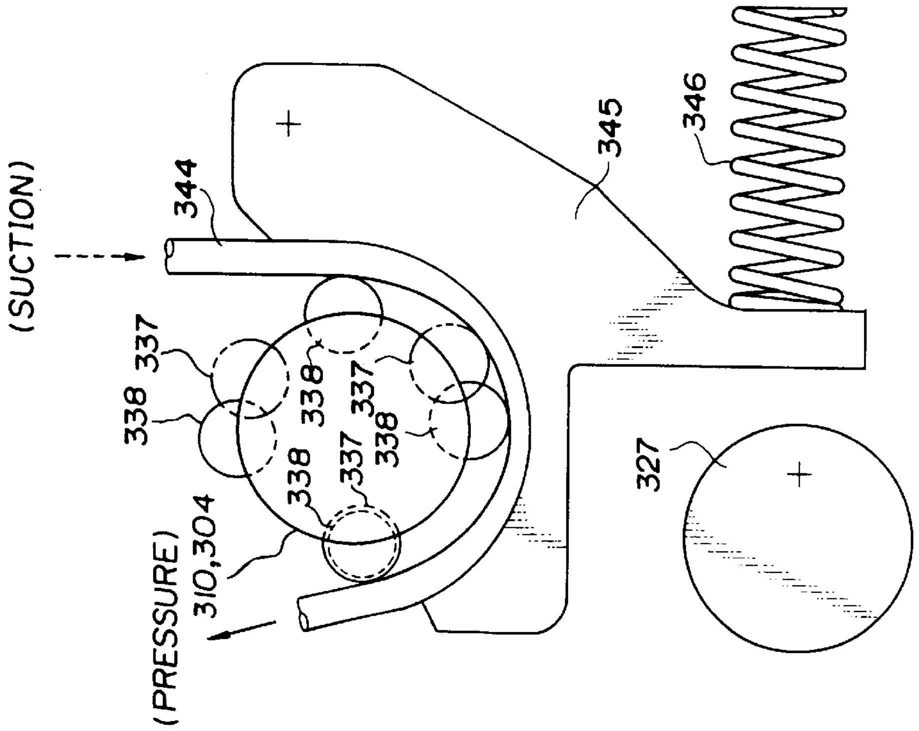

In the case that each pressurizing pump 304 and each suction pump 310 are held in the stationary state, an eccentric cam 327 raises up a pressurizing/suction pump retainer 345, causing a tube 344 to be released from the thrusted state, as shown in FIG. 18B. In the case that at least one of each pressurizing pump 304 and each suction pump 310 is driven, the eccentric cam 327 is rotated, and subsequently, the tube 344 is thrusted by the pressurizing/suction tube in cooperation with a spring 346, whereby a pressurizing pump roller 338 or a suction pump roller 337 is rotated while thrusting the tube 344, as shown in FIG. 18A.

Figure 19A:
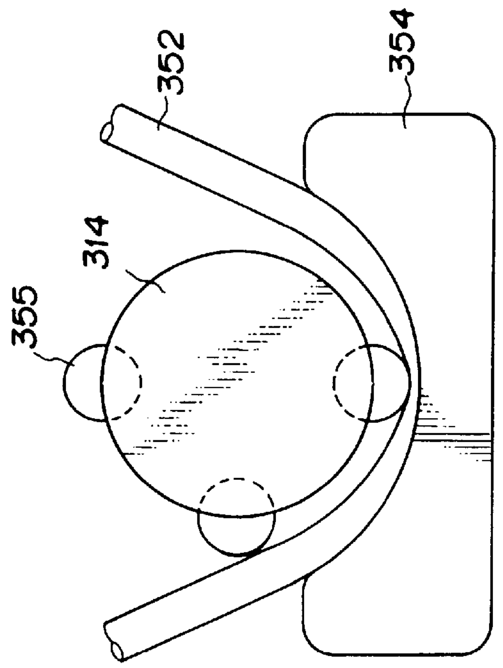
FIG. 19A and FIG. 19B are explanatory views of a recovering pump, showing that a tube is thrusted and that the tube is released from the thrusted state, respectively.
Figure 19B:
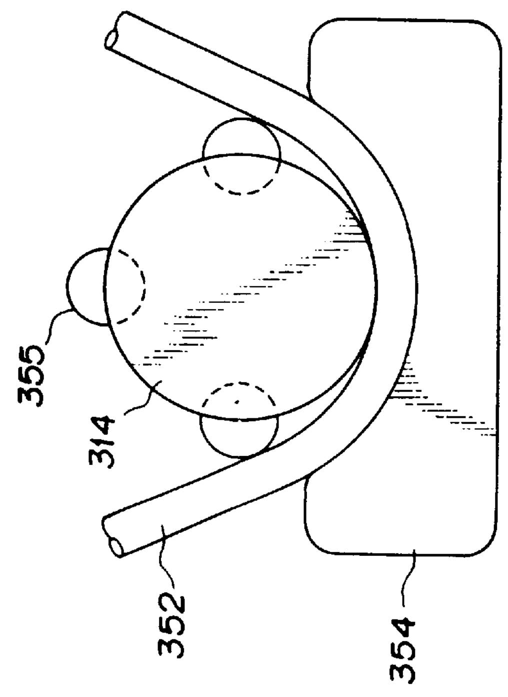

In the case that the recovering pump 314 is held in the stationary state, the tube 352 (see FIG. 19B) is released from the thrusted state because no recovering pump roller 355 is placed on the tube 352 as shown in FIG. 19B. When the recovering pump 314 is driven, the recovering pump rollers 355 are rotated while thrusting the tube 352 therewith.

Feeding of Ink

Next, a method of feeding ink from the cartridge 306 to the subtank 305 will be described below.

As the pressurizing pump 304 is rotated in the counterclockwise direction, ink in the ink receiving portion 306*a* of the cartridge 306 flows in the direction represented by arrow 302 via the one-way valve 301 this time, so that it is stored in the subtank 305. At this time no ink is sucked from the head 5 because of the presence of the one-way valve 307 but ink is sucked only from the ink receiving portion 306*a* of the cartridge 306. When ink is increasingly stored to reach a predetermined level in the subtank 305, it starts to flow in the direction represented by arrow 316 to return to the ink receiving portion 306*a* of the cartridge 306 again. At this time, since the opening/closing mechanism 315 on the subtank 305 is kept closed, the ink supplying system is a closed system. This makes it possible for ink to recirculate in the closed system.

Next, description will be made below with respect to transmission of the driving power required for supplying ink, with reference to FIG. 16. First, when the motor 343 is rotated in the clockwise direction while the tube 344 is released from the thrusted state (see FIG. 18B) and the cam clutch 326 is shifted to ON, the eccentric cam 327 is rotated, causing the tube 344 to be thrusted (see FIG. 18A). Subsequently, the cam clutch 326 is shifted to OFF, the opening/closing solenoid is turned on (to assume the closed state), and the pressurizing pump clutch 334 is shifted to ON. Thus, ink is fed to the subtank 305. Next, the pressurizing pump clutch 334 is shifted to OFF, the opening/closing solenoid is turned off (to assume the opened state), the cam clutch 326 is shifted to ON, and the tube 344 is released from the thrusted state (see FIG. 18B). Then, the cam clutch 326 is shifted to OFF and rotation of the motor 343 is stopped, whereby treatment for feeding ink is completed.

Large-Scaled Recovering

Next, a method of large-scaled recovering will be described below.

When the pressurizing pump 304 is rotated in the clockwise direction, ink in the subtank 305 flows in the direction represented by arrow 318 and arrow 303 to reach the head 5 via the one-way valve 307, the air buffer 308 and the joint 312, whereby ink flows from a plurality of ink ejection ports 347. Subsequently, when the suction pump 310 is rotated in the clockwise direction while the pressurizing pump 304 is rotated, ink recirculates in the head and flows in the direction represented by arrow 317 via the joint 312 and the air buffer 309 to return to the subtank 305 again. Also at this time, ink flows from the ink ejection ports 347. Then, rotation of the suction pump 310 is slopped but only the pressurizing pump 304 is rotated, causing ink to flow from the ink ejection ports 347.

At this time, the opening/closing mechanism 315 on the subtank 305 is kept opened. Ink recirculates in the head 5 without flowing to the ink receiving portion 306*a* of the cartridge 306 because of the presence of the one-way valve 301. Owing to the arrangement of the air buffer 308 and the air buffer 309, ink can smoothly recirculate while suppressing the pulsation induced by the pressurizing pump 304 in cooperation with the suction pump 310.

Ink ejected from the ink ejection ports 347 is received in a recovering system 313 from which ink is stored in a waste ink portion 306*b* of the cartridge 306 by rotating a recovering pump 314.

Next, description will be made below with respect to transmission of driving force in the case of large-scaled recovering, with reference to FIG. 16. First, while the tube 344 is released from the thrusted state (see FIG. 18B), the cam clutch 326 is shifted to ON and the motor 343 is rotated in the clockwise direction, causing the tube 344 to be thrusted (see FIG. 18A). Then, the cam clutch 326 is shifted to OFF, rotation of the motor 343 is stopped, the pressurizing pump clutch 334 is shifted to ON, and subsequently, the motor 343 is rotated in the counterclockwise direction Thus, the pressurizing pump 304 is rotated in the clockwise direction and at the same time, the recovering pump 314 is rotated in the clockwise direction. Then, the suction pump clutch 332 is shifted to ON, and both of the pressurizing pump 304 and the suction pump 310 are simultaneously rotated in the clockwise direction. Next, when the suction pump clutch 332 is shifted to OFF, rotation of the suction pump 310 is stopped. After the pressurizing pump 304 continues to be rotated, the clutch 334 is shifted to OFF, causing actuation of the clutch 334 to be stopped. Next, rotation of the motor 343 is stopped, the clutch 326 is shifted to ON, and subsequently, the motor 343 is rotated in the clockwise direction, causing the tube 344 to be released from the thrusted state (see FIG. 18B). Then, the clutch 326 is shifted to OFF and rotation of the motor 343 is stopped. At this time, rotation of the recovering pump 314 is stopped to assume the state shown in FIG. 19B, whereby treatment for feeding ink is completed.

Printing

When a printing operation is performed, supplementing of ink to the head 5 is executed from the subtank 305. As shown in FIG. 18B, since the tube 344 is released from the thrusted state, ink can be supplemented to the head 5 from the direction represented by arrow 318 and arrow 303, and additionally, ink can be supplemented to the head 5 from the direction represented by arrow 348. At this time, the opening/closing mechanism 315 on the subtank 305 is kept opened.

Any clutch and any pump are not driven during each printing operation, and supplementing of ink is effected only by a refilling operation caused by ink ejection.

Exchanging of the Head with another One

Next, description will be made below with respect to exchanging of the head with another one.

In the case that a new head having particular ink filled therein is mounted on the label printer, all the ink of the foregoing type should be exchanged with the present ink filled in the subtank 305. Here, a method of exchanging the former with the latter will be described below.

First, the pressurizing pump 304 is rotated in the clockwise direction so that ink in the 3subtank 305 is caused to flow in the directions represented by arrow 318 and arrow 303 so as to allow ink filled in the ink ejection ports 347 to be discharged therefrom. Next, rotation of the pressurizing pump 304 is stopped, and the suction pump 310 is rotated in the counterclockwise direction, whereby the ink in the subtank 305 is caused to flow in the direction represented by arrow 348 so as to allow ink to be likewise discharged from the ink ejection ports 347. Then, rotation of the suction pump 310 is stopped, and the pressurizing pump 304 is rotated in the clockwise direction so as to allow ink to be discharged from the ink ejection ports 347. The aforementioned operations are repeated several times. Thereafter, exchanging of the head with another one is completed by conducting the large-scaled recovering as mentioned above.

Subsequently, the procedure of transmitting a driving force during exchanging of the head with another one will be described below. First, while the tube 344 is released from the thrusted stats (see FIG. 18B), the cam clutch 326 is shifted to ON, and the motor 343 is rotated in the clockwise direction, causing the tube 344 to be thrusted (see FIG. 18A). Then, the cam clutch 326 is shifted to OFF, and rotation of the motor 343 is stopped Next, the motor 343 is rotated in the counterclockwise direction, the pressurizing clutch is shifted to ON, and the pressurizing pump 304 is rotated in the clockwise direction. After several seconds elapse, the pressurizing pump clutch 334 is shifted to OFF, and rotation of the motor 343 is stopped. Subsequently, the motor 343 is rotated in the clockwise direction, the suction pump clutch 332 is shifted to ON, and the suction pump 310 is rotated in the counterclockwise direction. After several seconds elapse, the suction pump clutch 332 is shifted to OFF, and rotation of the motor 343 is stopped.

After rotation and stoppage of the pressurizing pump 304 and the suction pump 310 are repeated several times as mentioned above, the aforementioned large-scaled recovering is conducted so that exchanging of the head with another one is completed.

Middle-scaled Recovering

When the pressurizing pump 304 is rotated in the clockwise direction, ink flows from the subtank 305 in the direction represented by arrows 318 and 303, causing ink to be discharged from the ink ejection ports 347 of the head 5 to be discharged. Ink discharged from the ink ejection ports 347 is received in the ink recovering system 313 so that it is stored in the waste ink portion 306*b* of the cartridge 306 by rotating the recovering pump 314.

The procedure of transmitting driving power for conducting the middle-scaled recovering will be described below. First, while the tube 344 is released from the thrusted state (see FIG. 18B), the cam clutch 326 is shifted to ON, and the motor 343 is rotated in the clockwise direction, causing the tube 344 to be thrusted (see FIG. 18A). Next, the pressurizing pump clutch 334 is shifted to ON, and the motor 343 is rotated in the counterclockwise direction. Thus, the pressurizing pump 304 is rotated in the clockwise direction, and the recovering pump 314 is likewise rotated in the clockwise direction. Then, the pressurizing pump clutch 334 is shifted to OFF, and rotation of the motor 343 is stopped. Next, the cam clutch 326 is shifted to ON, and the motor 343 is rotated in the counterclockwise direction, causing the tube 344 to be released from the thrusted state (see FIG. 18B). Subsequently, after the clutch 326 is shifted to OFF, rotation of the motor 343 is stopped to assume the position shown in FIG. 19A.

(5) Hardware for a Controlling System

FIG. 20 is a block diagram which shows by way of example the whole structure of a controlling system constructed in accordance with this embodiment. In this controlling system, after image data to be printed by the label printer are prepared or edited in a host computer 1151, they are delivered to a data sending/receiving section 1152 as color image data or color character data.

In this connection, there arises an occasion that the image data are received as bit map data for each of four colors (black, cyan, magenta and yellow plus particular color as desired), and there arises another occasion that they are received as character code data for the same. Whether received printing data are bit map data or character code data is discriminated depending on the preliminarily received command. In the case that the received printing data are character code data, commands such as printing operation start position designation, a character font, a character size and character color designation are inserted into the received printing data every character data or every row of a plurality of characters.

The data received by the data sending/receiving section 1152 are read by a main CPU 1153, and subsequently, they are memorized in a working range arranged in a RAM 1156. Since they are developed in the form of a bit map with a character as a unit, the content of a character generator corresponding to the relevant character is read from ROM 1155, and the results derived from reading are written in a printing buffer 1158. The printing buffer 1158 independently holds data for one page (one label) for each of four colors, i.e., black, cyan, magenta and yellow corresponding heads 5B*k* to 5Y. In this embodiment, a line head having 1,344 ink ejecting ports arranged per single head in the transverse direction is used with printing resolution of 360 dpi (dots per inch), and each printing operation is performed with 1,328 ink ejection nozzles among 1,344 ink ejection nozzles with eight ink ejection ports located at the opposite ends of the line head removed therefrom. In other words, printing data are prepared for 1,328 dots, and when they are developed by the printing buffer 1158, blank data corresponding to eight dots at the opposite ends of the line head are added to 1,328 dots, whereby the printing data is prepared in the form of data corresponding to 1,344 dots. 1,344 ink ejection ports are divided into 21 blocks each composed of 64 ink ejection ports which in turn are driven in a head controlling circuit 1157.

A controlling program inclusive of a recovering treatment program to be described later is stored in ROM 1155 for controlling the whole color printer together with a character generator and a bar code generator. While the color printer is controlled in conformity with the controlling program, CPU 1153 controllably drives driving motors 1165 via I/O port 1159 and driving circuit 1164. The driving motors 1165 include a motor for conveying printing papers, a motor for displacing the head in the upward/downward direction, and a motor for activating recovering system units.

A sensor circuit 1167 includes home position sensors for determining reference positions for a TOF sensor for detecting a head position of each label for achieving each printing operation, a head motor and a capping motor, an ink level sensor for monitoring a quantity of each remaining colored ink and other sensors.

The main CPU 1153 has an occasion that printing data received from the host computer 1151 are stored in a memory card 1090. In the case that each printing operation is performed with the label printer separated from the host computer 1152, the data stored in the memory card 1090 are usually prepared in the form of character code data. However, there arises an occasion that the printing image data held in the stationary state without any necessity for changing the data are stored as bit map data corresponding to four colors.

(6) Precedent Treatment for Blank Paper and Subsequent Treatment for Blank Paper:

According to the present invention, since a full line type head is used for the label printer, there is not present a "line" as appears with a serial printer. For this reason, a recovering operation which is usually performed between adjacent lines should be achieved under a condition that the printing operation is temporarily interrupted. In addition, since continuous band-shaped recording paper is used as a recording medium, there does not arise an occasion that recording paper disappears on the conveyance path between adjacent pages like a page printer. In other words the time between adjacent pages is very short. In this embodiment, in view of the foregoing fact, when a request is raised for conducting a recovering treatment during each printing operation, the presently printing label is treated until it is finally printed but the next label is not printed and conveyance of the unrolled paper 204 is interrupted. In fact, this treatment is called precedent treatment for blank paper. After completion of the precedent treatment for blank paper, recovering treatment is conducted.

When a printing operation is restarted as it is, there appears useless paper which is not printed. To cope with the foregoing malfunction, heading is effected by back-feeding of the unwound paper 204. This treatment is called subsequent treatment for blank paper.

The back-feeding is achieved by reversing the conveyance belt 212 of the paper feeding unit 202 and the unrolled paper conveyance belt of the roll feeding unit 201. At this time, a loop is formed and a loop plate 206 is raised up. When a loop sensor 207 is turned on, the conveying belt 205 is reversely operated. When it is found that no loop is formed, the loop plate 206 is lowered, and the loop sensor 207 is turned off, operation of the conveying belt 205 is interrupted. In other words, the relationship between ON and OFF of the loop sensor 207 as well as driving and stopping of the conveying belt 212 is reversed between the printing operation and the no-printing operation. Since operation of the conveying belt 205 is reversed as the conveyance belt 212 runs in the reverse direction, reverse operation can be achieved while adequately maintaining the tension of the unwound paper. The back-feeding is achieved in such a manner that the printing medium is returned by the preliminarily memorized distance equal to a length of single label. At this time, the back-feeding may be terminated when it is determined that heading of the unwound paper 204 is completed by detecting TOF while the TOF sensor 209 is monitored. The stopping time of each printing operation can be shortened by conducting a step of subsequent treatment for blank paper and recovering treatment in the parallel relationship.

When the small resin rollers 250 each having a small frictional coefficient between the roll-shaped paper and the roller 250 as shown in FIG. 35 is substituted for the conveying belt 205 of the roll feeding unit 201, slippage takes place with the rollers 250 when a high intensity of tension is applied to the roll-shaped paper. Running of the unwound paper in the rearward direction can be effected with an adequate intensity of tension without any necessity for controlling the tension with the aid of the loop sensor 207.

(7) Recovering Treatment for the Head

The following description will be made below with the assumption that each step is abbreviated to S throughout all flowcharts.

Figure 21:
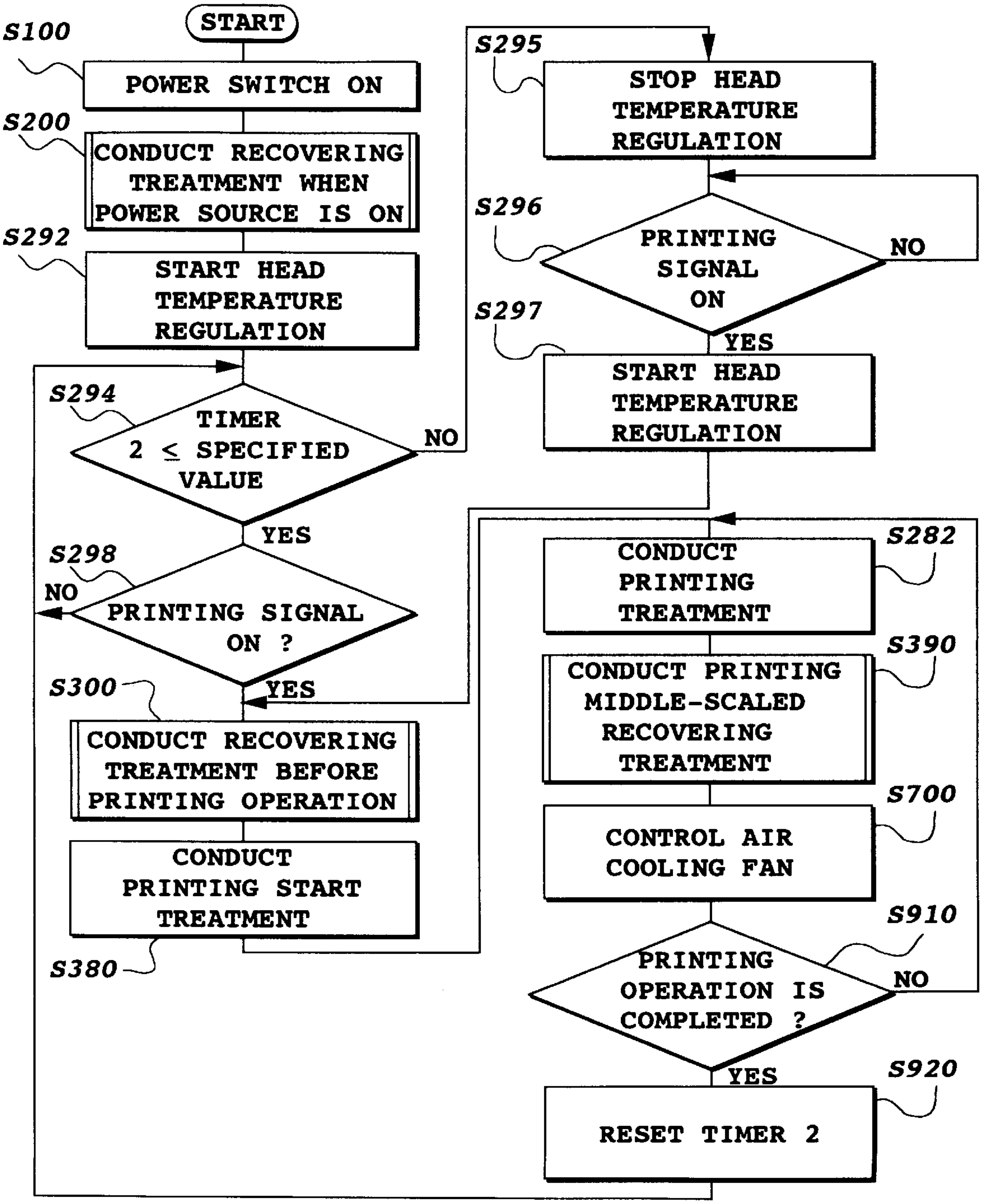

FIG. 21 is a flowchart which shows a series of printing operations to be performed from the time when a power source is turned on till the time when it is turned off. When the power source is turned on, various kinds of timers and counters are reset (S100). While the power source is turned on, recovering treatment is conducted (S200). Next, the temperature control of the head is started by a subheater disposed in the head (S292). Next, it is determined whether or not a value derived from a timer 2 to be described later is equal to or smaller than a specified value (S294), and when it is found that the foregoing value is larger than the specified value, head temperature control is stopped (S295). When a printing signal is inputted into controller (not shown) after the label printer waits in the stopped state (S296), the head temperature control is restarted (S297). When it is found at S294 that the value of the timer 2 is equal to or smaller than the specified value, the label printer waits until the printing signal is inputted into the controller (S298), and when the printing signal is inputted into the controller, recovering treatment prior to printing operation is conducted (S300). This recovering treatment prior to printing is conducted for allowing the head to be held in an optimum state when printing operation is performed. Thereafter, treatment for allowing a printing operation to be started is conducted (S380). Once printing operation is started, printing treatment (S382), recovering treatment during printing operation (S390) and controlling for a cooling fan (S700) are repeatedly performed until printing operation is completed. Recovering treatment during printing operation is performed so as to allow the head to be held at the best condition during printing operation. When printing operation is completed (S910), the value of the timer 2 is reset (S920). Treatments from S294 to S920 are repeated until the power source is turned off.

Next, each subroutine will be described below.

(7.1) Recovering Treatment to be Conducted When a Power Source is Turned On (S200)

Figure 22:
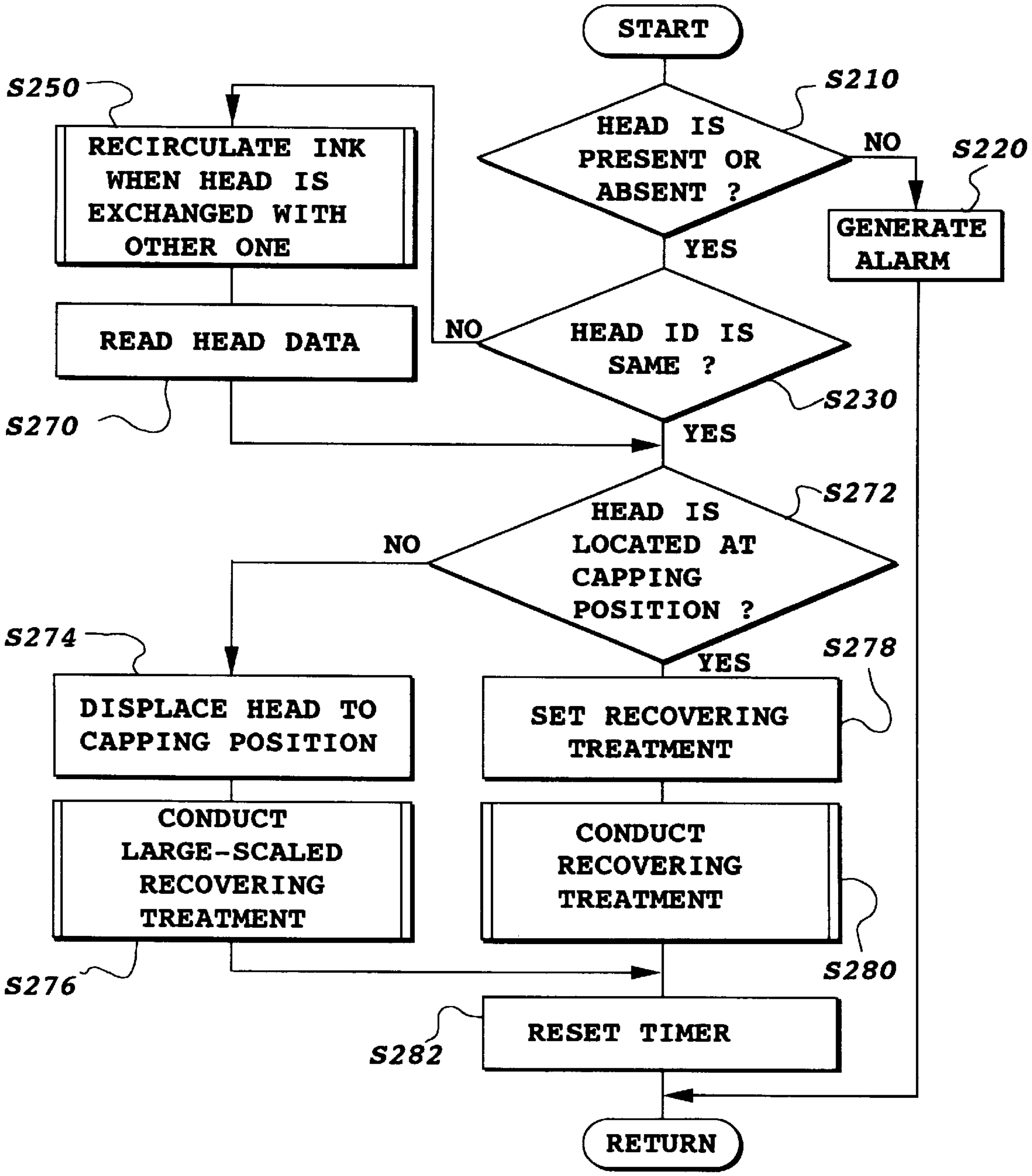

FIG. 22 is a flowchart which shows details on the recovering treatment to be conducted when the power source is turned on as shown in FIG. 21. When recovering treatment to be conducted when the power source is turned on is started, it is determined whether or not the head is present in the head holder (S210). If no head is present in the head holder, the controller issues alarm (S220), and thereafter, the program returns to parent treatment. When the head is present in the head holder, the controller reads the head ID from a memorizing means mounted on the head (S230), and when it is found that any head is not present in the head holder, or it is determined that the head is exchanged from another one, ink is caused to recirculate during head exchanging (S250). The fact that ink is caused to recirculate during head exchanging is intended to discharge from the interior of the head ink filled in a new head. Next, various kinds of data required for ink ejection are read in the housing of the label printer from a memorizing means mounted on the head (S270). Next, it is determined whether or not the head is present at the capping position (S272). In the case that the head is not present at the capping position, since there is a high possibility that the head is held in the state unsuitable for printing operation due to ink drying or dust adhesion while the power source is turned off, the head is displaced to the capping position (S274), and thereafter, large-scaled recovering treatment is conducted (S276). In the case that the head is present at the capping position, recovering treatment is conducted (S278). Specifically, when a value derived from a timer A incorporated in the CPU 1153 is equal to or smaller than a set time, e.g., 16 hours or less, middle-scaled recovering treatment is selectively determined but when it is larger than the set time, a large-scaled recovering treatment is selectively determined. Next, preset recovering treatment is conducted (S280). On completion of the recovering treatment, values derived from timer A and timer B each incorporated in CPU 1153 are reset. When large-scaled recovering treatment is selectively determined at S278, values of timer A and timer B are reset. However, if middle-scaled first recovering treatment is selectively determined at S278, only the value of timer B is reset (S282), and thereafter, the program returns to parent treatment.

Figure 23:
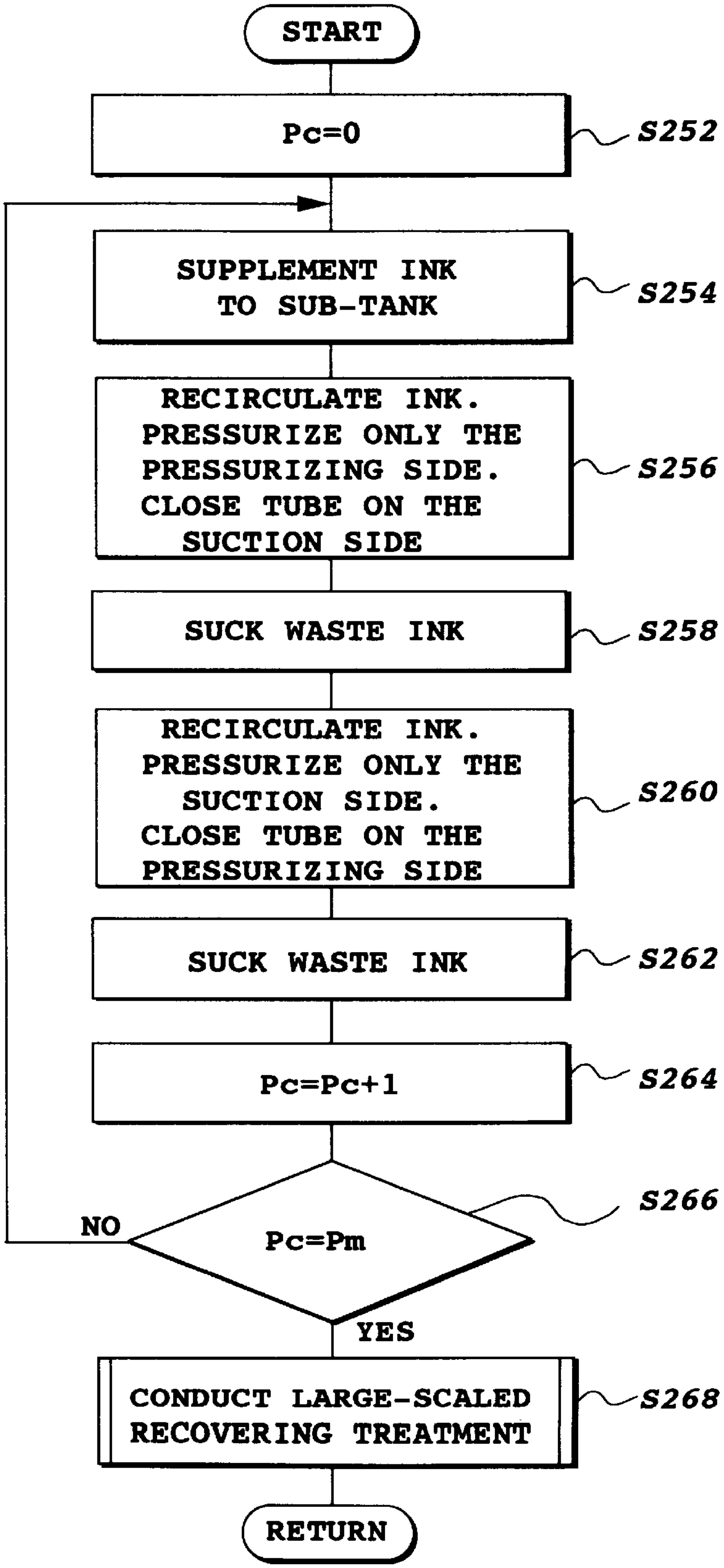
FIG. 23 is a flowchart which shows the content of ink recirculating treatment when the ink jet head is held in the unwound state.

FIG. 23 is a flowchart which shows details on ink recirculation (S250) at the time of exchanging of the head with another one shown in FIG. 22. First, counter Pc in CPU 1153 is reset to zero (S232), and then, ink is supplemented to subtank from ink cartridge (S254). Next, ink is pumped from the pressurizing side of the head ink feeding path for a first predetermined period of time (S256). At this time, the suction side of the head ink feeding path is kept closed, and waste ink in the recovering system is sucked. Subsequent to completion of the pumping operation of ink, waste ink is sucked for a predetermined second period of time (S258). Thereafter, ink is pumped from the suction side of the head ink feeding path for a predetermined third period of time (S260). At this time, the pressurizing side of the head ink feeding path is kept closed, and waste ink in the recovering system is sucked. Subsequent to completion of the pumping operation, waste ink is sucked for a predetermined fourth period of time (S262). Next, a numeral of 1 is added to the counter Pc (S264), and it is determined whether an equation of Pc=specified value Pm is established or not (S266). If not, the program returns to S254. On the contrary, if so, large-scaled recovering treatment is conducted (S268), and then, the program returns to parent treatment.

(7.2) Recovering Treatment to be Conducted Before a Printing Operation is Performed (S300)

Figure 24:
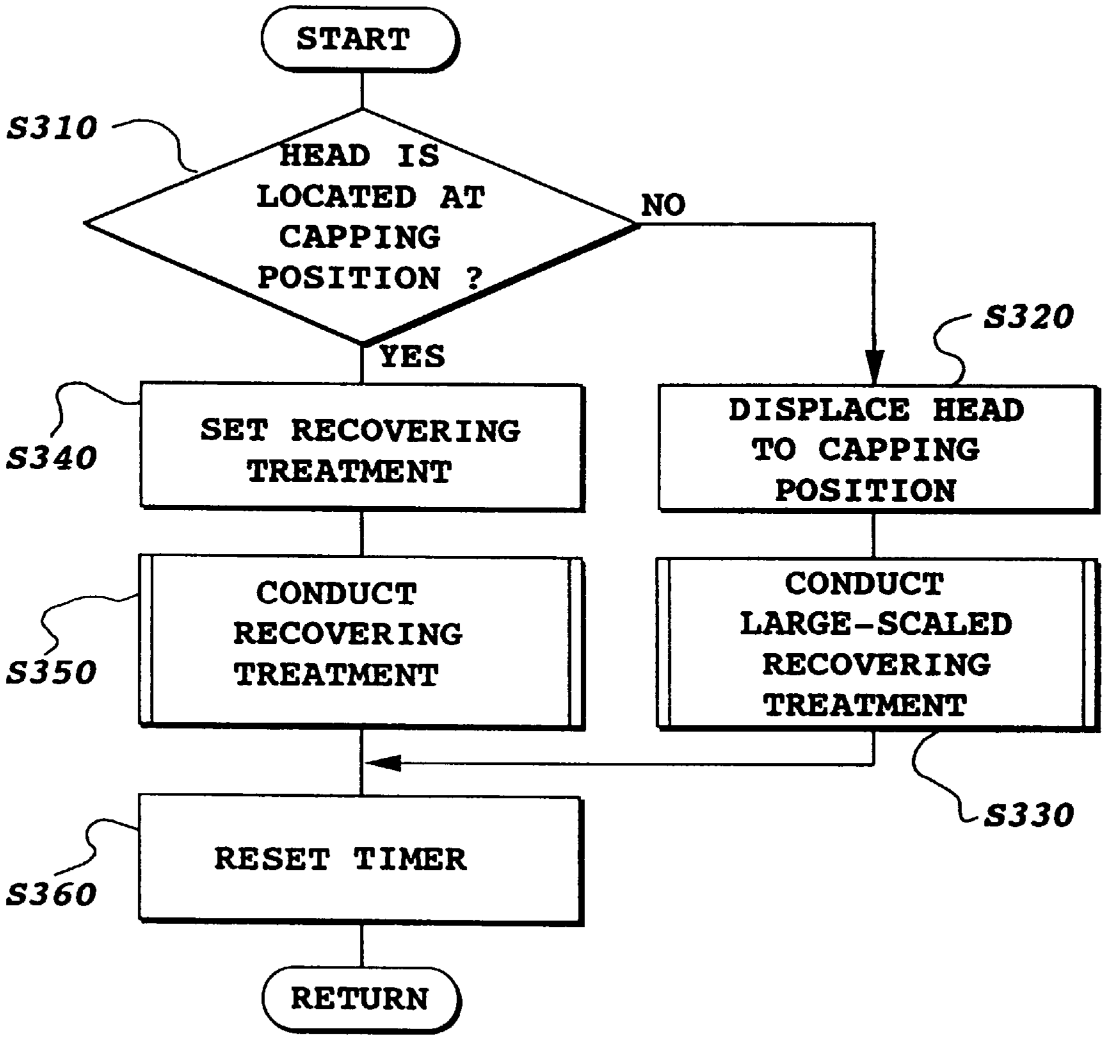
FIG. 24 is a flowchart which shows the content of recovering treatments to be conducted before a printing operation is performed.

FIG. 24 is a flowchart which shows details on recovering treatment to be conducted before printing operation is performed (S300). CPU 1153 determines whether the head is located at the capping position or not (S310). In the case that the head is not located at the capping position, it is considered that some trouble occurs during a period of standby. For this reason, the head is displaced to the capping position (S320) where large-scaled recovering treatment is conducted (S330). In the case that it is found that the head is present at the capping position, recovering treatment is conducted (S340). Specifically, when value of timer B is equal to or larger than a specified value, large-scaled recovering treatment is selectively determined, and when it is smaller than the specified value, middle-scaled first recovering treatment is selectively determined. Next, the thus determined recovering treatment is conducted (S350). On completion of the recovering treatment, values of timer A and timer B are reset. If it is found at S340 that large-scaled recovering treatment is selectively determined, values of timer A and timer B are reset and when middle-scaled recovering treatment is selectively determined, value of timer B is reset (S360). On completion of the recovering treatment directly before a printing operation, the program returns to parent treatment.

Figure 25:
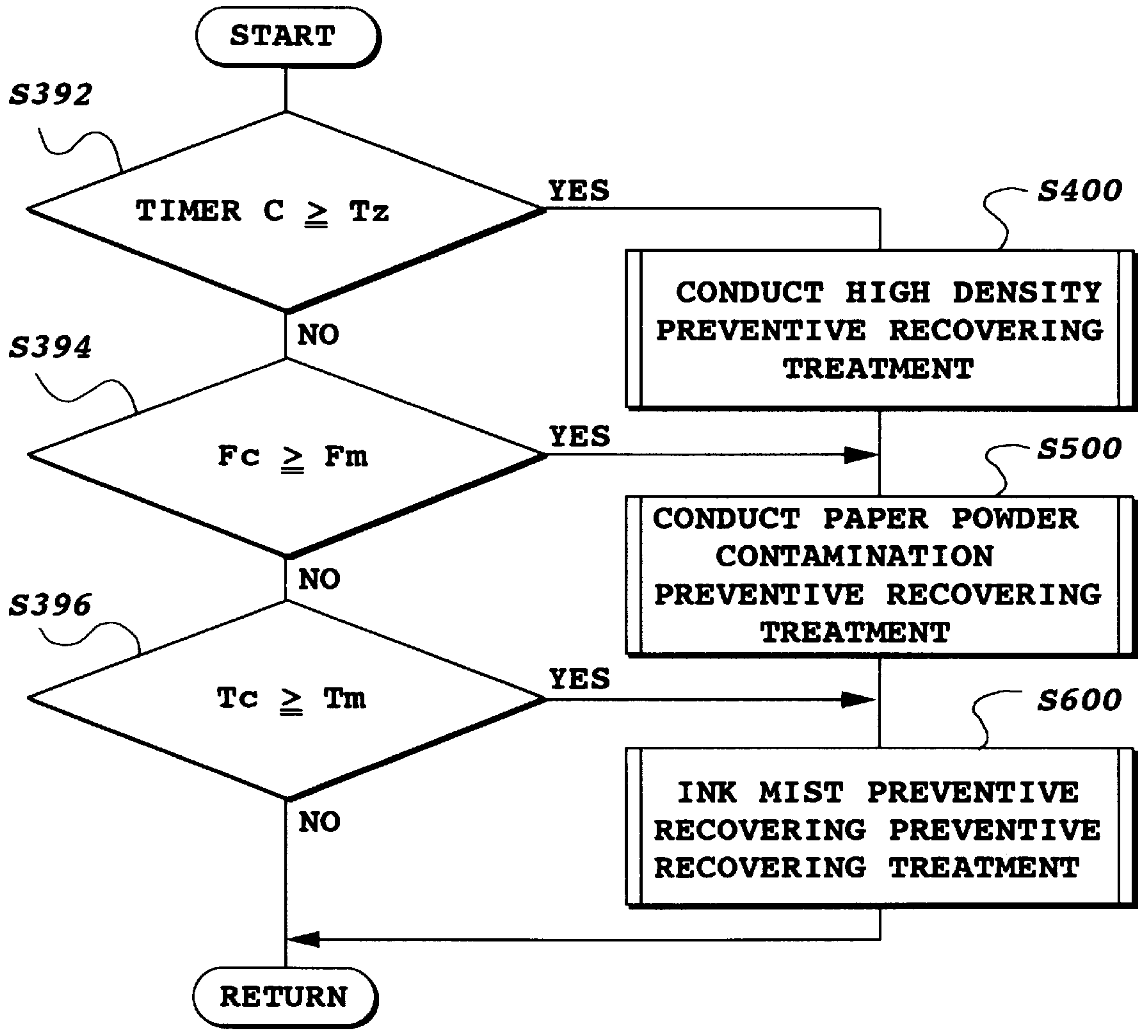
FIG. 25 is a flowchart which shows the content of recovering treatments to be conducted during each printing operation.

(7.3) Recovering Treatment to be Conducted in the Course of a Printing Operation:

FIG. 25 is a flowchart which shows details on recovering treatment to be conducted in the course of a printing operation (S390). When a printing operation is started, CPU 1153 compares a value of a timer C incorporated in the CPU 1153 with a specified value Tz (S392). When the value of the timer C is equal to or larger than the specified value Tz, high density preventive recovering treatment (S400) is conducted, and then, the program returns to parent treatment. When it is found that the value of the timer C is not equal to or larger than the specified value Tz, a value of a feed clock counter Fc is compared with a specific value Fm (S394). When it is found that the value of the feed clock counter Fc is equal to or larger than the specified value, paper powder contamination recovering treatment is conducted (S500), and then, the program returns to parent treatment. When the value of the feed clock counter Fc is less than Fm, a value of an ink droplet ejection counter Tc is compared with a specified value Tm (S396). When it is found that it is equal to or larger than the specific value Tm, ink mist recovering treatment (S600) is conducted, and then, the program returns to parent treatment. When it does not coincide with the specified value Tm, the program skips S600 and returns to parent treatment.

Figure 26:
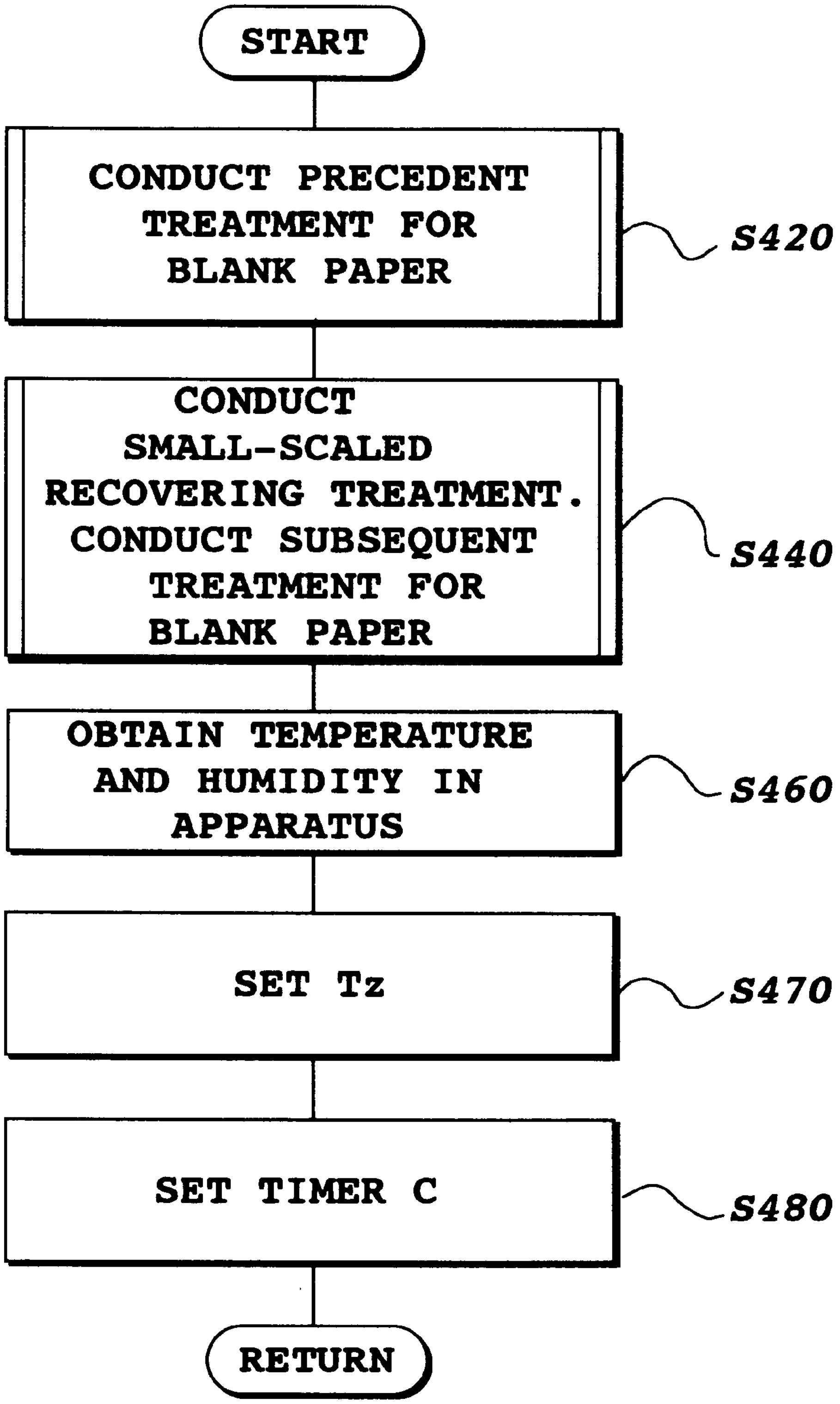
FIG. 26 is a flowchart which shows the content of high density preventive recovering treatments to be conducted.

FIG. 26 is a flowchart which shows details on high density preventive recovering treatment (S400). Some ink ejection ports do not eject ink therefrom during printing operation depending on image data with which a user wants to print an image. Ink in these ink ejection ports has an increased concentration due to vaporization of volatile components in ink from these ink ejection ports. When the ink ejection ports which have been not used till now are brought in use due to variation of bar code data and numerical data, a printed image has an increased density. To prevent image density from varying, high density preventive recovering treatment (S400) is conducted.

When high density preventive recovering treatment is started, precedent treatment for blank paper (S920) is conducted, and moreover, small-scaled recovering treatment and subsequent treatment for blank paper are conducted (S440). Thereafter, temperature and moisture in the label printer are adjustably determined. Time interval Tz for small-scaled recovering treatment is selectively determined using data on the thus determined temperature and humidity (S470). The time interval Tz for small-scaled recovering treatment is increasingly shortened as the temperature is determined to assume a high level and the humidity is determined to assume a low level. Thereafter, the value of the timer C is reset (S480), and then, the program returns to parent treatment.

Figure 27:
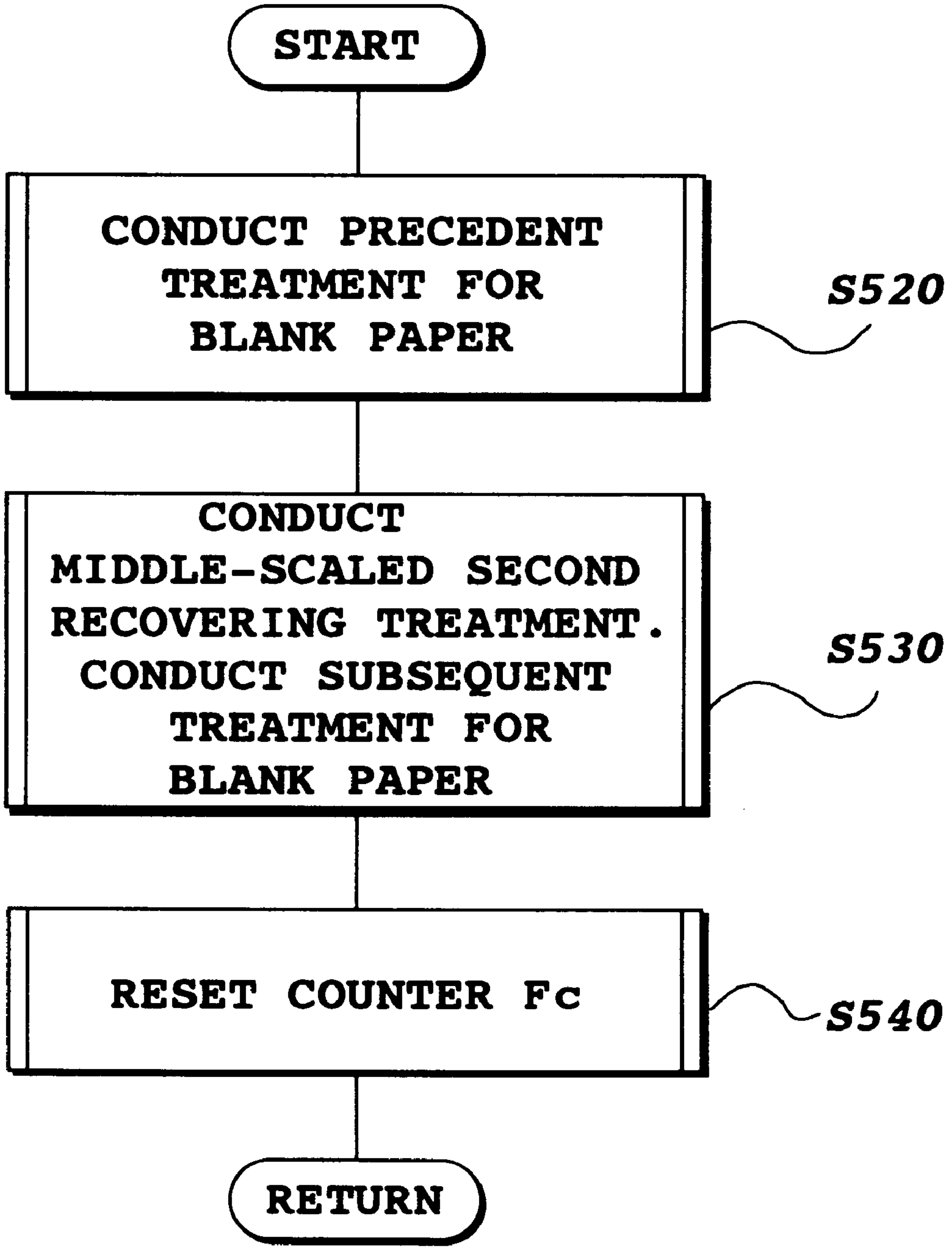
FIG. 27 is a flowchart which shows the content of paper powder contamination preventive recovering treatments to be conducted.

FIG. 27 is a flowchart which shows details on the paper powder contamination recovering treatment (S500) shown in FIG. 25. After completion of precedent treatment for blank paper (S520), middle-scaled second recovering treatment and subsequent treatment for blank paper are conducted, a printing operation is restarted (S530), and a counter Fc is reset (S540). This recovering treatment is conducted to remove powder particles of printing medium donor adhering to the ink ejection port forming a surface during each printing operation, and moreover, to prevent an occurrence of malfunctions that ink fails to be ejected or ink is incorrectly ejected in the direction with undesirable departure (inclination) from the given direction.

Figure 28:
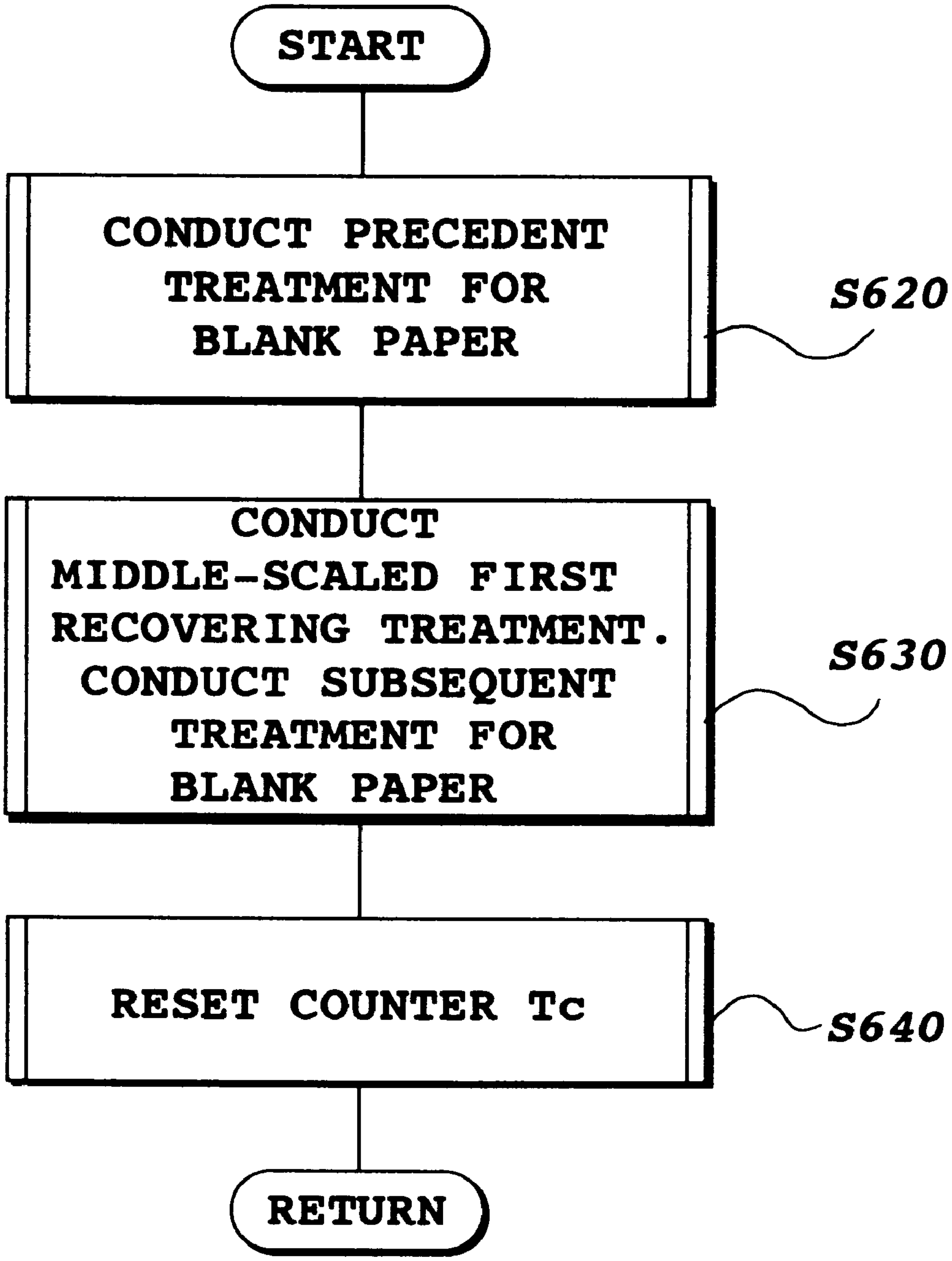
FIG. 28 is a flowchart which shows the content of ink mist preventive recovering treatments to be conducted.

FIG. 28 is a flowchart which shows details on the ink mist preventive recovering treatment (S600) as shown in FIG. 25. Precedent treatment for blank paper is conducted (S620), middle-scaled first recovering treatment and subsequent treatment for blank paper are conducted, printing operation is restarted (S630), and counter Tc is reset (S640). The ink mist preventive recovering treatment is intended to remove ink mist adhering to the ink ejection port forming plane during each printing operation.

(7.4) Controlling to be Effected for an Air Cooling Fan (S700):

Since a full line head is used for the label printer, each printing operation is achieved without any displacement of the head in the main scanning direction as seen with a serial printer but only with displacement of a recording paper in the auxiliary scanning direction. For this reason, there does not arise any necessity for air cooling to be effected as the head is displaced like the serial printer. However, since quality of the printed image is degraded when the temperature of the head is excessively elevated, forcible air cooling is effected by rotating a fan. In other words, an image having stable quality is obtainable by suppressing the elevation of the head temperature.

As shown in FIG. 4, an air cooling fan unit 7 is fitted in parallel to the longitudinal direction of the head. With this construction, air stream can smoothly flow between adjacent heads. When head cooling air stream reaches the ink ejection port forming surface during printing operation, there arise problems that a printed image could be deformed, and moreover, ink mist is generated. To cope with the foregoing problems, the label printer is constructed such that each head is brought in to an opening in the slotted recovering system units 3 during each printing operation. Thus, the head cooling air stream does not reach the ink ejection port side.

Since controlling the cooling fan unit 7 is conducted in the state that the recording head ejection port forming surfaces are brought into openings in the slotted recovering system unit during recording operation, the air stream does not affect the recording head ejection port forming surfaces, thus preventing deformation of print images and ink mists smaller than ink droplets from being generated. As a result, high quality of printing is achieved. Moreover, since printing is performed even in controlling the cooling fan, reduction of throughput is prevented and high speed printing is achieved.

Next, details on the controlling of an air cooling fan (S700) shown in FIG. 21 will be made below with reference FIG. 29. First, an output from the temperature sensor disposed in each head is converted with the aid of an A/D converter disposed in CPU 1153 to detect the temperature of each head. Head temperature is detected with respect to four heads corresponding to four colors Bk, C, M and Y (S710). Data Ts on the highest temperature among the detected head temperature data are selected. The highest temperature data Ts are compared with critical printing temperature Tmax (S730) . If an inequality of Ts>Tmax is established, head temperature abnormality treatment is conducted (S800) . When it is found at S730 that an inequality of Ts<Tmax is established, the program goes to S750. The selected head temperature Ts is compared with a predetermined fan driving temperature Th (S750). If an inequality of Ts<Th is established, the program return to parent treatment. If an inequality of Ts≧Th is established, the cooling fan is rotationally driven (S760), each head temperature is detected again (S770), and data Ts on the highest temperature among the four detected head temperature data is selected (S780). The selected head temperature Ts is compared with a predetermined fan stop temperature T1 (S790). If an inequality of Ts≦T1 is established, rotation of the fan is stopped (S795), and then, the program returns to parent treatment. When it is found at S790 that an inequality of Ts>T1 is established, the program returns to parent treatment without any stoppage of rotation of the fan.

In the case that a user continuously prints data each having a very high black ink content at a high speed, the temperature of each head is elevated. When the head temperature is elevated in excess of a limit of temperature controlling to be effected by a air cooling fan, it is anticipated that not only a quality of printed image is degraded but also each head is damaged or injured. In view of the foregoing fact, a printing speed of the label printer is changed to another one and each printing operation is stopped in association with the head temperature abnormality treatment (S800) shown in FIG. 29.

Figure 29:
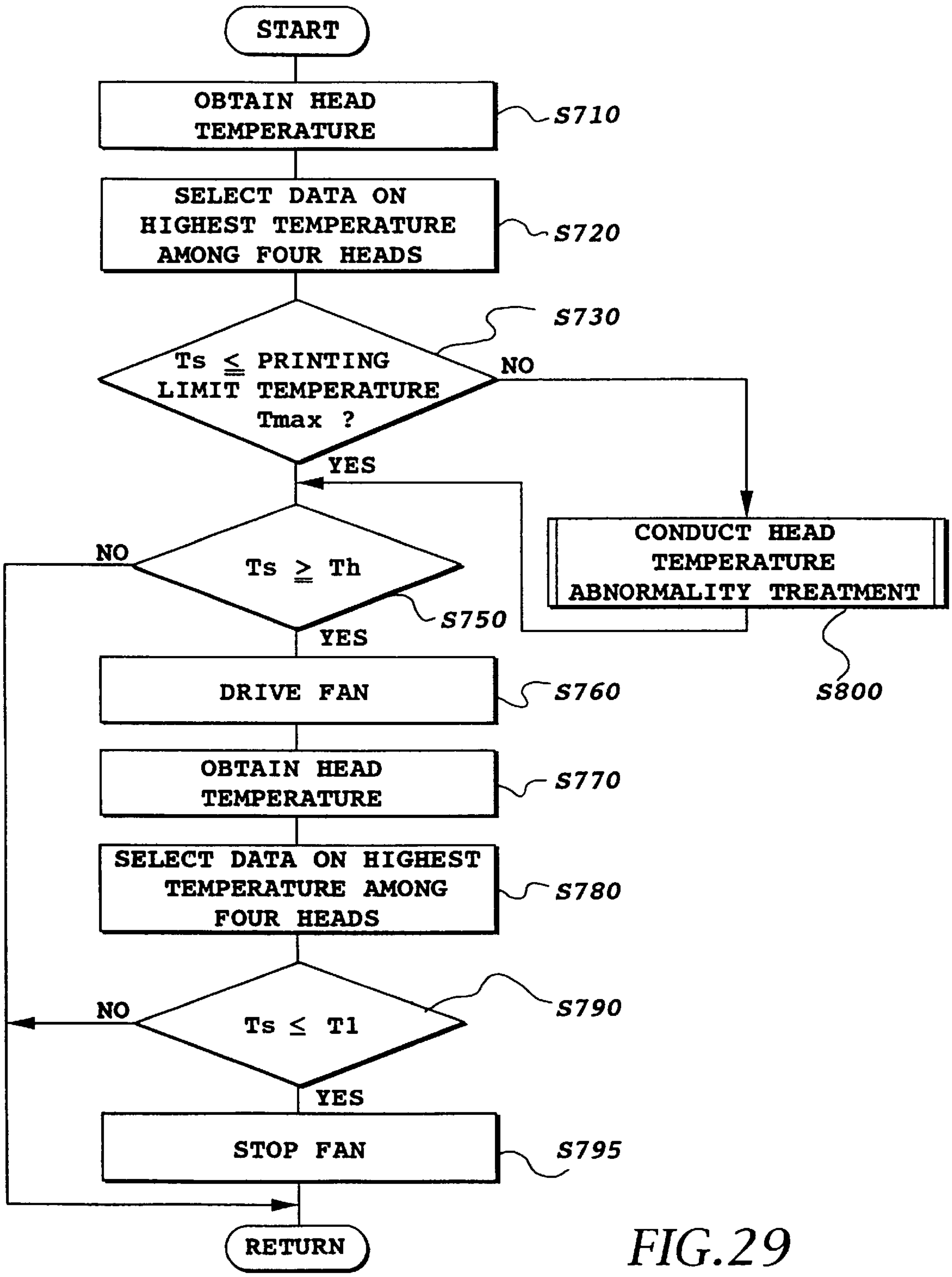
FIG. 29 is a flowchart which shows the content of air cooling fan controlling treatments to be conducted.
Figure 30:
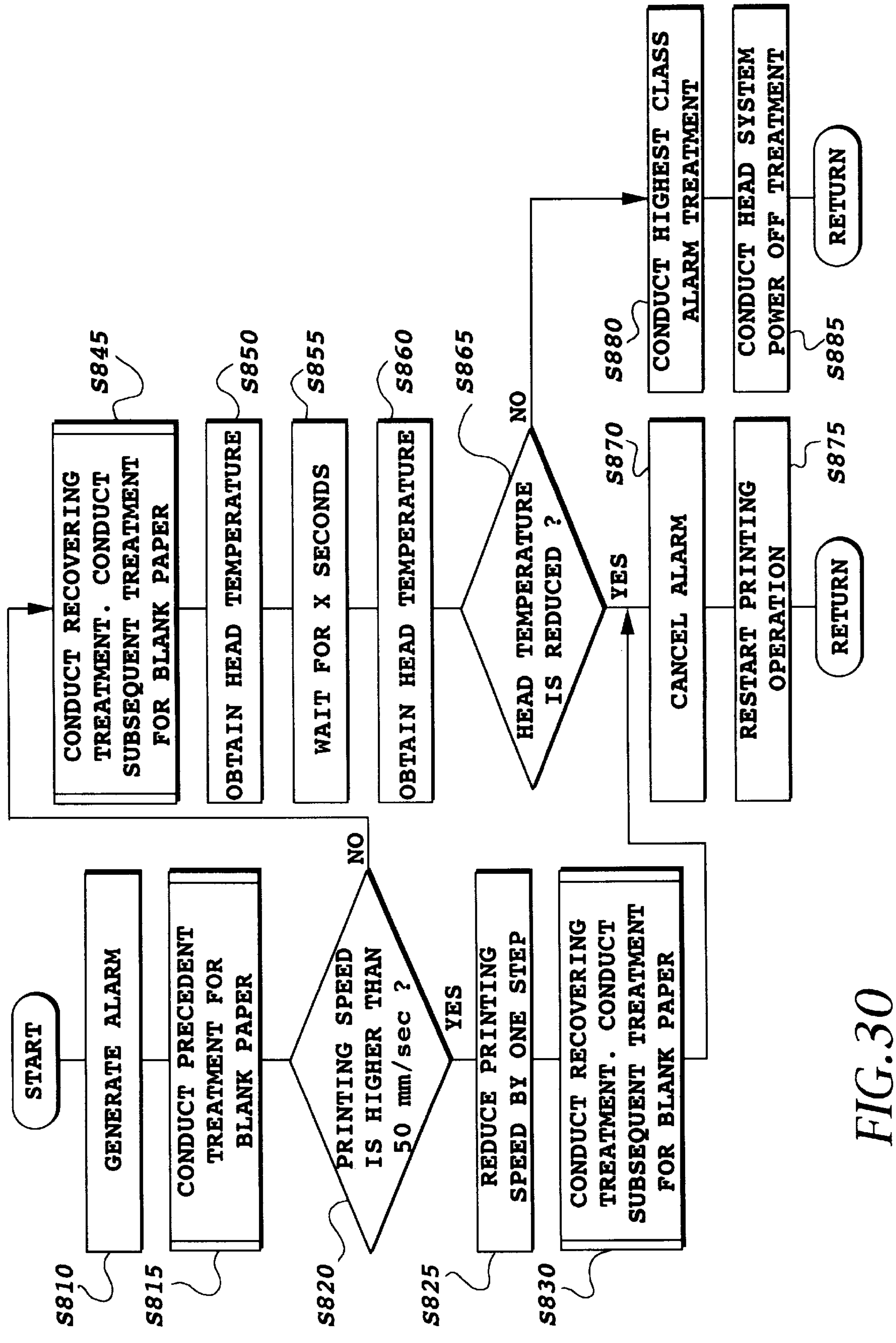
FIG. 30 is a flowchart which shows the content of ink jet head temperature abnormality treatments to be conducted.

FIG. 30 is a flowchart which shows details on the head temperature abnormality controlling (S800) shown in FIG. 29. When head temperature abnormality is detected, an alarm is issued to a user (S810), precedent treatment for blank paper is conducted (S815), and thereafter, a printing speed is compared with 50 mm/sec (S820). If an inequality of printing speed ≧50 mm/sec, the printing speed memorized in CPU 1153 is reduced by one stage (S825). Next, subsequent treatment for blank paper and recovering treatment are conducted (S830), the user is released from the alarmed state (S870), and then, a printing operation is restarted (S875).

When it is found at S820 that an inequality of printing speed <50 mm/sec is established, recovering treatment and subsequent treatment for blank paper are executed, and then, each head temperature is detected (S850). After the label printer is held in the standby state for a period of X seconds (S855), each head temperature is detected (S860) and it is determined whether the head temperature is lowered or not (S865). In the case that it is found that the head temperature is lowered, the user is released from the alarmed state (S870), and then, the printing operation is restarted (S875). In the case that it is found at S865 that the head temperature is not lowered, it is considered that this is attributable to the fact that energy is continuously fed to the head. Thus, a most severe alarm is issued to the user (S880). Next, feeding of electricity to the head system is interrupted (S885), and then, the program returns to parent treatment.

(7.5) Small-Scales Recovering Treatment, Middle-scaled Recovering Treatment and Large-scaled Recovering Treatment.

Figure 31:
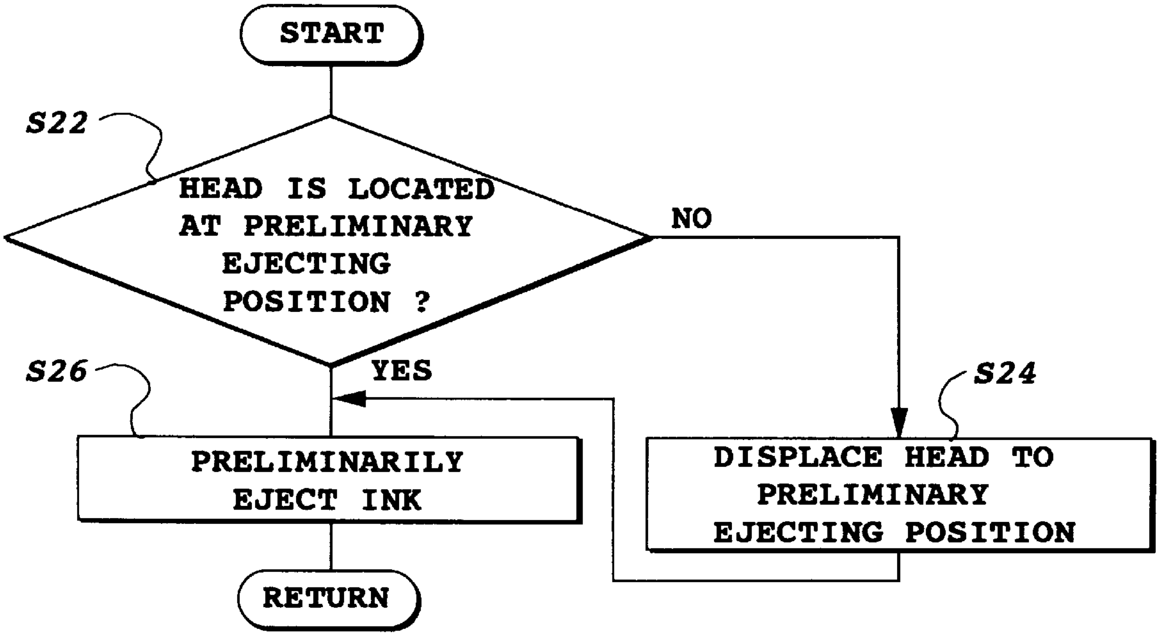
FIG. 31 is a flowchart which shows the content of small-scaled recovering treatments to be conducted.

The content of small-scaled recovering treatment will be described below with reference to FIG. 31. It is determined whether or not each head is located at the position where preliminary ejection can be conducted (S22). When it is found that the head is not located at the position where preliminary election can be conducted, the head is displaced to a preliminary ejection position (S24), and preliminary ejection is conducted at the foregoing position (S26). Once preliminary ejection is conducted, a predetermined number of ink droplets are ejected from the head.

Figure 32:
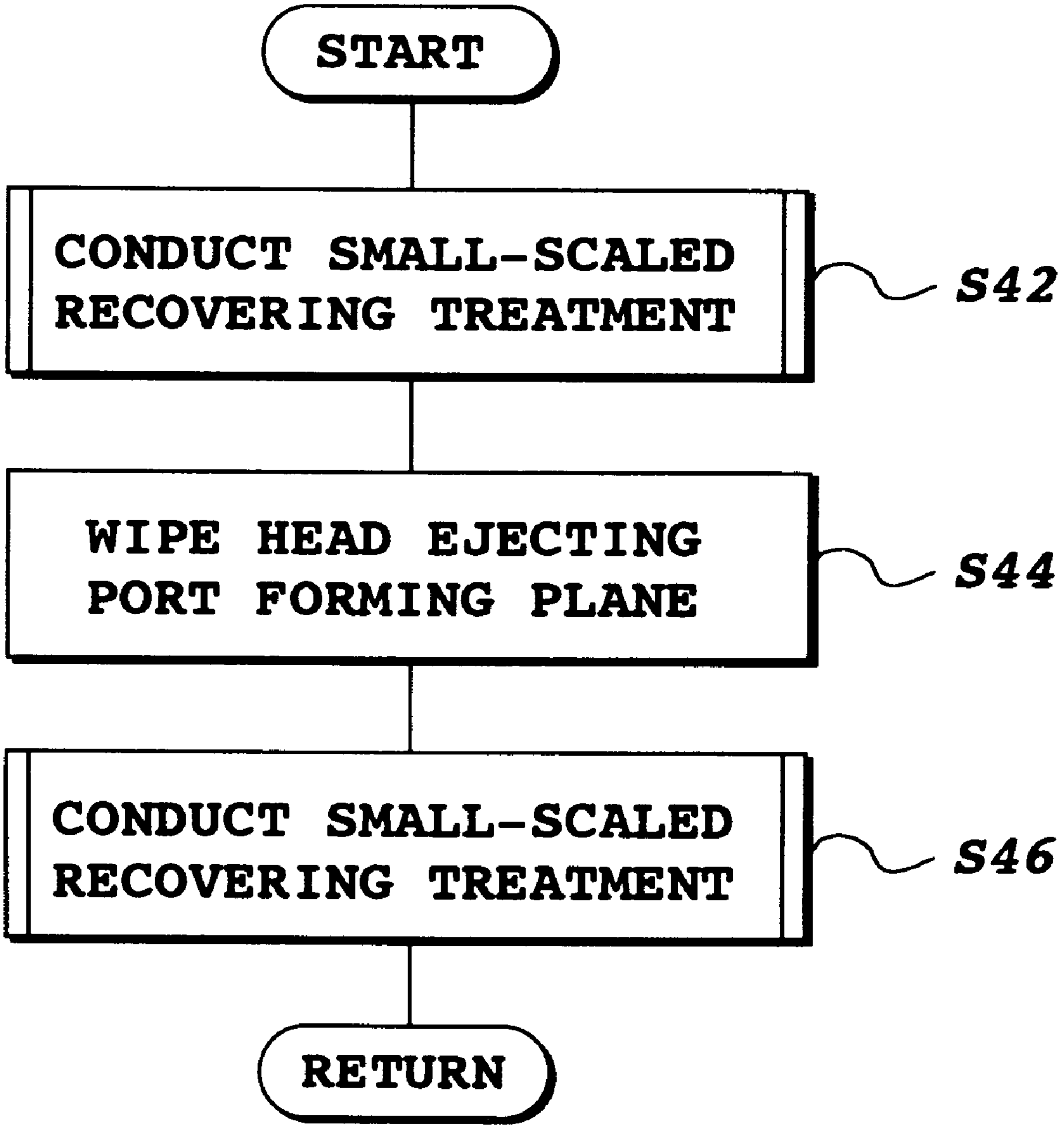
FIG. 32 is a flowchart which shows the content of middle-scaled first recovering treatments to be conducted.

The content of middle-scaled first recovering treatment will be described below with reference to FIG. 32. First, small-scaled recovering treatment is conducted (S42), thereafter, the ink ejection port forming plane of the head is wiped using an elastic material (S44), and then, small-scaled recovering treatment is conducted again (S46).

Figure 33:
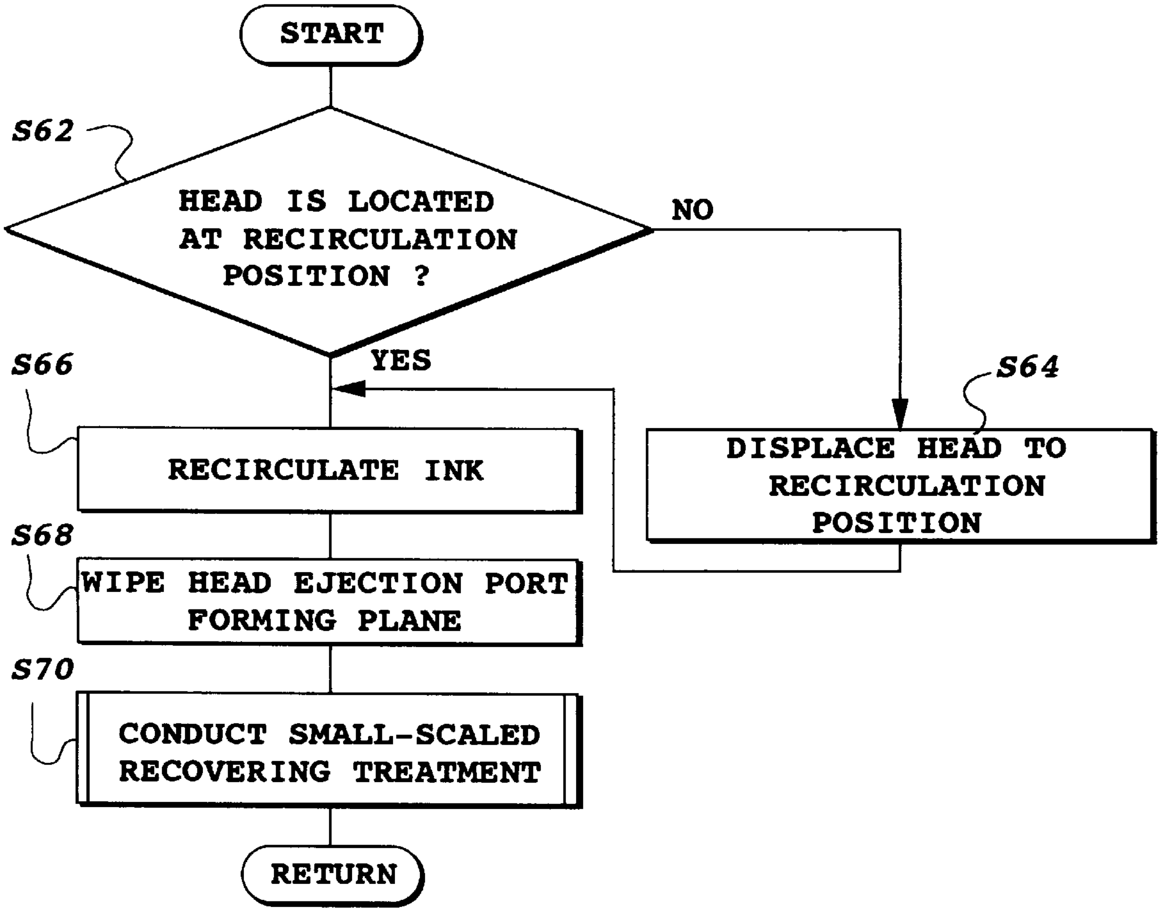
FIG. 33 is a flowchart which shows the content of middle-scaled second recovering treatments to be conducted.

The content of middle-scaled second recovering treatment will be described below with reference to FIG. 33. First, it is determined whether or not each head is located at the position where ink can recirculate (S62). When it is found that the head is not located at the position where ink recirculate, the head is displaced to an ink recirculation position (S64). Next, ink recirculating treatment is conducted (S66). Thereafter, a wiping operation is performed (S68), and then, small-scaled recovering treatment is conducted (S70).

Figure 34:
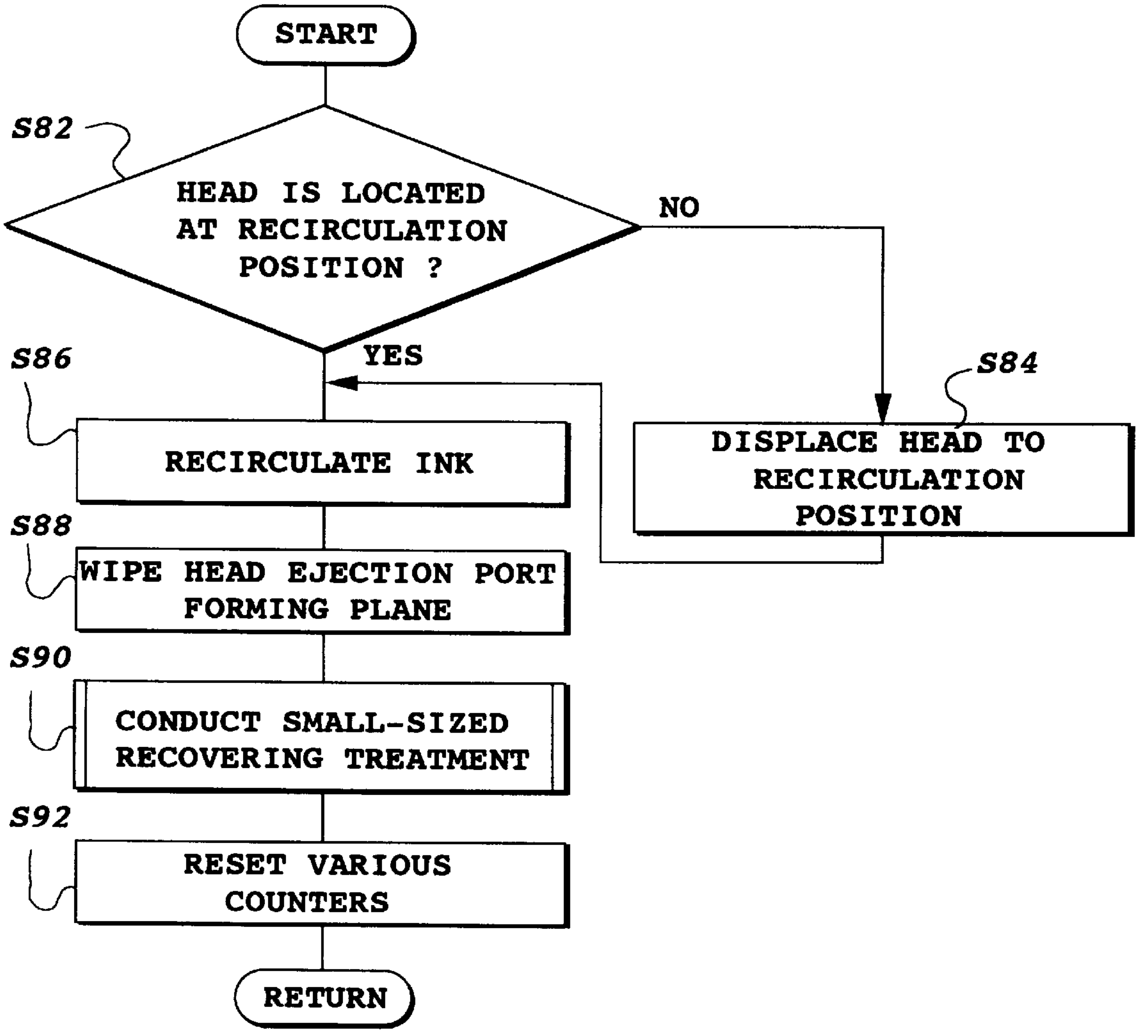
FIG. 34 is a flowchart which shows the content of large-scaled recovering treatments to be conducted.

The content of large scaled recovering treatment will be described below with reference to FIG. 34. First, it is determined whether or not each head is located at the position where ink can recirculate (S82). When it is found that the head is not located at the position where ink can recirculate, the head is displaced to an ink recirculating position (S84). Next, ink recirculating treatment is conducted (S86). Thereafter, a wiping operation is performed (S88), small-sized recovering treatment is conducted (S90), and then, a counter, a timer and others are reset (S92).

(8) Others

In this embodiment, since an ink jet head is used for the label printer, advantages specific to the ink jet head as mentioned above at many locations are obtainable. In addition to these advantages, the label printer exhibits the following remarkable advantages.

When bar codes each extending in the direction perpendicular to the line head (i.e., in the printing paper conveying direction) are printed using a thermal head, particular heat generating elements are continuously driven. This leads to the problem that heat is accumulated in these heating elements. Especially, the subsequently printed upper part of each bar code as viewed in the direction of height of the bar code is printed with a large width compared with the precedently printed lower part of the same because of heat accumulation in the heat generating elements. For this reason, there arises a necessity for controlling a quantity of energy to be applied to each heat generating elements.

On the other hand, when a printing operation is performed in the direction of the line head or the like other than the conveying direction, a number of heat generating elements continuous with the direction of arrangement of heat generating elements for a full multi head are simultaneously driven, causing heat to be accumulated in the heat generating elements. Thus, part of the printing medium to not be printed is heated due to heat accumulation with the result that a tail like stripe appears on the foregoing part of the printing medium with a quality of printed image adversely affected. Especially, in the case of bar codes each where a printing accuracy is recognized as an important factor, a gap between adjacent unprinted bar codes that is disturbed may result in the detection accuracy of each bar code being largely adversely affected.

In addition, when a recording operation is performed while the temperature of each heating element is kept low (after the unprinted line continues), each color can not be sufficiently visually recognized. Thus, there is a possibility that a fine line is recorded with such a density that it can not exactly be detected by a bar code scanner.

In the circumstances as mentioned above, it is necessary to control heat generating elements in the following manner. Specifically, with respect to a heat generating element which does not participate in recording, it is controlled such that each color can sufficiently visually be recognized at the time of next recording operation. With respect to a heat generating element which participate in continuous recording, it is controlled such that its temperature is not excessively elevated.

In consideration of the aforementioned facts, it is advantageous to utilize an ink jet head.

Among various kinds of ink jet recording systems, the present invention is concerned with a recording head or a recording apparatus of the type which includes means for generating thermal energy (e.g., electrothermal transducers, a laser light beam or the like) to be utilized for ejecting ink therefrom, and moreover, causing the state of ink to vary by thermal energy. According to such a system as mentioned above, each recording operation can be achieved not only at a high density but also at a high accuracy while assuring distinct advantageous effects inherent to this system.

With respect to a typical structure and an operational principle of the foregoing system, it is preferable that reference is made to official gazettes of U.S. Pat. Nos. 4,723,129 and 4,740,796 each of which discloses a basic principle of the foregoing type of system. Although this system can be applied to a so-called on-demand type ink jet recording system and a continuous type ink jet recording system, it is particularly suitably employable for operating in the form of an on-demand type recording apparatus. This is because the on-demand type recording apparatus includes electrothermal transducers each disposed corresponding to a sheet of paper or a liquid path having liquid (ink) retained therein and operates in the following manner. In response to at least one driving signal applied to the electrothermal transducers to induce a sudden temperature rise in excess of appearance of a phenomenon of nucleate boiling in the liquid, thermal energy is generated in the thermal transducers, causing a phenomenon of film boiling to appear on the heating portion of a recording head. This leads to the result that gas bubbles are grown in the liquid (ink) corresponding to a driving signal in the one-to-one relationship. By using the growth and collapse of the gas bubbles, at least one liquid droplet is ejected from ink ejecting ports. The driving signal in the form of a pulse is preferably employable because the growth and collapse of the gas bubbles can instantaneously be achieved, resulting in the liquid (ink) being ejected with excellent responsiveness. As driving signals to be outputted in the form of a pulse, those described in official gazettes of U.S. Pat. Nos. 4,463,359 and 4,345,262 are preferably employable. Incidentally, when conditions described in an official gazette of U.S. Pat. No. 4,313,124 which is concerned with the rate of the temperature rise of the heating portions of the recording head are employed, a more excellent recording operation can be performed.

With respect to the structure of the recording head, it is recommendable that reference is made to official gazettes of U.S. Pat. Nos. 4,558,333 and 4,459,600 both of which are incorporated in the present invention. According to these prior inventions, the structure includes heating portions disposed on bent portions of the recording head in addition to a combination made among the ink ejecting ports, the liquid paths (linearly extending liquid flow paths or flow paths extending at a right angle relative to the preceding ones) and the electrothermal transducers are disclosed in the official gazettes of the foregoing prior inventions. In addition, the present invention can advantageously be applied to the structure disclosed in an official gazette of Japanese Patent Laid-Open Publication No. 123670/1984 so as to allow a common slit to be used as ejecting portions for a plurality of electrothermal transducers. Additionally, the present invention can likewise advantageously be applied to the structure disclosed in an official gazette of Japanese Patent Laid-Open Publication No. 138461/1984 so as to allow opening portions for absorbing pressure waves caused by the thermal energy to be used as ejecting portions. Thus, irrespective of the type of the recording head, the present invention assures that each recording operation can reliably be achieved at a high efficiency.

Further, the present invention can advantageously be applied to a full line type recording head having a length equal to the maximum width of a recording medium with which each recording operation can be performed by operating the recording apparatus. This type of recording head is exemplified by a recording head having such a structure that a condition relating to the foregoing length is satisfied by combining a plurality of recording heads with each other and a single recording head having an integral structure.

It is preferable that a preliminary assisting means or the like are added to the recording apparatus because the advantageous effects of the present invention can be stabilized further. Specifically, the preliminary assisting means is exemplified by capping means for the recording head, cleaning means, electrothermal transducers, heating elements different from the electrothermal transducers, preliminary heating means adapted to effect heating in combination of the electrothermal transducers with the heating elements, and preliminary ejecting means adapted to effect ejecting separately from recording.

The kind and the number of recording heads to be mounted on the recording apparatus can also be changed as desired. For example, only one recording head corresponding to a monochromatic ink is acceptable. In addition, a plurality of recording heads corresponding to plural kinds of inks each different in printing color or concentration are also acceptable. For example, as a recording mode employable for the recording apparatus, the present invention should not be limited only to a recording mode having a main color such as a black color the like used therefor. The recording head may be constructed in an integral structure or a plurality of recording heads may be combined with each other. The recording apparatus including at least one recording mode selected from recording modes using plural colors each having a different color and a recording mode based on full color prepared by mixing plural colors is very advantageously employable because bar codes have shortage in number, causing colored bar codes to be taken into account.

In each of the embodiments of the present invention as described above, each ink to be used has been explained as a liquid. Alternatively, ink which is kept solid at a temperature equal to or lower than the room temperature but softened or liquidized at greater than room temperature may be used. In the ink jet system, since the temperature of ink to be used is generally controllably adjusted within the temperature range of 30° C. or more to 70° C. or less so as to allow the viscosity of the ink to be maintained within the stable ejecting range, ink which is liquidized when a recording signal is applied to the recording head may be used. To positively prevent the temperature of ink from being elevated due to the thermal energy applied to the recording head by utilizing the energy absorption arising when the solid state of ink is transformed into the liquid state or to prevent the ink from being vaporized, ink which is kept solid in the unused state but liquidized on receipt of heat may be used. At any rate, the present invention can be applied to the case that in response to a recording signal, ink is liquidized on receipt of thermal energy and the liquid ink is then ejected from the recording head, the case that ink starts to be solidified when an ink droplet reaches a recording medium, and the case that ink having such a nature that it is liquidized only in response to application of thermal energy to the recording head is used. In such cases, while ink is retained in concavities or through holes formed in a porous sheet material in the form of a liquid substance or a solid substance, the ink may face to the electrothermal transducers as described in an official gazette of Japanese Patent Laid-Open Publication No. 56847/1979 or an official gazette of Japanese Patent Laid-Open Publication No. 71260/1985. According to the present invention, a most advantageous result can be obtained with any one of the aforementioned kinds of inks when the film boiling system is executed.

In addition, the ink jet recording apparatus of the present invention can be employed not only as an image output terminal of an information processing apparatus such as a computer or the like but also as an output apparatus of a copying machine combined with an optical reader and as an output apparatus of a facsimile apparatus having a sending/receiving function.

As is apparent from the above description, according to the present invention, since a roll-shaped paper is unwound from the outer periphery thereof for the purpose of paper feeding, setting paper to a paper feeding section is completed merely by placing the roll-shaped paper on the unwinding section in contrast with a conventional apparatus having a roll-shaped paper held on a support shaft in the coaxial-relationship. In addition, since a printing paper is unwound or wound by driving the outer periphery of the roll-shaped paper, a power transmitting mechanism such as a row of speed reduction gears required in the case of center shaft driving can be omitted or remarkably simplified. Irrespective of the variation of the diameter of the roll-shaped paper caused by unwinding or winding, the printing paper can be fed by a predetermined quantity at a constant speed.

While the present invention has been described above with respect to preferred embodiments thereof, it should of course be understood that the present invention should not be limited only to these embodiments but various changes or modification may be made without departure from the scope of the present invention as defined by the appended claims.

What is claimed is:

1. A printing apparatus for performing recording on a recording medium using a recording head, comprising:

a sheet feeding unit fitting section for fitting one of plural kinds of sheet feeding units, said plural kinds of sheet feeding units including a roll-shaped sheet feeding unit for feeding a continuous rolled sheet and a cut sheet feeding unit for feeding a cut sheet of predetermined size;

means for detecting whether the recording medium fed from the sheet feeding unit fitted to said sheet feeding unit fitting section reaches a predetermined position, said detecting means including an optical sensor; and recording controlling means for controlling recording by said recording head on the recording medium, which is fed by said sheet feeding unit, wherein said recording controlling means controls recording on the rolled sheet with said optical sensor detecting preprinted marks periodically placed on the rolled sheet and determining a position on the rolled sheet where printing is started when said roll-shaped sheet feeding unit is fitted, wherein said recording controlling means controls recording on the cut sheet with said optical sensor detecting an edge of the cut sheet and determining a position on the cut sheet where printing is started when said cut sheet feeding unit is fitted, and wherein detection of the preprinted marks on the rolled sheet and detection of the edge of the cut sheet are carried out by said optical sensor in different sensing conditions.

2. A printing apparatus as claimed in claim 1, further comprising:

discriminating means for discriminating a kind of sheet fed from the sheet feeding unit fitted to said sheet feeding unit fitting section, wherein said recording controlling means controls recording based on a result of discrimination made by said discriminating means.

3. A printing apparatus as claimed in claim 2, wherein said sensor is disposed on each of said plural kinds of sheet feeding units, said sheet feeding unit fitting section comprises an interface for allowing input of an output signal from said sensor, and said recording controlling means controls recording based on an output from said sensor of the sheet feeding unit fitted to said sheet feeding unit fitting section.

4. A printing apparatus as claimed in claim 3, wherein said sensor disposed in said rolled sheet feeding unit for feeding the rolled sheet comprises a reflective optical sensor, said sensor disposed in said cut sheet feeding unit for feeding the cut sheet comprises a permeable optical sensor, in a case that the rolled sheet is fed, said recording controlling means judges that the recording medium reaches a printing start position based on said reflective optical sensor detecting the preprinted mark on the rolled sheet, and in a case that the cut sheet is fed, said recording controlling means judges that the recording medium reaches the printing start position based on said permeable optical sensor detecting interruption of a light beam by the cut sheet.

5. A printing apparatus as claimed in claim 2, wherein each of said plural kinds of sheet feeding units includes a motor, said sheet feeding unit fitting section includes an interface for allowing output of an input to said motor, and said recording controlling means controls said motor of the sheet feeding unit fitted to said sheet feeding unit fitting section.

6. A printing apparatus as claimed in claim 2, wherein said cut sheet feeding unit comprises:

supporting means vertically displacing for supporting a plurality of cut sheets;

driving means for driving said supporting means in a vertical direction;

detecting means for detecting an uppermost sheet of the plurality of cut sheets supported by said supporting means being located at a predetermined position;

separating means for separating only the uppermost sheet among the plurality of cut sheets located at the predetermined positions;

conveying means for conveying the uppermost cut sheet in a horizontal direction;

correcting means for correcting slantwise conveyance of the cut sheet conveyed by said conveying means; and delivering means for delivering the cut sheet in a predetermined timing relationship after slantwise conveyance of the cut sheet is corrected by said correcting means.

7. A printing apparatus as claimed in claim 6, wherein said driving means displaces said supporting means in the vertical direction when said detecting means detects the uppermost sheet of the plurality of cut sheets not being located at the predetermined position, and stops said supporting means when the uppermost sheet is located at the predetermined position.

8. A printing apparatus as claimed in claim 6, wherein said separating and conveying means comprises:

a pickup roller disposed above said supporting means so as to come in contact with the uppermost sheet of the plurality of cut sheets;

a first separating roller disposed downstream of said pickup roller with respect to the conveyance direction;

a second separating roller rotating in an identical direction as said first separating roller and located below and facing said first separating roller; and driving means for driving said pickup roller and said first separating roller.

9. A printing apparatus as claimed in claim 6, wherein said correcting means comprises a shutter member having a face extending perpendicular to a conveyance direction of the cut sheet and selectively projecting into a conveyance passage of the cut sheet and retracting from the conveyance passage.

10. printing apparatus as claimed in claim 9, wherein said delivering means comprises a solenoid for driving said shutter member.

11. A printing apparatus as claimed in claim 1, wherein said recording controlling means judges, in a case that the cut sheet is fed by said sheet feeding unit, that the recording medium reaches a printing start position based on the detection made by said sensor that the cut sheet exists, and judges, in the case that the rolled sheet is fed by said sheet feeding unit, that said recording medium reaches the printing start position based on the detection made by said sensor that the preprinted mark on the rolled sheet is detected.

12. A printing apparatus as claimed 1, in claim wherein the roll-shaped sheet includes recording media attached thereto in the form of labels on which recording is performed and the preprinted marks are placed relative to positions of the labels.

13. A printing apparatus as claimed in claim 1, wherein said optical sensor is a reflective sensor, and said controlling means controls recording based on said optical sensor detecting the preprinted marks placed on the roll-shaped sheet by sensing a decrease of reflective light when the roll-shaped sheet feeding unit is fitted, and detecting the edge of the cut sheet by sensing an increase of reflective light when the cut sheet feeling unit is fitted.

14. A printing apparatus as claimed in claim 13, wherein the roll-shaped sheet includes recording media attached thereto in the form of labels on which recording is performed and the preprinted marks are placed relative to positions of the labels.

15. A printing apparatus as claimed in claim 1, wherein said detecting means includes a reflective sensor and a permeable sensor, and said controlling means controls recording based on said reflective sensor detecting the preprinted marks placed on the roll-shaped sheet when the roll-shaped sheet feeding unit is fitted, and said permeable sensor detecting the edge of the cut sheet when the cut sheet feeding unit is fitted.

16. A printing apparatus as claimed in claim 15, wherein the roll-shaped sheet includes recording media attached thereto in the form of labels on which recording is performed and the preprinted marks are placed relative to positions of the labels.

17. A printing method for a printer having a sheet feeding unit fitting section for fitting one of plural kinds of sheet feeding units, the plural kinds of sheet feeding units including a rolled sheet feeding unit for feeding a rolled sheet and a cut sheet feeding unit for feeding a cut sheet and performing recording on a recording medium fed by the sheet feeding unit fitted to the sheet feeding unit fitting section with a recording head, said method comprising the steps of:

discriminating which of the plural kinds of sheet feeding units is fitted to the sheet feeding unit fitting section;

detecting with detecting means including an optical sensor whether the recording medium fed from the sheet feeding unit fitted to the sheet feeding unit fitting section reaches a predetermined position; and controlling recording with the recording head on the recording medium fed by the discriminated sheet feeding unit, wherein said controlling step controls recording on the rolled sheet with the optical sensor detecting preprinted marks periodically placed on the rolled sheet and determining a position on the rolled sheet where printing is started when the roll-shaped sheet feeding unit is fitted, wherein said recording controlling step controls recording on the cut sheet with the optical sensor detecting an edge of the cut sheet and determining a position on the cut sheet where printing is started when the cut sheet feeding unit is fitted, and wherein detection of the preprinted marks on the rolled sheet and detection of the edge of the cut sheet are carried out by the optical sensor in different sensing conditions.

18. A printing method as claimed in claim 14, wherein each of the sheet feeding units includes a sensor, the sheet feeding unit fitting section includes an interface for allowing input of an output from the sensor, and said controlling step controls recording based on a kind of the sheet feeding unit fitted to the sheet feeding unit fitting section and an output from the sensor.

19. A printing method as claimed in claim 18, wherein the sensor comprises a top of form sensor for detecting the printing start position, and said printing method further comprises the steps of judging that the recording medium reaches the printing start position when the top of form sensor detects black color in a case that the rolled paper feeding unit is fitted, and judging that the recording medium reaches the printing start position when the top of form sensor detects white color in a case that the cut sheet feeding unit is fitted.

20. A printing method as claimed in claim 18, wherein the sensor disposed in the rolled paper feeding unit comprises a reflective top of form sensor for detecting the printing start position, the sensor disposed in the cut sheet feeding unit comprises a permeable top of form sensor for detecting the printing start position, and said printing method further comprises the steps of judging that the recording medium reaches the printing start position when the reflective top of form sensor detects black color in a case that the rolled paper feeding unit is fitted, and judging that the recording medium reaches the printing start position when no light beam is irradiated to the permeable top of form sensor from a light source in a case that the cut sheet feeding unit is fitted.

21. A printing method as claimed in claim 17, wherein each of said sheet feeding units includes a motor, the sheet feeding unit fitting section includes an interface for allowing output of an input into the motor, and said controlling step comprises controlling the motor based on a kind of the sheet feeding unit fitted to the sheet feeding unit fitting section.

22. A printing method as claimed in claim 17, wherein the roll-shaped sheet includes recording media attached thereto in the form of labels on which recording is performed and the preprinted marks are placed relative to positions of the labels.

23. A printing method as claimed in claim 17, wherein the optical sensor used in said discriminating step is a reflective sensor, and said controlling step controls printing based on the optical sensor detecting the preprinted marks placed on the roll-shaped sheet by sensing a decrease of reflective light when the roll-shaped sheet feeding unit is fitted, and detecting the edge of the cut sheet by sensing an increase of reflective light when the cut sheet feeding unit is fitted.

24. A printing method as claimed in claim 23, wherein the roll-shaped sheet includes recording media attached thereto in the form of labels on which recording is performed and the preprinted marks are placed relative to positions of the labels.

25. A printing method as claimed in claim 17, wherein the detecting means used in said discriminating step includes a reflective sensor and a permeable sensor, and said controlling step controls printing based on the reflective sensor detecting the preprinted marks placed on the roll-shaped sheet when the roll-shaped sheet feeding unit is fitted, and the permeable sensor detecting the edge of the cut sheet when the cut sheet feeding unit is fitted.

26. A printing method as claimed in claim 25, wherein the roll-shaped sheet includes recording media attached thereto in the form of labels on which recording is performed and the preprinted marks are placed relative to positions of the labels.

* * * * *

UNITED STATES PATENT AND TRADEMARK OFFICE

CERTIFICATE OF CORRECTION

PATENT NO. : 5,953,035

DATED : September 14, 1999

INVENTOR(S) : WATANABE ET AL.

It is certified that error appears in the above-identified patent and that said Letters Patent is hereby corrected as shown below:

Title page, item
[56] References Cited,
FOREIGN PATENT DOCUMENTS, "0 300 095 7/1987 European Pat. Off." should be deleted.
"54-056847 5/1978" should read --54-056847 5/1979--.
"4133942" should read --4-133942--.
"5116401" should read --5-116401--.
"6115189" should read --6-115189--.

Title page, item
[57] ABSTRACT,
Line 5, "feeding-unit" should read --feeding unit--.

IN THE DRAWINGS:
Sheet 25, Figure 25, "RECOVERING PREVENTIVE" should be deleted.
Sheet 37, Figure 37, "CONVETANCE/" should read --CONVEYANCE/--.

COLUMN 1,
Line 44, "mined" should read --mine--.

COLUMN 3,
Line 41, "sersor" should read --sensor--.

COLUMN 4,
Line 21, "at." should read --at--.

UNITED STATES PATENT AND TRADEMARK OFFICE

CERTIFICATE OF CORRECTION

PATENT NO. : 5,953,035

DATED : September 14, 1999

INVENTOR(S) : WATANABE ET AL.

It is certified that error appears in the above-identified patent and that said Letters Patent is hereby corrected as shown below:

COLUMN 6,
Line 5, "another" should read --other--.

COLUMN 8,
Line 39, "501!" should read --501,--.
Line 58, "ON-LIME" should read --ON-LINE--.

COLUMN 9,
Line 11, "lowered" should read --lowered.--.
Line 13, "state" should read --state.--.
Line 31, "closed" should read --closed.--.

COLUMN 19,
Line 9, "(S108C)," should read --(S1080),--.

COLUMN 20,
Line 4, "are" should read --is--.

COLUMN 22,
Line 22, "direction" should read --direction.--.
Line 63, "3subtank" should read --subtank--.

COLUMN 23,
Line 14, "stats" should read --state--.
Line 18, "stopped" should read --stopped.--.

UNITED STATES PATENT AND TRADEMARK OFFICE

CERTIFICATE OF CORRECTION

PATENT NO. : 5,953,035

DATED : September 14, 1999

INVENTOR(S) : WATANABE ET AL.

It is certified that error appears in the above-identified patent and that said Letters Patent is hereby corrected as shown below:

COLUMN 25,
Line 52, "FIG. 35 is" should read --FIG. 35 are--.

COLUMN 35,
Line 37, "positions;" should read --position;--.

COLUMN 36,
Line 4, "10. printing" should read --10. A printing--.
Line 27, "feeling" should read --feeding--.

COLUMN 37,
Line 10, "claim 14," should read --claim 17,--.

Signed and Sealed this

Twelfth Day of September, 2000

Attest:

Q. TODD DICKINSON

*Attesting Officer*

*Director of Patents and Trademarks*